US012488072B2

(12) United States Patent
Khoury et al.

(10) Patent No.: US 12,488,072 B2
(45) Date of Patent: Dec. 2, 2025

(54) PASSIVE AND CONTINUOUS MULTI-SPEAKER VOICE BIOMETRICS

(71) Applicant: PINDROP SECURITY, INC., Atlanta, GA (US)

(72) Inventors: Elie Khoury, Atlanta, GA (US); Ganesh Sivaraman, Atlanta, GA (US); Avrosh Kumar, Atlanta, GA (US); Ivan Antolic-Soban, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 320 days.

(21) Appl. No.: 17/231,672

(22) Filed: Apr. 15, 2021

(65) Prior Publication Data

US 2021/0326421 A1 Oct. 21, 2021

Related U.S. Application Data

(60) Provisional application No. 63/010,504, filed on Apr. 15, 2020.

(51) Int. Cl.
*G06F 21/32* (2013.01)
*G06N 20/00* (2019.01)
(Continued)

(52) U.S. Cl.
CPC ............ *G06F 21/32* (2013.01); *G06N 20/00* (2019.01); *G10L 17/04* (2013.01); *G10L 17/18* (2013.01); *G10L 17/24* (2013.01)

(58) Field of Classification Search
CPC ......... G06F 21/32; G10L 17/18; G10L 17/04; G10L 17/24; G06N 20/00
See application file for complete search history.

(56) References Cited

U.S. PATENT DOCUMENTS

| 5,442,696 A | 8/1995 | Lindberg et al. |
| 5,570,412 A | 10/1996 | Leblanc |

(Continued)

FOREIGN PATENT DOCUMENTS

| JP | 2014-170488 A | 9/2014 |
| JP | 2018-508799 A | 3/2018 |

(Continued)

OTHER PUBLICATIONS

International Preliminary Report on Patentability for PCT/US2021/027474 dated Oct. 27, 2022 (11 pages).

(Continued)

*Primary Examiner* — Richemond Dorvil
*Assistant Examiner* — Ethan Daniel Kim
(74) *Attorney, Agent, or Firm* — Foley & Lardner LLP

(57) ABSTRACT

Embodiments described herein provide for a voice biometrics system execute machine-learning architectures capable of passive, active, continuous, or static operations, or a combination thereof. Systems passively and/or continuously, in some cases in addition to actively and/or statically, enrolling speakers as the speakers speak into or around an edge device (e.g., car, television, radio, phone). The system identifies users on the fly without requiring a new speaker to mirror prompted utterances for reconfiguring operations. The system manages speaker profiles as speakers provide utterances to the system. Machine-learning architectures implement a passive and continuous voice biometrics system, possibly without knowledge of speaker identities. The system creates identities in an unsupervised manner, sometimes passively enrolling and recognizing known or unknown speakers. The system offers personalization and security across a wide range of applications, including media content for over-the-top services and IoT devices (e.g., personal assistants, vehicles), and call centers.

24 Claims, 13 Drawing Sheets

(51) Int. Cl.
  *G10L 17/04* (2013.01)
  *G10L 17/18* (2013.01)
  *G10L 17/24* (2013.01)

(56) References Cited

U.S. PATENT DOCUMENTS

| | | | |
|---|---|---|---|
| 5,724,404 | A | 3/1998 | Garcia et al. |
| 5,825,871 | A | 10/1998 | Mark |
| 6,041,116 | A | 3/2000 | Meyers |
| 6,134,448 | A | 10/2000 | Shoji et al. |
| 6,654,459 | B1 | 11/2003 | Bala et al. |
| 6,735,457 | B1 | 5/2004 | Link et al. |
| 6,765,531 | B2 | 7/2004 | Anderson |
| 7,133,792 | B2 | 11/2006 | Murakami et al. |
| 7,545,961 | B2 | 6/2009 | Ahern et al. |
| 7,787,598 | B2 | 8/2010 | Agapi et al. |
| 8,050,393 | B2 | 11/2011 | Apple |
| 8,085,907 | B2 | 12/2011 | Jaiswal |
| 8,145,562 | B2 | 3/2012 | Wasserblat et al. |
| 8,223,755 | B2 | 7/2012 | Jennings et al. |
| 8,260,350 | B2 | 9/2012 | Jaiswal et al. |
| 8,311,218 | B2 | 11/2012 | Mehmood et al. |
| 8,385,888 | B2 | 2/2013 | Labrador et al. |
| 8,417,289 | B2 | 4/2013 | Jaiswal et al. |
| 8,476,600 | B2 | 7/2013 | Lee et al. |
| 8,768,648 | B2 | 7/2014 | Panther et al. |
| 8,925,058 | B1 | 12/2014 | Dotan et al. |
| 9,060,057 | B1 | 6/2015 | Danis |
| 9,078,143 | B2 | 7/2015 | Rodriguez et al. |
| 9,372,976 | B2 | 6/2016 | Bukai |
| 9,405,967 | B2 | 8/2016 | Samet |
| 9,412,365 | B2 | 8/2016 | Biadsy et al. |
| 9,502,038 | B2 | 11/2016 | Wang et al. |
| 10,032,451 | B1 | 7/2018 | Mamkina et al. |
| 10,157,272 | B2 | 12/2018 | Kim et al. |
| 10,257,591 | B2 | 4/2019 | Gaubitch et al. |
| 10,311,872 | B2 | 6/2019 | Howard et al. |
| 10,388,272 | B1 | 8/2019 | Thomson et al. |
| 10,418,957 | B1 | 9/2019 | Wang et al. |
| 2002/0181448 | A1 | 12/2002 | Uskela et al. |
| 2003/0012358 | A1 | 1/2003 | Kurtz et al. |
| 2008/0212846 | A1 | 9/2008 | Yamamoto et al. |
| 2011/0051905 | A1 | 3/2011 | Maria Poels |
| 2011/0082877 | A1 | 4/2011 | Gupta et al. |
| 2011/0123008 | A1 | 5/2011 | Sarnowski |
| 2014/0214417 | A1 | 7/2014 | Wang et al. |
| 2014/0244257 | A1 | 8/2014 | Colibro et al. |
| 2014/0254778 | A1 | 9/2014 | Zeppenfeld et al. |
| 2015/0067822 | A1 | 3/2015 | Randall |
| 2015/0088509 | A1 | 3/2015 | Gimenez et al. |
| 2015/0112682 | A1 | 4/2015 | Rodriguez et al. |
| 2015/0120027 | A1 | 4/2015 | Cote et al. |
| 2015/0127336 | A1 | 5/2015 | Lei et al. |
| 2016/0063235 | A1 | 3/2016 | Tussy |
| 2016/0248768 | A1 | 8/2016 | Mclaren et al. |
| 2016/0269411 | A1 | 9/2016 | Malachi |
| 2016/0292149 | A1* | 10/2016 | Mote .................. G06F 40/30 |
| 2016/0293167 | A1 | 10/2016 | Chen et al. |
| 2016/0293185 | A1 | 10/2016 | Van Dorn et al. |
| 2016/0314616 | A1 | 10/2016 | Su |
| 2017/0069327 | A1 | 3/2017 | Heigold et al. |
| 2017/0076727 | A1* | 3/2017 | Ding .................. G10L 17/04 |
| 2017/0084292 | A1 | 3/2017 | Yoo |
| 2017/0169113 | A1 | 6/2017 | Bhatnagar et al. |
| 2017/0169815 | A1 | 6/2017 | Zhan et al. |
| 2017/0222960 | A1 | 8/2017 | Agarwal et al. |
| 2017/0256254 | A1 | 9/2017 | Huang et al. |
| 2017/0302794 | A1 | 10/2017 | Spievak et al. |
| 2017/0330586 | A1 | 11/2017 | Roblek et al. |
| 2017/0351907 | A1 | 12/2017 | Bataller et al. |
| 2017/0359362 | A1 | 12/2017 | Kashi et al. |
| 2017/0365118 | A1 | 12/2017 | Nurbegovic et al. |
| 2017/0372128 | A1 | 12/2017 | Owen |
| 2018/0082689 | A1 | 3/2018 | Khoury et al. |
| 2018/0082692 | A1 | 3/2018 | Khoury et al. |
| 2018/0150740 | A1 | 5/2018 | Wang et al. |
| 2018/0174575 | A1 | 6/2018 | Bengio et al. |
| 2018/0197548 | A1 | 7/2018 | Palakodety et al. |
| 2018/0254046 | A1 | 9/2018 | Khoury et al. |
| 2018/0293221 | A1 | 10/2018 | Finkelstein et al. |
| 2018/0366125 | A1 | 12/2018 | Liu et al. |
| 2019/0013013 | A1 | 1/2019 | Mclaren et al. |
| 2019/0050716 | A1 | 2/2019 | Barkan et al. |
| 2019/0156210 | A1 | 5/2019 | He et al. |
| 2019/0180759 | A1 | 6/2019 | Fontaine et al. |
| 2019/0236102 | A1* | 8/2019 | Wade .................. G06F 40/205 |
| 2020/0211561 | A1* | 7/2020 | Degraye .............. G10L 15/26 |
| 2020/0365160 | A1* | 11/2020 | Nassar ................ G10L 17/06 |
| 2020/0380980 | A1* | 12/2020 | Shum .................. G10L 15/18 |
| 2022/0269850 | A1* | 8/2022 | Lebas ................. G06F 16/3329 |

FOREIGN PATENT DOCUMENTS

| | | |
|---|---|---|
| JP | 2019-109503 A | 7/2019 |
| WO | WO-2018/166316 A1 | 9/2018 |

OTHER PUBLICATIONS

Invitation to Pay Additional Fees and, Where Applicable, Protest Fees for PCT/US2021/027474 dated Jun. 2, 2021 (2 pages).

International Search Report and Written Opinion for PCT/US2021/027474 dated Sep. 2, 2021 (14 pages).

Malik, Hafiz, "Securing Voice-driven Interfaces against Fake (Cloned) Audio Attacks", IEEE Conference on Multimedia Information Processing and Retrieval (MIPR), 2019, retrieved Jul. 29, 2021 from URL: https://ieeexplore.ieee.org/stamp/stamp.jsp?tp=&arnumber=8695320 (6 pages).

Alam et al., "Spoofing Detection on the ASVspoof 2015 Challenge Corpus employing Deep Neural Networks", Odyssey 2016, vol. 2016, Jun. 21, 2016, pp. 270-276.

Alegre et al., "Re-assessing the Threat of Replay Spoofing Attacks Against Automatic Speaker Verification", 2014 International Conference of BIOSIG, Sep. 2014, pp. 157-168.

Buyukyilmaz et al., "Voice Gender Recognition Using Deep Learning", Advances in Compuer Science Research, vol. 58, pp. 409-411, 2016.

Canadian Examination Report dated Oct. 16, 2019, issued in corresponding Canadian Application No. 3,032,807, 3 pages.

Douglas A. Reynolds et al., "Speaker Verification Using Adapted Gaussian Mixture Models," Digital Signal Processing 10, 2000, pp. 19-41.

Erbilik, et al. "Improved age prediction from biometric data using multimodal configurations" BIOSIG, Sep. 10-12, 2014, pp. 179-186.

Ergunay et al., "On the Vulnerability of Speaker Verification to Realistic Voice Spoofing", IEEE ICBTAS IEEE, Sep. 2015, pp. 1-6.

Finnian Kelly et al., "Score-Aging Calibration for Speaker Verification", IEEE/ACM Transactions on Audio, Speech, and Language Processing, IEEE, USA, vol. 24, No. 12, Dec. 1, 2016, pp. 2414-2424, XP058309805, ISSN: 2329-9290, DOI: 10.1109/TASLP.2016.2602542 pp. 2146-2148.

Han et al., "Age Estimation from Face Images: Human vs. Machine Performance," ICB, Jun. 4-7, 2013.

Hoffer, et al. "Deep Metric Learning Using Triplet Network", ICLR 2015 (workshop contribution), Mar. 23, 2015, retrieved from <https://arxiv.org/pdf/1412.6622v3.pdf> on Dec. 8, 2016.

International Search Report and Written Opinion issued in International Application No. PCT/US2018/017249, mailed May 3, 2018.

International Search Report and Written Opinion issued in International Application No. PCT/US2020/054825 dated Jan. 28, 2021.

Written Opinion issued in International Application No. PCT/US2017/044849 dated Jan. 11, 2018.

Ioffe. et al, "Batch Normalization: Accelerating Deep Network Training by Reducing Internal Covariate Shift", Proceedings of the 32nd ICML—vol. 37, pp. 448-456, Lille, France, Jul. 6-11, 2015.

Jain et al., "Guidelines for Best Practices in Biometrics Research", ICB, Phuket, Thailand, May 19-22, 2015.

(56) References Cited

OTHER PUBLICATIONS

Kelly et al., "Score-Aging Calibration for Speaker Verification," IEEE/ACM TASLP vol. 24, Iss. 12, Aug. 24, 2016, pp. 2414-2424.

Ling et al. "A Study of Face Recognition as People Age", ICCV, 2007.

Nagarsheth et al., "Replay Attack Detection Using DNN for Channel Discrimination", Interspeech 2017, Aug. 20, 2017, pp. 97-101.

International Search Report and the Written Opinion Issued in International Application No. PCT/US2018/020624 dated May 29, 2018.

Reynolds et al., "Speaker Verification Using Adapted Gaussian Mixture Models," Digital Signal Processing 10, 2000, pp. 19-41.

Richardson, et al., "Deep Neural Network Approaches to Speaker and Language Recognition", IEEE Signal Processing Letters, vol. 22, No. 10, Oct. 2015, pp. 1671-1675.

Schulzrinne et al., "RTP Payload for DTMF Digits, Telephone Tones, and Telephony Signals" Columbia University, Dec. 2006, <https://tools.ielf.org/html/rfc4733.>.

Sdjadi et al., "Speaker Age Estimation on Conversational Telephone Speech Using Senone Posterior Based I-vectors", IEEE ICASSP, Mar. 20-25, 2016.

Snyder et al., "X-Vectors: Robust DNN Embeddings for Speaker Recognition," Center for Language and Speech Processing & Human Language Technology Center of Excellence, the Johns Hopkins University, 2018.

Todisco, et al., "A New Feature for Automatic Speaker Verification Anti-Spoofing: Constant Q Cepstral Coefficients", Odyssey 2016, Jun. 21-24, 2016, Bilbao, Spain, pp. 283-290.

Wu et al., "ASVspoof: The Automatic Speaker Verification Spoofing and Countermeasures Challenge", IEEE Journal of Selected Topics in Signal Processing, IEEE, US, vol. 11, No. 4, Feb. 17, 2017, pp. 588-604.

Yu, et al., "Spoofing Detection in Automatic Speaker Verification Systems Using DNN Classifiers and Dynamic Acoustic Features", IEEE Transactions on Neural Networks and Learning Systems, vol. PP, Issue 99, Dec. 4, 2017.

Zhang et al., "An Investigation of Deep-Learning Frameworks for Speaker Verification Antispoofing", IEEE Journal of Selected Topics in Signal Processing, IEEE, US, vol. 11, No. 4, Jan. 16, 2017, pp. 684-694.

Extended European Search Report dated Mar. 19, 2024 on EPO App. 21789203.3 (7 pages).

EPO Examination Report for European Application No. 21789203.3 mailing date Dec. 20, 2024, 12 pages.

Garcia-Romero et al., "Speaker Diarization Using Deep Neural Network Embeddings," 2017 IEEE International Conference on Acoustics, Speech and Signal Processing (ICASSP), IEEE, Mar. 5, 2017 (Mar. 5, 2017), pp. 4930-4934, XP033259348, DOI: 10.1109/ICASSP.2017. 7953094 [retrieved on Jun. 16, 2017].

Judith A Markowitz: "Voice Biometrics," ARXIV:2003.08934V1, United States, vol. 43, No. 9, Sep. 1, 2000 (Sep. 1, 2000), pp. 66-73, XP058232480, DOI: 10.1145/348941.348995.

Snyder et al: "Deep Neural Network-Based Speaker Embeddings for End-to-End Speaker Verification," 2016 IEEE Spoken Language Technology Workshop (SL T), IEEE, Dec. 13, 2016 (Dec. 13, 2016), pp. 165-170, XP033061735, DOI: 10.1109/SL T.2016.7846260 [retrieved on Feb. 7, 2017].

Yanick et al: "Speaker Identification and Clustering Using Convolutional Neural Networks", 2016 IEEE 26th International Workshop on Machine Learning for Signal Processing (MLSP), IEEE, Sep. 13, 2016 (Sep. 13, 2016), pp. 1-6, XP032996272, DOI: 0.1109/MLSP. 2016.7738816 [retrieved on Nov. 8, 2016].

Zhang et al., "End-to-End Text-Independent Speaker Verification with Triplet Loss on Short Utterances", Interspeech 2017, Jan. 1, 2017 (Jan. 1, 2017), pp. 1487-1491, XP093213121, DOI: 10.21437/Interspeech.2017-1608.

Garcia-Romero et al.: "Speaker Diarization Using Deep Neural Network Embeddings", Published in 2017 IEEE International Conference on Acoustics, Speech and Signal Processing (ICASSP), pp. 4930-4934.

Markowitz (2000): "Voice Biometrics", Published in Communications of the ACM on Sep. 2000, vol. 43, Issue 9, pp. 66-73.

Lukic et al.: "Speaker Identification and Clustering Using Convolutional Neural Networks", Published in Conference: 2016 IEEE 26th International Workshop on Machine Learning for Signal Processing (MLSP) on Sep. 2016, Retrieved on Aug. 28, 2023, Retrieved from: IEEE Xplore.

Observations by third parties pursuant to Article 115 EPC issued in European Patent Application 21789203.3 dated Sep. 27, 2024 (12 Pages).

Snyder et al.: "Deep Neural Network-Based Speaker Embeddings for End-To-End Speaker Verification", Published in Conference: 2016 IEEE Spoken Language Technology Workshop (SLT) on Dec. 2016, pp. 165-170, Retrieved on Aug. 28, 2023, Retrieved from: IEEE Xplore.

Zhang et al.: "End-to-End Text-Independent Speaker Verification with Triplet Loss on Short Utterances", Published in Conference: Interspeech 2017 on Aug. 2017, pp. 1487-1491, Retrieved from: http://dx.doi.org/10.21437/Interspeech.2017-1608.

JP Office Action for Application No. 2022-561448 mailing date May 19, 2025, 6 pages with English translation.

Office Action issued in corresponding Singaporean Patent Application No. 11202253750C dated Sep. 4, 2025 (8 pages).

* cited by examiner

PASSIVE AND CONTINUOUS MULTI-SPEAKER VOICE BIOMETRICS

CROSS-REFERENCE TO RELATED APPLICATIONS

This application claims priority to U.S. Provisional Application No. 63/010,504, filed Apr. 15, 2020, which is incorporated by reference in its entirety.

This application generally relates to U.S. application Ser. No. 15/262,748, entitled "End-To-End Speaker Recognition Using Deep Neural Network," filed Sep. 12, 2016, issued as U.S. Pat. No. 9,824,692, which is incorporated by reference herein in its entirety.

This application generally relates to U.S. application Ser. No. 15/890,967, entitled "Age Compensation in Biometric Systems Using Time-Interval, Gender and Age," filed Feb. 7, 2018, issued as U.S. Pat. No. 10,672,403, which is incorporated by reference herein in its entirety.

This application generally relates to U.S. application Ser. No. 15/910,387, entitled "Method and Apparatus for Detecting Spoofing Conditions," filed Mar. 2, 2018, issued as U.S. Pat. No. 10,692,502, which is incorporated by reference herein in its entirety.

This application generally relates to U.S. application Ser. No. 17/155,851, entitled "Robust Spoofing Detection System Using Deep Residual Neural Networks," filed Jan. 22, 2021, which is incorporated by reference herein in its entirety.

This application generally relates to U.S. application Ser. No. 17/192,464, entitled "Systems and Methods of Speaker-Independent Embedding for Identification and Verification from Audio," filed Mar. 4, 2021, which is incorporated by reference herein in its entirety.

TECHNICAL FIELD

This application generally relates to systems and methods for training and deploying audio processing neural networks.

BACKGROUND

The advent of Internet of Things (IoT) devices has led to newer channels of machines interacting with voice commands. Oftentimes, many of the interactions with devices involve performing operations on private and sensitive data. Many new mobile apps and home personal assistants are enabling financial transactions using voice-based interactions with the device. The call center and, in particular, interactions with human agents at call centers, is no longer the only instance of voice-based interactions for institutions managing critical personal information. It is essential to reliably verify the identity of callers/speakers, who access and manage user accounts by operating various edge devices or IoT devices, or by contacting call centers, according to a uniform level of accuracy and security.

Automatic Speech Recognition (ASR) and Automatic Speaker Verification (ASV) systems are often used for security and authentication features, as well as other voice-based operations. Most implementations of voice biometrics use active and static enrollment and typically assume that the link between audio utterances and speaker identity is known. Active enrollment is when the users are prompted for an enrollment phase in which they have to repeat a passphrase or speak freely, typically until the criteria defined by the voice biometrics system are met. Active enrollment often occurs in combination with static enrollment when a user initially sets up their respective device or begins to use an over-the-top service. Active enrollment may be time consuming, and the deployment of voice biometrics might not be successful because users might opt out from enrolling. Further, static enrollment may result in voice models becoming stale or for inaccurate verification as more people wish to use the voice biometrics system or their voices change.

Furthermore, over-the-top (OTT) services may differ from other services that use automatic voice verification, such as banks, because an OTT service may require identifications of individual speakers from multiple speakers at a time as opposed to solely determining if a speaker satisfies a predefined criteria associated with the speaker's profile (e.g., determining whether the speaker's voice matches a voice corresponding to the speaker's profile regardless of any other speaker profiles). It can be difficult to maintain a system that can actively differentiate between speakers, particularly when multiple speakers are concurrently or intermittently speaking with each other. Further, it can be difficult to provide content or configure an edge device for individuals when the system identifies speech from multiple individuals at a time, such as when multiple people gather to watch videos or listen to music together or get into a car together.

What is therefore needed are improved approaches to enrolling new speakers as a service operates and to providing content or configuring edge device for speakers with pre-established and/or non-established speaker profiles so a system can differentiate the profiles from each other for utterance matching.

SUMMARY

Disclosed herein are systems and methods capable of addressing the above described shortcomings and that may also provide any number of additional or alternative benefits and advantages. Embodiments described herein provide for a flexible voice biometrics system capable of passive, active, continuous, or static operations, or some hybrid combination thereof. In particular, the systems and methods described herein provide for methods of passively and/or continuously, in some cases in addition to actively and/or statically, enrolling speakers as the speakers speak into or around an edge device (e.g., car, television, radio, phone). By implementing such systems and methods, the device can identify new users on the fly without requiring a new speaker to mirror prompted utterances to actively reconfigure the device each time a new speaker wishes to set up a profile. The systems and methods further provide for a method of organizing and reorganizing speaker profiles as the speakers provide utterances to the system to maintain up-to-date profiles for the speakers and avoid false authentication acceptances and/or rejections. The systems and methods provide for a passive and continuous voice biometrics system, in some cases with possibly no knowledge of speaker identities. The systems and methods may create identities in an unsupervised manner, in some cases passively enrolling and recognizing individual speakers as the system identifies speakers that do not satisfy a criterion for any stored user profiles. Such systems and methods may be used for personalization and security purposes across a wide range of applications, including IoTs (e.g., identifying a driver of a car and configuring the car's settings based on settings associated with the driver's speaker profile), for over-the-top services (e.g., identifying a television viewer to provide relevant content), and/or for call center use cases.

In an embodiment, a computer-implemented method comprises extracting, by the computer, an inbound embedding for an inbound speaker by applying a machine-learning model on an inbound audio signal; generating, by the computer, a similarity score based upon a distance between the inbound embedding and a voiceprint stored in speaker profile in a speaker profile database; and responsive to the computer determining that the similarity score for the inbound embedding fails to satisfy a similarity threshold: generating, by the computer, in the speaker profile database a new speaker profile for the inbound speaker containing the inbound embedding, the new speaker profile is database record storing the inbound embedding as a new voiceprint.

In another embodiment, a system comprises a speaker database comprising non-transitory machine-readable storage media configured to store data records containing speaker profiles; and a computer comprising a processor configured to: extract an inbound embedding for an inbound speaker by applying a machine-learning model on an inbound audio signal; generate a similarity score based upon a distance between the inbound embedding and a voiceprint stored in speaker profile in the speaker profile database; and responsive to the computer determining that the similarity score for the inbound embedding fails to satisfy a similarity threshold: generate in the speaker profile database a new speaker profile for the inbound speaker containing the inbound embedding, the new speaker profile is database record storing the inbound embedding as a new voiceprint.

In another embodiment, a computer-implemented method comprises receiving, by a computer, an inbound audio signal including a plurality of utterances of a plurality of inbound speakers; applying, by the computer, a machine-learning architecture to the inbound audio signal to extract a plurality of inbound embeddings corresponding to the plurality of inbound speakers; for each inbound speaker of the plurality of inbound speakers: generating, by the computer, one or more similarity scores based upon an inbound embedding for the inbound speaker, each similarity score for the inbound speaker indicating a distance between the inbound embedding and one or more voiceprints stored in a speaker profile database; and identifying, by the computer, a nearest voiceprint for the inbound speaker from the one or more voiceprints, the nearest voiceprint corresponding to a max similarity score of the one or more similarity scores generated for the inbound speaker; and for each max similarity score satisfying one or more similarity score thresholds: updating, by the computer, a speaker profile database to include the inbound embedding for the inbound speaker having the max similarity score satisfying the one or more similarity score thresholds.

In another embodiment, a system comprises a speaker database comprising non-transitory machine-readable storage media configured to store data records containing speaker profiles; and a computer comprising a processor configured to: receive an inbound audio signal including a plurality of utterances of a plurality of inbound speakers; apply a machine-learning architecture to the inbound audio signal to extract a plurality of inbound embeddings corresponding to the plurality of inbound speakers; for each inbound speaker of the plurality of inbound speakers: generate one or more similarity scores based upon an inbound embedding for the inbound speaker, each similarity score for the inbound speaker indicating a distance between the inbound embedding and one or more voiceprints stored in a speaker profile database; and identify a nearest voiceprint for the inbound speaker from the one or more voiceprints, the nearest voiceprint corresponding to a max similarity score of the one or more similarity scores generated for the inbound speaker; and for each max similarity score satisfying one or more similarity score thresholds: update a speaker profile database to include the inbound embedding for the inbound speaker having the max similarity score satisfying the one or more similarity score thresholds.

In another embodiment, a computer-implemented method comprises receiving, by a computer, an inbound audio signal for an inbound speaker from an end-user device via a content server; applying, by the computer, a machine learning model to the inbound audio signal to extract an inbound embedding for the inbound speaker; generating, by the computer, a similarity score for the inbound embedding based upon a distance between the inbound embedding and a voiceprint stored in a speaker profile in a speaker database, the similarity score satisfying one or more similarity score thresholds; identifying, by the computer, in the speaker profile one or more speaker characteristics corresponding to one or more content characteristics for the content server; and transmitting, by the computer, the one or more speaker characteristics associated with the inbound speaker to the media content server.

In another embodiment, a system comprises a speaker database comprising non-transitory machine-readable storage media configured to store a plurality of speaker profiles; and a server comprising a processor configured to: receive an inbound audio signal for an inbound speaker from an end-user device via a content server; apply a machine learning model to the inbound audio signal to extract an inbound embedding for the inbound speaker; generate a similarity score for the inbound embedding based upon a distance between the inbound embedding and a voiceprint stored in a speaker profile in the speaker database, the similarity score satisfying one or more similarity score thresholds; identify in the speaker profile one or more speaker characteristics corresponding to one or more content characteristics for the content server; and transmit the one or more speaker characteristics associated with the inbound speaker to the media content server.

In another embodiment, a method comprises obtaining, by the computer, a speaker profile associated with a speaker containing one or more embeddings for the speaker; determining, by the computer, a level of maturity for a voiceprint for the speaker based upon a false acceptance rate and one or more maturity factors for the one or more embeddings; updating, by the computer, one or more similarity thresholds of the speaker profile according to the level of maturity and the one or more maturity factors.

In another embodiment, a system comprises a speaker profile database comprising non-transitory machine-readable media configured to store a plurality of speaker profiles; and a computer comprising a processor configured to: obtain a speaker profile associated with a speaker containing one or more embeddings for the speaker; determine a level of maturity for a voiceprint for the speaker based upon a false acceptance rate and one or more maturity factors for the one or more embeddings; and update one or more similarity thresholds of the speaker profile according to the level of maturity and the one or more maturity factors.

In another embodiment, a device-implemented method comprises receiving, by a device, an inbound audio signal containing an utterance of an inbound speaker; applying, by the device, an embedding extraction model on the inbound audio signal to extract an inbound embedding for the inbound speaker; generating, by the device, one or more similarity scores for the inbound embedding upon a relative distance between the inbound embedding and one or more voiceprints stored non-transitory machine-readable media; identifying, by the computer, a speaker identifier associated with a voiceprint for the inbound speaker in response to determining that a similarity score generated using the voiceprint satisfies a similarity threshold; and transmitting, by the device, the speaker identifier to a content server.

In another embodiment, a system comprises a speaker database comprising non-transitory machine-readable storage media configured to store data records containing speaker profiles; and a device comprising a processor configured to: receive an inbound audio signal containing an utterance of an inbound speaker; apply an embedding extraction model on the inbound audio signal to extract an inbound embedding for the inbound speaker; generate one or more similarity scores for the inbound embedding upon a relative distance between the inbound embedding and one or more voiceprints stored the speaker database; identifying, by the computer, a speaker identifier associated with a voiceprint for the inbound speaker in response to determining that a similarity score generated using the voiceprint satisfies a similarity threshold; and transmit the speaker identifier to a content server.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
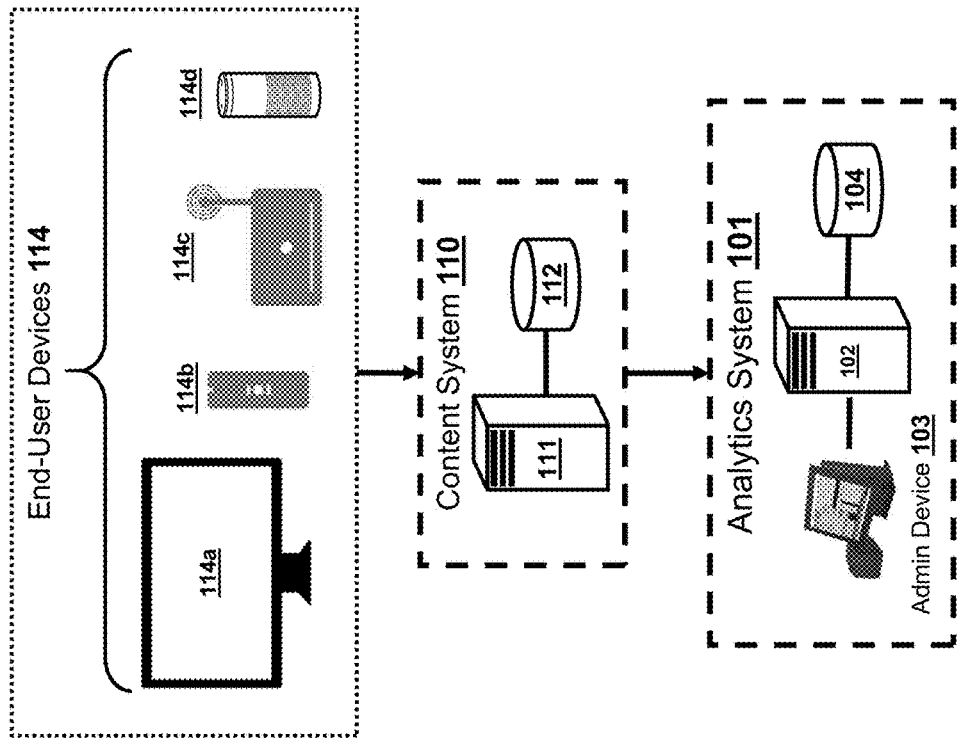
FIG. 1 shows components of a system employing audio-processing machine-learning operations.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Voice biometrics for speaker recognition and other operations (e.g., authentication) typically rely upon models or feature vectors (sometimes called "embeddings") generated from a universe of speaker samples and samples of a particular speaker. As an example, during a training phase (or re-training phase), a server or other computing device executes a speech recognition engine (e.g., artificial intelligence and/or machine-learning programmatic software) that is trained to recognize and distinguish instances of speech using a plurality of training audio signals. The machine-learning architecture outputs certain results according to corresponding inputs and evaluates the results according to a loss function by comparing the expected output against the observed output. The training operations then tailor the weighted values or hyper-parameters (of a neural network in the machine-learning architecture) and reapply the machine-learning architecture to the inputs until the expected outputs and observed outputs converge. The server then fixes the hyper-parameters and, in some cases, disables one or more layers of the neural network architecture used for training.

After training the machine-learning architecture, the server can further refine and develop the machine-learning architecture to recognize a particular speaker during enrollment operations for the particular speaker. The speech recognition engine can generate an enrollee a model embedding (sometimes called a "voiceprint") using embeddings extracted from enrollee audio signals having utterances of the speaker. During later inbound audio signals, the server refers to the voiceprints stored in a speaker profile in order to confirm whether later audio signals involve the known speaker based upon matching an inbound embedding extracted from the later inbound audio signal against the enrollee's voiceprint.

These approaches are generally successful and adequate for detecting the enrollee in the context of assessing inbound phone calls to a call center. More flexible and less-visible approaches to the enrollment and deployment operations might be desirable in other contexts, when users would prefer a more fluid or less-structured experience, such as instances when users are watching television or operating certain IoT or voice-enabled devices (e.g., vehicles, smart appliances, personal assistances).

Machine-Learning Model for Voiceprints and Content Services

The embodiments described herein disclose systems and methods for biometrics recognition, including voice recognition, for voice-based interface, management, authorization, and content personalization. Computing devices execute software programming implementing various types of machine-learning architectural layers or operations, including Gaussian Matrix Models (GMMs) and neural networks, for processing audio signals. The machine-learning architecture generally comprises any number of machine-learning models that, for example, generate feature vectors and extract embeddings representing or modeling aspects of an input audio signal; perform classifications according to the embeddings; generate a model embedding (e.g., voiceprint) for a particular speaker based upon one or more embeddings extracted from utterances of that speaker; and cluster similar-sounding utterances speakers or audio signal characteristics based upon similarities or differences between extracted features or embeddings compared against stored/expected features or. Once a voiceprint has been created, a system may detect utterances from individuals by comparing embeddings extracting from the utterances against the voiceprint to create a similarity score indicating a likelihood the utterance should be associated with the voiceprint (e.g., was spoken by the speaker represented by the voiceprint). If the similarity score satisfies one or more preconfigured similarity scores, then the system may associate the embeddings for the utterance with the speaker and/or include the embedding for the utterance to the voiceprint to update the voiceprint. Although the descriptions of certain embodiments mention training operations, the embodiments disclosed herein generally presume that the training phase is completed and begin with the enrollment phase.

Passive Enrollment

The voice biometrics systems described herein generally assume that the server or other computing device includes a trained machine-learning architecture. As such, the embodiments proceed to voice processing of the enrollment and deployment phases, where the server performs the enrollment operations in an active or passive enrollment configuration. In active enrollment configurations, an audio or visual user interface (e.g., telephone, television screen) presents a user with prompts instructing the user to speak various phrases. In response to the prompt, the user may, for example, repeat a passphrase or speak freely, until one or more criteria (e.g., number of utterances, time between inputs) are satisfied. An administrative user input defines the criterion, or one or more machine-learning models automatically establish or adjust the criterion.

Passive enrollment does not require user prompts, though some implementations employ hybrid approaches (e.g., active and passive). Rather, the server applies the various machine-learning layers on audio signals passively, without requiring user awareness, to extract features, perform classifications, and other operations. Beneficially, downstream operations employing the speaker modeling operations described herein (e.g., biometric authentication, content personalization, speaker diarization) occur in a seamless and frictionless manner, whereby the user need not change or disrupt interactions, saving time for enrollment or other operations.

Continuous Enrollment

The server may further implement static or continuous voice processing operations during the enrollment and deployment phases. In static operations, the voice biometrics system enrolls speakers once or at a fixed time, and the server does not execute the enrollment operations from new incoming audio signals or update the machine-learning architecture or models (e.g., parameters, voiceprints) after the initial enrollment.

By implementing continuous voice processing operations, a voice biometrics system employs and benefits from new incoming audio signals. The machine-learning architecture might initially implement static voice-processing operations to actively enroll speakers at a fixed time, the server may further ingest new utterances and develop the machine-learning models to enroll and detect new speakers at times subsequent to the fixed time. By implementing the continuous voice processing operations, the continuous voice processing operations may detect new utterances and compare the extracted embeddings for the new utterances against predefined criteria (e.g., voiceprints, similarity scores, authenticating data, user information, device information) to identify and enroll new speakers over time. The criteria may include, for example, various types of features extracted from biometric information, speaker/user information, device information, and metadata received with data inputs from end-user devices. The voice biometrics systems that perform continuous enrollment operations can passively capture and analyze enrollment inputs (e.g., enrollment audio signals) containing the various features and other types of information. The system then automatically detects new speakers based on the features of the input audio signal and generates new voiceprints (e.g., model embeddings) that the system references identify enrolled speakers or distinguish unknown, new speakers. Such systems may further perform continuous enrollment of, and periodic updates to, speaker profiles and speaker voiceprints to avoid staleness, which can result in an increased false rejection or acceptance rate.

Condition-Dependent Adaptive Thresholding

Some embodiments of speaker recognition systems employ fixed thresholding. For single-speaker verification employing fixed thresholding, the server compares an speaker embedding extracted from an inbound audio signal against an enrolled embedding (voiceprint) and computes a similarity or prediction score. If the similarity score satisfies a predefined speaker-independent fixed threshold, then the computing device verifies the inbound audio sample. Otherwise, the computing device rejects the inbound audio signal or reports a failing prediction score. For multi-speaker verification or open-set identification employing fixed thresholding having a number of speaker (N), the computing device extracts N inbound speaker embeddings from the inbound audio signal and compares the N inbound embeddings against a number of voiceprints (V) to compute N-by-V similarity scores, whereby the computing device compares each inbound embedding against each voiceprint. The computing device then outputs N-different similarity scores. The computing device only considers the maximum similarity score for each speaker, where the maximum similarity score represents the closest match between the particular speaker embedding and a particular voiceprint. If the maximum similarity score of the particular speaker embedding satisfies the predefined speaker-independent fixed threshold, then the computing device verifies or identifies the corresponding speaker in the multi-speaker audio sample.

In some cases, employing fixed thresholding operations allows some voiceprints to mature faster than other models. A voiceprint based on poor quality metrics, in several maturation factors, causes a computing device to falsely accept speakers at an unacceptable rate. A maturation factor includes, for example, the number of enrollment utterances.

For instance, a speaker voiceprint enrolled with 50 utterances is much more mature than a voiceprint enrolled with only 1 utterance. Another example of a mature factor includes an overall duration of net speech. For instance, a speaker voiceprint model enrolled with 1 utterance of 30 seconds long is more mature than another model enrolled with 1 utterance of only 2 seconds. Still another example includes the quality of the audio. For instance, a speaker model enrolled with 1 utterance collected in clean conditions of relatively low noise (high SNR, low T60) will be more mature than a model enrolled with 1 utterance collected in noisy and relatively reverberant conditions (low SNR, high T60).

Some embodiments of the speaker recognition systems employ condition-dependent adaptive thresholding. By implementing condition-dependent adaptive thresholding, the system accounts for maturation deficiencies and increases the accuracy to satisfy a desired false acceptance rate (or a desired false identification rate) of the machine-learning architecture trained to recognize or authenticate speakers. The system continuously adjusts similarity thresholds for matching the individual speaker voiceprints based on the voiceprint's maturity and a maturity threshold. In some cases, the server may determine different similarity thresholds for individual speaker profiles based on the maturation factors or a combination of such factors associated with the embeddings and the voiceprint of the particular speaker profile. The server generates and updates the series of similarity score thresholds for a given speaker depending on the target false acceptance rate and maturity factors, as configured according to administrative configurations received from an administrative device. For a model embedding (voiceprint), the system determines or updates the similarity thresholds according to the different acceptable or target false accuracy rates and/or maturity factor thresholds, such as the number of utterances added to the voiceprint. As an example, as the system adds utterances to the speaker-embedding model, the system might increase the similarity threshold as a result of the system having a better picture of the speaker (e.g., an increased number of utterances associated with the speaker). As another example, the similarity threshold for a given voiceprint may decrease when the configured false accuracy rate increases according to a user configuration input to the server.

A system implementing condition-dependent adaptive thresholding may use utterances received to update a speaker embedding model. For example, in some embodiments the server employs dual-thresholding in which the server generates the similarity score for an inbound embedding, extracted from an inbound utterance, by comparing the inbound embedding against the voiceprint and then evaluates the similarity score against a higher and a lower threshold of the particular speaker. If the similarity score exceeds the higher threshold, then the server verifies or authenticates the speaker. The server then adds the inbound embedding to the voiceprint and adds the inbound utterance to the speaker profile as a new utterance associated with the speaker. If the similarity score exceeds the lower threshold, then the server verifies or authenticates the inbound speaker. In circumstances where the prediction score satisfies the lower threshold but does not satisfy the higher threshold, then the server stores the inbound embedding and the inbound utterance in a list of weak embeddings, which is a memory location that serves as a buffer or quarantine for embeddings that were close enough to the voiceprint to verify the speaker, but not similar enough to the voiceprint to update the voiceprint, possibly due to poor audio quality or background noise. The system may calculate new similarity scores for the stored weak embedding and utterance against the voiceprint as the server updates the voiceprint (other aspects of the machine-learning architecture) to determine if the stored weak embedding and utterance become similar enough to the updated voiceprint to exceed the higher threshold and may therefore add the utterance as a new utterance to the model. In some embodiments, the server also includes one or more lists of strong embeddings that were used by the server to generate the voiceprint.

Unsupervised Clustering

A voice biometrics system may be able to identify multiple speakers at a time using an unsupervised clustering method. The server generates clusters by executing any number of clustering algorithms or operations for calculating similarity scores, and may reference any number of features or types of data, including the voiceprints. The clusters are associated with multiple speakers up to a threshold number of speakers and identify speakers in real-time based on utterances that are the most similar to a speaker's respective cluster. For example, a media content server of a media service issues a subscriber identifier to a household or power user of the household and then allocates a predetermined number of users in a media database. The speaker profile database generates one or more speaker profiles according to the number of users associated with the subscriber identifier. The server performing the clustering operations references the speaker profile or media database to determine the number of users allocated to the subscriber identifier and employs that allocated number of users as the threshold number of speakers. Based on the clustering operations, such as comparing multiple embeddings extracted for multiple speakers in an inbound audio signal, the server generates similarity scores, identifies the closest matched voiceprints, and compares the similarity score of the nearest voiceprints against the similarity thresholds of the respective voiceprints or against a default similarity threshold.

A voice biometrics system may use incremental clustering (e.g., sequential clustering) and/or organizational clustering (e.g., hierarchical clustering) techniques to build clusters for individual speakers to ensure an efficient and accurate clustering method that can be used for passive and continuous enrollment and authentication. The system may employ incremental clustering operations unless a particular criterion is met (e.g., it is a scheduled time, a scheduled time interval has passed, the system has processed a predetermined number of utterances since the system previously used hierarchical clustering, the system has identified a number of speakers that exceeds a threshold, etc.), in which case the system may execute organizational clustering operations.

To use sequential clustering, for example, a voice biometrics system may determine similarity scores for a new utterance against a group of existing clusters. The system may identify the highest similarity score and determine if the similarity score exceeds a predefined threshold. If the similarity score exceeds the threshold, the system may add the utterance to the cluster associated with the similarity score. Otherwise, the system may create a new cluster with the utterance as the first utterance. The system may implement sequential clustering for each new utterance that it ingests to maintain up-to-date speaker embedding models for individual speakers while minimizing the processing resources required to do so.

To use hierarchical clustering, for example, a voice biometrics system may access each of the stored utterances in the system and shuffle the utterances between the clusters. The system may compare each of the utterances of the clusters with each other and cluster the utterances together that have the highest similarity. Additionally or alternatively, the system compares the voiceprints against one another to combines those voiceprints with the highest similarity scores that also match a voiceprint similarity threshold.

Because each clustering methodology has its own advantages and disadvantages (e.g., incremental clustering may be faster but less accurate while organizational clustering may be more accurate but require a large amount of computer resources), using a combination of the two methodologies over time may cover the deficiencies of both methods and enable the system to create mature and accurate speaker embedding models. The system may execute incremental clustering operations intermittently with organizational clustering operations to improve the accuracy of the speaker embedding models while avoiding using organizational clustering too often to save processing resources. The combination ensures efficient and accurate clustering that is appropriate for passive and continuous enrollment and authentication.

Label Correction

Using reorganizing clustering operations may require a voice biometrics system to implement a set of label correction operations. For example, to accurately migrate labels to anonymous clusters (e.g., newly generated clusters, unassigned clusters) created through reorganizational re-clustering operations, a system may compute pairwise similarities between clusters from the unorganized clusters and the clusters that were organized using the reorganizing operations. The system may create a similarity matrix by computing the pairwise similarities between each of the old and new clusters and identify the clusters that are the most similar to each other as matching clusters. The system may migrate the labels from the old clusters to the new matching clusters. Because the system may store associations between the labels and information about the labels (e.g., content preferences), the system may create and/or maintain associations between the new clusters and any information that was associated with the previous clusters through the migrated labels.

Content Personalization and Control

Some over-the-top services may create, or use third-party services to create, profiles for individuals as the individuals use the respective service to provide content (e.g., picture content, video content, audio content, etc.) or recommendations for content to the individuals. These services may do so from active inputs by the individuals (e.g., users may input preferences indicating the types of content they prefer or provide information about themselves such as their age) or the services may maintain profiles about individuals in a database and identify the different types of content that the users view while using the over-the-top services. By implementing the systems and methods described herein, a system may use voice data received from an over-the-top service (e.g., via an edge device) to identify individuals that are using the service to view content and provide identifiers of the individual to a service to provide the individual with relevant content.

For example, a voice biometrics system may receive utterances from a speaker and use machine-learning techniques (e.g., clustering and/or a neural network architecture) to identify a speaker profile for the speaker from a speaker profile database (sometimes called an "analytics database") maintained by the system. The system retrieves one or more identifiers of a speaker (or the speaker's household, a group associated with the speakers, etc.) from the speaker profile and indicates the speaker to the media service. The media service can use the identifier to identify a profile associated with the identifier (e.g., a consumer profile, user profile) from a media content database that the service maintains. The service can provide content and/or content suggestions to the speaker or the speaker's edge device based on the profile associated with the identifier. In some cases, the system can identify the content to provide to the speaker or edge device based on the speaker's identifier itself. Because the system may determine the identifiers in an unsupervised system as anonymized identifiers (e.g., hashed versions of the identifiers), the identifiers may maintain the anonymity of speakers so neither the system nor the over-the-top service can obtain, from the identifiers, personally identifying information about specific individuals for which the system or service serve content.

In some cases, a voice biometric system may use speaker profiles for age-related parental controls. To do so, the system may store associations between the speaker profiles and flags indicating age-related characteristics of the speaker (e.g., whether the person is above a particular age or the age of the speaker). The system may obtain the age characteristics associated with the profiles through a user input or automatically based on utterances that the system uses to build the speaker's profile. In some cases, the system may receive the age characteristics from a third-party service. The system may provide the age-related characteristics to an over-the-top service to use to select content to provide to a speaker or to otherwise stop a speaker from viewing content if the individual does not satisfy an age-related speaker characteristic.

In some cases, a voice biometric system may use the systems and methods described herein to stop speakers from spoofing other speakers to view content associated with the speaker profile of the spoofed speaker (e.g., in a replay attack in which an individual plays a recording of another speaker). For example, a child may play a recording of the child's parents speaking to overcome age-related restrictions of an over-the-top service. The system may detect that the child is playing the recording and, instead of identifying the speaker profile of the child's parent, generate an alert and/or transmit a signal to the over-the-top service indicating the child is attempting to spoof his or her parents to stop the service from providing age-restricted content to the child. Thus, the system may determine whether an individual is spoofing another individual and generate an alert to stop the service from providing unauthorized users with content.

To prevent replay attacks, the server may evaluate additional authentication data received from the speaker and compare the authentication data against expected authentication data, such as an additional password or passphrase or other required information.

In some embodiments, the server prevents replay attacks by evaluating various types of data and features for spoofing conditions. The server executes a machine-machine learning architecture model trained to assess the inbound audio signal for artifacts indicating the spoofing condition, as described in U.S. application Ser. No. 15/910,387, issued as U.S. Pat. No. 10,692,502, which is incorporated by reference herein. A replay attack comprising a recording of a parent's utterance may, in certain low level features, include qualities found in a played-back recording that are typically not present in actual, live utterances. For example, a recorded audio sample may consistently introduce audio artifacts related to frequency, frequency range, dynamic power range, reverberation, noise levels in particular frequency ranges, and the like, at least some of which artifacts may be imperceptible without using specialized speech processing techniques and/or equipment such as disclosed herein. The machine-learning architecture includes a spoof-detection classifier trained to discriminate between such spoofing conditions (e.g., qualities, artifacts) and genuine inbound utterances. The server references the voiceprint for the parent to identify potential spoofing conditions. For example, the parent may consistently provide utterances using only a particular device that generates audio signals having specific low-level audio qualities and thus yields embeddings based upon those qualities and a parent voiceprint based upon the particular, consistent low-level features. The speaker profile may capture and store the particular types of low-level features for later use in distinguishing spoofed and genuine access. When a child enters an inbound replay utterance, the server determines the similarity score and/or a spoofing score based upon comparisons of an inbound replay embedding against the parent voiceprint and the inbound replay embedding against artifact features used to generate the parent's voiceprint score. Additional examples of spoof detection that may be implemented by the server to prevent replay attacks can be found in U.S. application Ser. No. 17/192,464, which is incorporated by reference herein.

Device Personalization and Control

Some devices may use speaker profiles, such as those described herein, to configure and/or customize edge devices. For example, a system may store voice profiles locally on a car (or in the cloud with an identifier associated with the car), with each voice profile associated with configurations for the car. An individual associated with one speaker profile may be associated with one or more of a temperature, radio volume, window setting, etc., and another individual may be associated with different settings. The system may store profiles for multiple individuals so when the system ingests an utterance and identifies a speaker profile based on the utterance, the system may communicate with the other applications of the device to automatically adjust the configurations of the device based on the settings of the speaker profile.

Example System Components

Audio Processing for Media Content System

For ease of description and understanding, the embodiments described herein describe computing systems that employ audio-processing and user data analytics in the context of content delivery systems. Embodiments, however, are not limited to such implementations, and may employ the processes described herein for any number of systems that might benefit from, for example, passive or active speaker identification, or continuous or static speaker identification, for processing individual or multi-speaker voice biometrics. Nearly any system that receives, processes, and identifies speakers in audio inputs may implement the systems and processes for multi-speaker identification or authorization of multi-speaker voice biometrics described herein. Non-limiting examples of systems that might employ the audio processing and data analytics herein include IoT devices (sometimes called edge devices) (e.g., smart appliances, vehicles), call centers and similar help desks or service centers, secure authentication systems or services (e.g., office or home security), and surveillance or intelligence systems, among others.

Moreover, the embodiments herein employ audio processing operations to identify speakers as particular known or unknown users. Embodiments, however, are not limited solely to voice biometrics, but may ingest and process any number of additional types of biometrics for identifying speakers as particular users. Non-limiting examples of the additional types of biometrics that embodiments may ingest and process include eye scans (e.g., retina or iris recognition), faces (e.g., facial recognition), fingerprints or handprints (e.g., fingerprint recognition), user behaviors (e.g., "behavior prints") when accessing a monitored system (e.g., keypresses, menu accesses, content selection, rate of inputs or selections), or any combination of biometric information.

FIG. 1 shows components of a system 100 employing audio-processing machine-learning operations. The system 100 comprises an analytics system 101, a content system 110, and end-user devices 114. The analytics system 101 includes analytics server 102, analytics database 104, and admin device 103. The content system 110 includes content servers 111, and content databases 112. Embodiments may comprise additional or alternative components or omit certain components from those of FIG. 1, and still fall within the scope of this disclosure. It may be common, for example, to include multiple content systems 110 or for the analytics system 101 to have multiple analytics servers 102. Embodiments may include or otherwise implement any number of devices capable of performing the various features and tasks described herein. For example, the FIG. 1 shows the analytics server 102 in as a distinct computing device from the analytics database 104. In some embodiments, the analytics database 104 is integrated with the analytics server 102.

The various components of the system 100 are interconnected with each other through hardware and software components of one or more public or private networks. Non-limiting examples of such networks may include: Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols.

Overview and Infrastructures

An analytics service provides customers, such as a media content service or enterprise call centers, computing services for audio processing and analyzing data received from end-users. Non-limiting examples of the analytics services include user identification, speaker recognition (e.g., speaker diarization), user authentication, and data analytics about the end-users. The analytics service operates the analytics system 101 comprising various hardware, software, and networking components configured to host and provide the analytics services to one or more content systems 110 of one or more media content services (e.g., Netflix®, TiVO®).

The content media service operates the content system 110 comprises hardware, software, and networking components configured to host cloud-based media services, such as over-the-top (OTT) or digital streaming services, providing media content to end-user devices 114. The content system 110 identifies and provides personalized content for the end users, such as content recommendations, content restrictions (e.g., parent controls), and/or advertisements.

In operation, the provider server 111 (of the content system 110) receives various types of input data from the end-user devices 114 and forwards the input data to the analytics server 102 (of the analytics system 101). The analytics server 102 executes various analytics processes described herein using the input data forwarded from the provider server 111, and then transmits various outputs to the provider server 111 resulting from the analytics processes. The provider server 111 employs the outputs received from the analytics server 102 to, for example, identify and generate the personalized content that is based on, for example, user operations or behaviors (e.g., viewing habits), interactions between the end-user devices 114 and the content system 110, characteristics of users (e.g., age), and the user identities, among other types of information for content personalization.

The content system 110 or the analytics system 101 might ordinarily identify a user based on, for example, subscription information (e.g., subscriber identifier) or user credentials (e.g., username, password), but the analytics system 101 described herein additionally or alternatively identifies the user (on behalf of the content system 110) based on the user inputs and spoken utterances captured by the end-user devices 114.

In some cases, the end-user device 114 actively captures user input data, where the end-user actively interacts with the end-user device 114 (e.g., speaking a "wake" word, pressing a button, making a gesture). In some cases, the end-user device 114 passively captures the user input data, where the end-user passively interacts with the end-user device 114 (e.g., speak to another user, the end-user device 114 automatically capturing utterances without user's affirmative action). Various types of inputs represent the ways that users interact with end-user devices 114, such as sound or audio data captured by a microphone of the end-user device 114 or user inputs entered via a user interface presented by the end-user device 114. The captured sound includes the background noise (e.g., ambient noises) and/or utterances of one or more speaker-users. Additionally or alternatively, the user inputs can include videos (or images) of users (e.g., facial expressions, gestures) captured by or uploaded to the end-user device 114. The user inputs to the user interface can include interface inputs into a physical or graphical user interface, such as a touch input swiping across the device, using the device in a gesture, pressing buttons on the device (e.g., keypad dual-tone multi-frequency (DTMF) tones), inputting text, capturing biometric information such as a fingerprint, and the like.

The content server 111 receives the user inputs from the end-user devices 114 as user input data. The content server 111 performs various processing operations on the user input data, such as identifying or extracting various forms of metadata, performing one or more authentication operations using the user input data, anonymizing or obfuscating certain types of data (e.g., generating a hash of one or more identifiers), among other potential operations. The content server 111 may convert, modify, and/or enrich the user input data before transmitting the user input data to the analytics server 102. Non-limiting examples of the types of data in the user input data include audio signals, user interface inputs (e.g., user requests, user instructions), authentication inputs (e.g., user credentials, biometrics), various identifiers (e.g., subscriber identifiers, user identifiers), and various types of communications metadata, among others.

The analytics system 101 receives the audio signal as a data file or data stream, in any number of machine-readable data formats (e.g., WAV, MP3, MP4, MPEG, JPG, TIF, PNG, MWV), from the provider server 111. The audio signal may include speech in addition to background noise. In some configurations, before the analytics system 101 receives the audio signal, the content system 110 may tag the audio signal with information about the interaction, such as metadata or speaker-independent characteristics. Non-limiting examples of such information may include the time of interaction, date of interaction, type of end-user device 114, microphone type, place of interaction (e.g., bedroom, living room, restaurant), the particular end-user device 114 associated with an interaction (e.g., a particular smart TV 114a, a virtual assistant 114d), subscriber identifier associated with the interaction, unique identifier associated with the interaction (e.g. an automatic number identifier), and the like.

Components of the analytics system 101, such as the analytics server 102, generate voiceprints, update voiceprints, predict a similarity score, identify (or authenticate) speakers in the audio signal, and relabel voiceprints, in order to provide user identification services (or authentication services). The analytics system 101 may provide a similarity score (or label) associated with a speaker in the audio signal, to customers of the analytics system 101. For example, the analytics system 101 may transmit a speaker identifier to the content system 110 based on the audio signal associated with the interaction.

Content System

The content system 110 sends or streams media data to the end-user devices 114 of the subscribers. The subscriber represents the customer of the content system 110, but may also represent a collection of one or more users. For example, the subscriber could represent a household and members of a family and/or guests who access the services of the content system 110 using the end-user devices 114. The family may access media content if at least one member of the family registers as a subscriber to the content system 110. The provider server 111 transmits media content to the end-user devices 114 for the users (including subscribers and guests of the subscribers) based on various user interactions with end-user devices 114.

The components of the content system 110 capture the various types of input data (e.g., metadata) received from the end-user device 114, which the content system 110 adds to the input data forwarded to the analytics server 102 via one or more networks. Computing devices of the content system 110, such as content servers 111, assign inbound input data (including the audio signal) to a subscriber identifier before forwarding the input data to the analytics system 101. The subscriber identifier is a data value, tag, or other form of data that indicates a subscriber or customer of the content system 110. The subscriber identifier associates various types of data with the particular subscriber, including audio signal that the content system 110 received with a particular input from the particular subscriber.

The subscriber defines or otherwise associates a collection of users (e.g., household) who access the services of the content system 110 using the subscriber identifier common to the collection of users. In such cases, the content database 112 includes data records for each of the users (speakers), sometimes referred to as "speaker profiles." In operation, the analytics system 101 receives the subscriber identifier and audio signal for input data, though for privacy purposes the analytics system 101 need not include personally identifying information. For example, content server 111 generates and sends an anonymized version of the subscriber identifier or speaker identifier to the analytics system 101, thereby protecting the private information of the subscriber or particular users by preventing the private information of the subscriber from being directly transmitted (or otherwise ascertainable) to the analytics system 101.

The content system 110 stores media and subscriber information in the content database 112, enabling the content system 110 to identify the subscribed users (e.g., the account of the subscriber) associated with the subscriber identifier. For example, the content database 112 stores subscriber data records containing the subscriber identifier, audio signal (including speaker identifiers received from the analytics system 101, user characteristics, speaker-independent characteristics, and other metadata) and subscriber account in a lookup table.

The content system 110 forwards the audio signal (with the subscriber identifier) to the analytics system 101 according to preconfigured triggering conditions. For example, the content system 110 receives audio signal from the end-user device 114 and forwards the audio signal to the analytics system 111. The audio signal includes, for example, one or more utterances in which a user requests media content (or other services) from the content system 110. That content system 110 may forward the audio signal associated with the request to the analytics system 101 to identify the user with respect to a set of users in real-time. The analytics system 101 may transmit speaker information (e.g., speaker characteristics, speaker identifiers, speaker-independent characteristics, metadata) to the content system 110. The content system 110 may respond to the speaker request with personalized content using the user information. In some cases, the content server 111 may forward the audio signal to the analytics system 101 in response to instructions or queries received from another device of the system 100, such as the analytics server 102, or admin device 103.

Content Server

In some embodiments, the content server 111 may host and execute software processes and services for identifying speech in the audio signal, transforming audio signal from one format to audio signal of a different format (e.g., transforming media files from a WAV file format to an MP3 file format), pre-processing the audio signal, anonymizing the audio signal (e.g., associating a hash identifier with the audio data), extracting biometric features associated with speakers in the audio signal, and the like. For example, the content server 111 is configured to detect audio events in the audio signal. The content server 111 may also be configured to preform automatic speech recognition (ASR) on the audio signal to capture the content of the audio signal (e.g., the user request to consume content).

The content server 111 provides content to a user actively interacting with an end-user device 114. For example, the user may speak to the end-user device 114. The content server 111 may also provide content to a user passively interacting with an end-user device 114 (e.g., to users speaking within a predetermined proximity to the end-user device 114). The content server 111 may transmit user interface data or content (e.g., computer files, data stream), including recommendations of television shows or advertisements, to speakers based on the identity of speakers, as indicated by the analytics server 102.

Content Database

The content database 112 of the content system 110 stores various types of data records, including subscriber data, speaker profiles, and media content for streaming to the end-user devices 114. For example, the content database 112 may store a library of content. The content database 112 may also store the audio signal, speaker identifiers, speaker characteristics, speaker-independent characteristics, and other metadata associated with the interaction received from the end-user devices 114 or the analytics server 102.

The content database 112 may also store the subscriber information, such as the owner or household of the account, the allowed number of users on the account, the allowed number of devices associated with the account, the current number of users associated with the account, the current number of devices associated with the account, the allowed geographic area of operation (e.g., the account may be prohibited in some countries and allowed in others), purchase options (e.g., requiring a password before every purchase), billing information (e.g., credit card information, billing address, shipping address), identifiers associated with the subscriber (e.g., subscriber identifier, household identifier), speaker identifiers associated with the subscriber identifier, anonymizing information (e.g., a hash function, encryption key), and the like.

The subscriber profile or user profile of the content database 112 may store viewing history, speaker information (e.g., name, age, birthday, gender, religion), security credentials (e.g., login credentials, biometrics), and preferences for particular speakers. Non-limiting examples of preferences may include the content that the speaker historically viewed, liked, bookmarked, or that the user otherwise indicated an interest in, and the like. In operation, the content server 111 identifies the particular speaker based on login credentials or metadata, or as determined by the analytics server 102, and determines certain media for the speaker based on the preferences. The subscriber profile comprises or is associated with one or more speaker profiles. In some cases, a speaker profile of the content database 112 corresponds to a speaker profile stored in the analytics database 104 (sometimes referred to as a speaker database).

In some implementations, the subscriber or speaker profile includes content restrictions or controls (e.g., parental controls for minor users) that instruct the content server 111 to inhibit delivery of certain media to certain speakers. The content restrictions (in the subscriber or user profiles) correspond to age appropriate ratings (e.g., R, PG-13, TV-MA) or content characteristics stored in the media data records of the content database 112. The content characteristics are data values indicating parent/discretion advisories or extreme or objectionable types of content, such as tobacco/drug use, strobing lights, nudity, and violence, among others. The content characteristics correspond to user or speaker characteristics stored in the content database 112 or analytics database 104 as user or speaker profile information.

At least one user profile of the subscriber profile is designated a power user profile (e.g., speaker profile of a parent) having privileges to configure the content restrictions for the entire subscriber profile (e.g., household) or for particular users (e.g., children speakers). The power user operates a user interface of the end-user device 114 to input various content restriction configurations into a configuration interface. The content restriction configurations indicate and configure the content restrictions according to a particular user profile identifier (e.g., user name), the user age, or the particular content/speaker characteristics. The content server 111 might ordinarily determine that a particular user logged into the content service by referencing a user identifier of the user. The content server 111 receives the user identifier in the login credentials (containing the user identifier) or uses a speaker identifier returned from the analytics server 102 to identify the user identifier in the content database 112. The content server 111 uses the user identifier to query the content database 112 and determine the level of privileges assigned to the particular user and any corresponding content restrictions.

In some embodiments, the configuration restrictions further indicate the means for disabling or updating the content restrictions, such as an additional challenge input (e.g., PIN, password) or biometric input (e.g., fingerprint, voiceprint). In operation, after the analytics server 102 identifies the particular user (e.g., speaker) from the input data (e.g., the audio signal), the content server 111 references the content database 112 to identify the content restrictions assigned to the user and applies the content restrictions on the content requested, queried, or presented to the user according to the age appropriate ratings or the content characteristics stored in the media data records.

End-User Devices

The end-user devices 114 may be any device that the user operates to control any audio or visual interface or otherwise operate the content services. Non-limiting examples of end-user devices 114 may include a smart TV 114a, a remote controller 114b, a set-top box 114c, or an IoT device, such as a virtual assistant 114d or other edge device or mobile computing device. The smart TV 114a may be a TV configured to connect to a network such as an Internet network and configured with a microphone and/or camera. The TV remote controller 114b may be a controller configured to control content displayed on a TV. The set-top box 114c (e.g., cable box, Slingbox, AppleTV, Roku Streaming Stick, TiVo Stream, Amazon Fire) includes any media streaming and/or storage device comprising a processor and non-transitory storage media and configured to perform the various processes described herein. The set-top box 114c may communicate with the media content system 110 via one or more networks to upload and download various types of content, user, and device information. The IoT device may be a telecommunication-oriented device (e.g., cell phone) or computing device configured to implement voice-over-IP (VoIP) telecommunications or other network communication (e.g., cellular, internet). The IoT device comprises hardware and software components configured for data streaming via TCP/IP network or other computing network channel. The personal assistant 114d may be a virtual assistant device (e.g., Alexa®, Google Home®), smart appliance, automobile, or other smart device capable of executing software applications and/or performing voice interface operations.

The end-user devices 114 may comprise a processor and/or software capable of using communication features of a paired or otherwise networked device. The end-user devices 114 may be configured with a microphone, accelerometer, gyroscope, camera, fingerprint scanner, interaction buttons (such as directional buttons, numeric buttons), joysticks, or any combination, and the like. The end-user devices 114 may comprise hardware (e.g., microphone) and/or software (e.g., codec) for detecting and converting sound (e.g., spoken utterance, ambient noise) into electrical audio signals. The content system 110 may collect and store the audio signal in the content database 112, though the analytics system 101 typically avoids storing the audio signal or purges any audio signals stored in memory.

The content server 111 receives the input data from the end-user devices 114 and may perform various pre-processing operations, such as converting an audio signal of the input data, identifying and associating the subscriber identifier with the input data, or storing various features of the audio signal in the content database 112. The content server 111 then forwards the audio signal (and subscriber identifier) to the analytics server 102 (of the analytics system 101) via one or more networks.

The content server 111 temporarily stores the audio signal into non-transitory machine-readable storage media, such as a buffer or cache memory, for a predetermined amount of time. Additionally or alternatively, the content server 111 stores the audio signal into the content database 112.

The content server 111 forwards the input data (e.g., audio signal, metadata) to computing devices (e.g., analytics server 102) of the analytics system 101. In some configurations, the content server 111 transmits the input data to the analytics server 102 according to preconfigured triggering conditions, such as a predetermined interval or in response to the content server 111 receiving the input audio signal from the end-user device 114.

In some embodiments, the content server 111 or end-user device 114 continuously captures and stores sound recordings, even before the end-user device 114 detects an active input (e.g., wake word) from a user. For example, when a group of people discusses what to watch, the end-user device 114 captures the sound. After the group decides a particular show to watch, the group will typically go silent and one person will say the wake word and announce the show that the group decided to watch. Because the group has gone silent, the end-user device 114 and the content server 111 benefit from capturing and storing the sound of the group debate for some period of time before the wake word. In this way, the content server 111 and the analytics server 102 review audio signals beginning some amount of time before the active input. In such embodiments, when the user operates the end-user device 114 to capture sound actively, the content system 110 retrieves stored audio signals captured by the end-user device 114 an amount of time before the user actively operated the end-user device 114. The content system forwards both the audio signals associated with the triggering condition and the retrieved audio signals to the analytics server 102.

The analytics server 102 uses the received audio signals and, in some embodiments, additional types of data (e.g., subscriber identifier, user credentials, metadata) to determine a speaker identifier. The analytics server 101 transmits the speaker identifier (and speaker characteristics, speaker-independent characteristics, and other metadata) to the content server 111. The content server 111 maps the speaker identifier to a subscriber identifier and/or to information regarding a particular speaker to determine the content that the content server 111 needs to deliver to the speaker.

Analytics Server

The analytics server 102 may be any computing device comprising one or more processors and software, and capable of performing the various processes and tasks described herein. The analytics server 102 may host or be in communication with databases 112, and 104, and may receive audio signals, speaker-independent characteristics, and a subscriber identifier from a content system 110. Although FIG. 1 shows a single analytics server 102, the analytics server 102 may include any number of computing devices. In some configurations, the analytics server 102 may comprise any number of computing devices operating in a cloud computing or virtual machine configuration. In some embodiments, computing devices of the content system 110 (e.g., content server 111) partly or entirely perform functions of the analytics server 102.

The analytics server 102 executes various software-based processes that, for example, ingest the inputted audio signal (e.g., audio recording of speaker utterances, subscriber identifier, user identifier, metadata) from the content server 111, queries an analytics database 104, and applies various machine-learning operations on the audio data. The machine-learning algorithms implement any number of techniques or algorithms (e.g., Gaussian Matrix Models (GMMs), neural networks) for performing the various operations described herein, such as detecting audio events, extracting embeddings, generating or updating enrolled voiceprints, and identifying/authenticating one or more users having utterances in the audio signal.

The analytics server 102 queries speaker profiles stored in the analytics database 104 to identify known or new speakers in the audio signals, generates new or temporary speaker profiles, and/or updates speaker profiles of the analytics database 104. Using the subscriber identifier or other metadata received with the audio data, the analytics server 102 identifies the voiceprints associated with the received subscriber identifier (e.g., suspect voiceprints), creates a similarity matrix between pairs of embeddings, clusters similar embeddings based on the distances of each of the embeddings, creates a similarity matrix of similarity scores, determines a maximum similarity score using various thresholds, determines strong embeddings and weak embeddings, stores weak embeddings in the analytics database 104, updates voiceprints using strong embeddings, and identifies a speaker by evaluating the voiceprint associated with the maximum similarity score.

Embedding Extraction

The analytics server 102 execute machine-executed software for implementing one or more machine-learning architectures comprising any number of layers configured to perform certain operations, such as audio data ingestion, pre-processing operations, data augmentation operations, embedding extraction, loss function operations, and classification operations, among others. To perform the various operations, the one or more machine-learning architectures comprise any number of models or layers, such as input layers, layers of an embedding extractor, fully-connected layers, loss layers, and layers of a classifier, among others. The analytics server 102 executes audio-processing software that includes the one or more machine-learning models and layers. For ease of description, the analytics server 102 is described as executing a single machine-learning architecture having the embedding extractor, though multiple machine-learning architectures (including neural network architectures) could be employed in some embodiments.

The analytics server 102 receives the audio signal from the content server 111 and extracts various types of features from the audio signal. The analytics server 102 performs audio event detection or other voice activity detection to differentiate between background noise, silence, and speakers in the audio signal. For example, the analytics server 102 may pre-process the audio data (e.g., filtering the audio signal to reduce noise, parsing the audio signal into frames or sub-frames, performing various normalizations or scaling operations), execute voice activity detection (VAD) software or VAD machine learning, and/or extract features (e.g., one or more spectro-temporal features) from portions (e.g., frames, segments) or from substantially all of the audio signal. The features extracted from the audio signal may include Mel frequency cepstrum coefficients (MFCCs), Mel Filter banks, Linear filter banks, bottleneck features, and the like.

In some embodiments, the content server 111 applies a VAD or ASR engine on the input audio signal that the content server 111 receives from the end-user device 114. The content server 111 transmits the speech portions of the input audio signal to the analytics server 102, and the analytics server 102 applies the machine-learning model for speaker recognition (e.g., embedding extractor) on the input audio signal.

The analytics server 102 extracts embeddings from the audio signal using a neural network architecture (e.g., a deep neural network (DNN), a convolutional neural network (CNN)), Gaussian mixture models (GMM), or other machine learning methods. The analytics server 102 may represent the embeddings using x-vectors, CNN vectors, i-vectors, and the like.

As an example, the analytics server 102 may train a machine learning architecture to perform VAD operations parsing a set of speech portions and a set of non-speech portions from the audio signal. When the VAD is applied to the features extracted from the audio signal, the VAD may output binary results (e.g., speech detection, no speech detection) or continuous values (e.g., probabilities of speech occurring) for each frame (or sub-frame) of the audio signal. The speech portions of the audio signal may be called utterances. The audio signal may include utterances of multiple speakers. The audio signal may also include overlapping sounds (e.g., utterances and ambient background noise). The analytics server 102 may determine the beginning and end of an utterance using speaker detection or other conventional speaker segmentation solutions.

In some embodiments, the content server 111 executes a VAD or ASR machine-learning model to identify speech portions in user inputs that the content server 111 received from the end-user devices 114. In such embodiments, the content server 111 transmits the speech portions of the audio signals containing the utterances of one or more speakers to the analytics server 102. The analytics server 102 need not execute the VAD or ASR operations prior to extracting embeddings.

Countering Replay Attack

The analytics server 102 may determine whether the audio signal captured by the end-user device 114 is a bona fide audio signal or a replay attack (e.g., audio signal captured by a microphone in a physical and reverberant space and represented to a microphone of an end-user device 114 using a replay device). In determining whether the speech portions of audio signal are replay attacks, the analytics server 102 may ingest, determine, or query the content system 110 for speaker-independent characteristics such as the end-user device 114 type and the microphone type. In addition, the analytics server 102 may apply one or more trained machine learning models to on the inbound audio signal to identify spoofing conditions based upon various artifacts in the inbound audio signal and corresponding artifact-features in the parent's voiceprint.

Active and Static Enrollment

The analytics server 102 can employ a machine learning architecture to recognize a particular speaker during an enrollment phase for a particular enrollee-speaker. The machine learning architecture can generate an enrollee voice feature vector (sometimes called a "voiceprint") using enrollee audio signals having speech segments (or utterances) involving the enrollee. During later active or passive operations with the end-user devices 114, analytics server 102 extracts embeddings from captured audio signals and compares the embeddings to voiceprints in order to confirm whether the later captured audio signals involve the enrollee.

The analytics server 102 enrolls users during the enrollment phase (e.g., a predetermined enrollment time). For example, the analytics server 102 may actively enroll users during initialization of a new end-user device 114. Additionally or alternatively, the analytics server 102 may actively enroll users annually (e.g., to update existing voiceprints, generate new voiceprints for new users).

During an enrollment phase, the analytics server 102 may prompt a user for an enrollment phrase that the users repeats until the analytics server 102 receives enough utterances (e.g., speech portions of audio signal) to recognize a particular speaker using the speaker's voiceprint.

The analytics server 102 creates a voiceprint based on enrollment embeddings during the enrollment phase. During the enrollment phase, the analytics server 102 extracts embeddings from one or more utterances such that the analytics server 102 can mathematically identify the user of a particular signal. The analytics server 102 may determine that enough embeddings have been extracted during the enrollment phase when the analytics server 102 receives a duration of net speech exceeding a threshold. Additionally or alternatively, the analytics server 102 may determine that enough embeddings have been extracted during the enrollment phase when the analytics server 102 a predetermined number of enrollment signals (e.g., two fingerprint scans and two utterances, five different utterances).

Continuous and Passive Enrollment

Additionally or alternatively, the analytics server 102 continuously enrolls users. Instead of enrolling users at predetermined (or designated) time periods as in static enrollment, the analytics server 102 may enroll users any time by creating voiceprints associated with the received utterances. Because the utterances received during continuous and passive enrollment may be utterances of any duration or quality, the maturity of the voiceprints created during continuous and passive enrollment may vary.

For example, the analytics server 102 may receive an audio signal (and a subscriber identifier) forwarded from the content server 111. The analytics server 102 may extract features and embeddings from the audio signal using VAD software, embedding extractor models, or other machine-learning models. The analytics server 102 applies the machine-learning architecture on the audio signal to extract the embedding for the particular speaker.

Unsupervised Clustering

In some embodiments, the analytics server 102 may receive a subscriber identifier forwarded from the content server 111. The analytics server 102 queries the analytics database 104 and retrieves voiceprints associated with the received subscriber identifier. The voiceprints are putative voiceprints for the embeddings based on the association with the subscriber identifier. Each voiceprint and associated unique speaker identifier is linked to at least one subscriber identifier.

In some embodiments, the analytics server 102 may not receive a subscriber identifier forwarded from the content server 111. Instead of evaluating the similarity of the embeddings and the voiceprints associated with putative speaker clusters (the speaker cluster being a putative speaker cluster based on an association with a subscriber identifier), the analytics server 102 will evaluate the similarity of the embeddings with a set of voiceprints. The set of voiceprints may include voiceprints that have recently (e.g., within a predetermined amount of time) been transmitted to the analytics database 104, voiceprints associated particular speaker characteristics, and voiceprints associated with particular speaker-independent characteristics.

The analytics server 102 may cluster (or otherwise associate similar embeddings) using sequential clustering algorithms (e.g., k-means clustering). The analytics server 102 may cluster the voiceprints by creating a similarity matrix and determining the similarity of each of the clusters (voiceprints) to other voiceprints. In some configurations, the analytics server 102 may evaluate the similarity of the clusters to the voiceprints by evaluating the distance of each of the embeddings in the cluster to a centroid of a voiceprint. If the similarity of the clusters satisfies one or more thresholds, the analytics server 102 may merge the two voiceprints into a single voiceprint (e.g., taking the average of the voiceprints).

In some implementations, the analytics server 102 clusters inbound and/or stored embeddings by, for example, randomly generating a centroid and associating embeddings with the centroid. The analytics server 102 clusters embeddings based on relative distances between the embeddings and the centroid. The analytics server 102 moves the centroid to a new relative location based on minimizing the average distance of each of the embeddings associated with the centroid. Each time the centroid moves, the analytics server 102 recalculates the distances between the embeddings and centroid. The analytics server 102 iterates the clustering process until a stopping criteria is met (e.g., embeddings do not change clusters, the sum of the distances is minimized, a maximum number of iterations is reached). In some configurations, the analytics server 102 measures the distances between the embeddings and the centroids using Euclidean distance. In some configurations, the analytics server 102 measures the distances between the embeddings and the centroids based on the correlation of the features in the embeddings. The distance between the embeddings and the centroids are indicated using a similarity score. The more similar the embeddings are to the centroid, the higher the similarity score. The analytics server 102 tracks the similarity scores between each of the embeddings and centroids in a similarity matrix.

Additionally or alternatively, the analytics server 102 may treat each embedding as a centroid. The analytics server 102 clusters the embeddings based on the distances of the centroid embedding to the other embeddings. Distance measures may include, for example, the smallest maximum distance to other embeddings, the smallest average distance to other embeddings, and the smallest sum of squares of distances to other embeddings.

The analytics server 102 may also cluster embeddings with voiceprints using sequential clustering algorithms. The clusters represent a collection of utterances similar to a particular speaker (e.g., a speaker cluster) where a voiceprint represents the centroid for the speaker cluster. The analytics server 102 identifiers speaker clusters using speaker identifiers. The speaker identifier anonymizes the speaker, protecting the private information of the speaker by distinguishing one speaker cluster from another speaker cluster.

In some configurations, the analytics server 102 associates metadata (or speaker characteristics, speaker identifiers) with the voiceprint. The metadata associated with the voiceprint can include a quality of the audio signal. For example, the audio signal may contain utterances in clean conditions (e.g., a high signal-to-noise (SNR) ratio, a low reverberation time (T60)). Additionally or alternatively, the audio signal may contain utterances in noisy conditions (e.g., low SNR, high T60). Metadata can also include an overall duration of net speech. The analytics server 102 may determine the duration of speech by summing the durations of each of the utterances in the speaker cluster. Metadata can also include a total number of utterances in the speaker cluster, speaker characteristics, speaker identifiers, and/or speaker-independent characteristics.

The analytics server 102 may also determine speaker characteristics based upon information inputted by the speaker, received from the content server, or identified by executing the various machine-learning models. The speaker characteristics may include, for example, the age of the speaker, the gender of the speaker, an emotional state of the speaker, the dialect of the speaker, the accent of the speaker, and the diction of the speaker, among others. In some embodiments, for example, the analytics server 102 may identify certain speaker age characteristics by applying machine-learning models, such as those described by Sadjadi et al., "Speaker Age Estimation On Conversational Telephone Speech Using Senone Posterior Based I-Vectors" IEEE ICASSP, 2016, and Han et al., "Age Estimation from Face Images: Human vs. Machine Performance," ICB 2013. And in some embodiments, the analytics server 102 may identify certain speaker gender characteristics by applying machine-learning models, such as those described by Buyukyilmaz et al., "Voice Gender Recognition Using Deep Learning," Advances in Computer Science, 2016. Each of the above-mentioned references in this paragraph is incorporated by reference herein.

The analytics server 102 may create a voiceprint associated with a speaker based on one or more embeddings. In some configurations, the analytics server 102 creates a voiceprint using a mature embedding cluster (e.g., a cluster based on enrollment embeddings). The mature voiceprint (or mature embedding cluster) may contain sufficient biometric information for the analytics server 102 to identify the speaker using the speaker identifier. In some configurations, the analytics server 102 may create a voiceprint by averaging the enrollment embeddings. In some configurations, the analytics server 102 may associate metadata (or user characteristics, speaker identifiers) with the voiceprint.

The metadata associated with the voiceprint can include information about the utterances (represented by the embeddings) in the voiceprint. Metadata can include the quality of the audio data associated with a particular embedding (or with a voiceprint). For example, a microphone may capture audio data in clean conditions (e.g., a high signal-to-noise (SNR) ratio, a low reverberation time (T60)). A microphone may also capture audio data in noisy conditions (e.g., low SNR, high T60). Metadata can also include an overall duration of net speech. The analytics server 102 may determine the duration of speech by summing the durations of each of the utterances in the voiceprint. Metadata can also include a total number of utterances in the cluster. For example, the analytics server 102 may receive one 10-second utterance. Additionally or alternatively, the analytics server 102 may receive five one-second utterances. Metadata can also include user characteristics, speaker identifiers, and/or speaker-independent characteristics.

The analytics server 102 generates a similarity matrix of similarity scores. The analytics server 102 determines the similarity scores for each particular speaker by evaluating the relative distances between the embeddings extracted for a particular speaker and the voiceprints of other putative speakers stored in the database. Additionally or alternatively, the analytics server 102 may evaluate the similarity score using cosine similarity or probabilistic linear discriminant analysis (PLDA). The analytics server 102 determines the most similar embeddings to the speaker clusters by identifying a maximum similarity score between each of the embeddings and speaker clusters.

Strong and Weak Utterances

The analytics server 102 may evaluate the maximum similarity score using various thresholds. For example, the analytics server 102 may compare the maximum similarity score to both a lower threshold and a higher threshold. Additionally or alternatively, the analytics server 202 may employ one or more algorithms to combine the higher and lower threshold to estimate an optimal threshold for a particular voiceprint.

If the analytics server 102 determines that the maximum similarity score for a particular embedding fails the low similarity threshold, then the analytics server 102 determines that the speaker is likely a new unknown user. The analytics server 102 will generate a new speaker profile using the particular embedding. The speaker profile includes a voiceprint, a speaker cluster (e.g., embeddings associated with the voiceprint), a speaker identifier, and metadata.

If the analytics server 102 determines that the maximum similarity score satisfies the low similarity threshold, then the analytics server 102 may identify (or authenticate) the speaker. In addition, the analytics server 102 determines that that the embedding involved in the similarity score is a weak embedding based on a weak utterance. Weak embeddings lack enough similarity with the corresponding voiceprint for immediately characterizing the weak embedding as part of the particular speaker cluster. The analytics server 102 may store and/or update a set of weak embeddings in the analytics database 104.

The analytics server 102 may evaluate the set of weak embeddings based on triggering criteria. Non-limiting examples of triggering criteria include: periodic weak embedding evaluations and a threshold number of stored weak embeddings. In response to the analytics server 102 identifying a triggering criterion, the analytics server 102 may recalculate the similarity score of each of the embeddings in the set of weak embeddings to the voiceprint associated with the set of weak embeddings. The analytics server 102 may update the voiceprint with weak embeddings in response to the similarity score exceeding a threshold. Additionally or alternatively, the analytics server 102 may remove one or more weak embeddings from the set of weak embeddings.

If the analytics server 102 determines that the maximum similarity score satisfies the high similarity threshold in addition to the low similarity threshold, the analytics server may determine that the embedding involved in the similarity score is a strong embedding instead of a weak embedding. A strong embedding is an embedding that is very similar (e.g., close with respect to a relative distance) to the voiceprint. The analytics server 102 updates the speaker cluster to include the embedding. The analytics server 102 may recalculate the voiceprint based on the new embedding. The analytics server 102 may weigh embeddings identified as strong embeddings differently from embeddings not identified as strong embeddings. For example, the analytics server 102 may update the voiceprint by taking a weighted average of the embeddings. Additionally or alternatively, the analytics server 102 may update a list of strong embeddings associated with the known speaker.

The analytics server 102 may query the analytics database 104 for the set of weak embeddings based on triggering conditions. For example, the analytics server 102 may query the analytics database 104 periodically (e.g., weekly) or when the set of weak embeddings reaches a predetermined number. The analytics server 102 may re-calculate the similarity score of each of the embeddings in the set of weak embeddings to the voiceprint associated with the set of weak embeddings. Based on the maximum similarity score exceeding various thresholds (e.g., the lower threshold and/or the higher threshold), the analytics server 102 may update the voiceprint with the weak embedding. The weak embedding may become a strong embedding as the voiceprint evolves (e.g., ages, becomes more accurate and more mature) over time. Additionally or alternatively, the analytics server 102 may remove one or more weak embeddings in the set of embeddings associated with the voiceprint.

Condition-Dependent Adaptive Thresholding

The analytics server 102 may determine the higher and lower thresholds used in determining strong/weak embeddings adaptively. The analytics server 102 employs condition-dependent adaptive thresholding to determine the higher and lower thresholds based on the maturity of the voiceprint associated with the maximum similarity score.

If the analytics server 102 determines that the voiceprint is mature (e.g., satisfies a maturity threshold), then the analytics server 102 may not use high similarity thresholds and low similarity thresholds when evaluating the maximum similarity score. For example, the analytics server 202 may employ one or more algorithms to combine the high similarity thresholds and low similarity thresholds to estimate an optimal threshold for a particular voiceprint. The analytics server 102 uses the optimal threshold in evaluating the maximum similarity score of embeddings and voiceprints.

The analytics server 102 may determine whether the voiceprint is mature using one or more maturity factors. Non-limiting examples of the maturity factors include the number of enrollment utterances, the overall duration of net speech across the utterances, and the quality of the audio from the audio signals associated with the voiceprint. The analytics server 102 may employ any number of algorithms for determining whether the voiceprint is mature. For example, the server compares a maturity factor (e.g., number of utterances) against a preconfigured maturity threshold corresponding to the maturity factor (e.g., threshold number of utterances). As another example, the server statistically or algorithmically combines the maturity factors and compares the combined maturity factor against a preconfigured maturity threshold corresponding to the combined maturity factor.

If the analytics server 102 determines that the voiceprint is not mature (e.g., does not satisfy a maturity threshold), then the analytics server 102 employs condition-dependent adaptive thresholding to determine high similarity thresholds and low similarity thresholds for particular voiceprints.

The analytics server 102 minimizes a false acceptance rate (FAR) by utilizing the condition-dependent adaptive threshold. The false acceptance rate is the rate of the analytics server 102 falsely authenticates and/or identifies a speaker. An administrator (e.g., using admin device 103) may determine (or preconfigure) FAR (e.g., 0.5%, 1%, 2%, 3%, 4% or 5%). Additionally or alternatively, the content system 110 may request specific FARs associated with their speaker identification/authentication, or a machine-learning model may algorithmically determine the FAR.

Because the FAR varies based on the maturity of the voiceprint, the analytics server 102 applies different thresholds (e.g., high similarity thresholds and low similarity thresholds) to different voiceprints when evaluating the similarity of an embedding with a voiceprint. In some configurations, the analytics database 104 may store a table of thresholds (e.g., a threshold scheduler) at various FARs for one or more particular conditions.

Output

The analytics server 102 may transmit one or more speaker identifiers based on the audio signal to the content server 111. Additionally or alternatively, the analytics server 102 may transmit similarity scores associated with the speaker identifiers to the content server 111. The content server 111 may map the received speaker identifier with a human speaker (and a subscriber identifier, if the speaker identifier was not associated with a subscriber identifier earlier). For example, the analytics server may use a lookup table to map the speaker identifier to the particular human speaker. The analytics server 102 may also transmit the speaker profile (including the speaker-independent characteristics, speaker characteristics, metadata) associated with the speaker identifier.

The content system 111 may store preferences of a user associated with the speaker identifier. Non-limiting examples of preferences may include the content that the user historically viewed, liked, bookmarked, or that the user otherwise indicated an interest in, and the like. The content system 111 may stream personalized content to the speaker based on the received speaker identifier. If preferences associated with the speaker identifier are not stored (e.g., a new user), the content system 110 may stream generic content to the user.

The analytics server 102 may identify an environment setting representing the speaker or speakers current circumstances and environment. The machine-learning model executed by the analytics server 102 may include an audio event classification model and/or an environment classification model, such as background noise or specific sounds that are classifiable (e.g., dishwasher, trucks) or include overwhelming amount of energy to the inbound signal. The analytics server 102 may transmit the speaker identifiers to the content server 111 along with an indicator of the environment setting associated with certain content characteristics. For example, a speaker interacting with a smart TV 114a at a restaurant or party with only adult speakers may cause the content server 111 to generate different suggested content to the end-user device 114 from a different circumstance where the speaker interacts with a smart TV 114a in a living room including child speakers.

In some configurations, the content server 111 references the output of the analytics server 102 to limit access a particular subscription and the number of authenticated users. If the analytics server 102 has received the subscriber identifier from the content server 111, then the analytics server 102 may use the speaker profile (and associated speaker identifier, speaker characteristics, speaker-independent characteristics, metadata) to determine whether the speaker is authorized to access the subscriber account based upon authentication rules and limitations associated with the particular subscriber identifier. The analytics server 102 may transmit an indication of whether the speaker identifier is authorized with respect to the particular subscriber identifier to the content system 110. Additionally or alternatively, the content server 111 may authenticate a speaker using the speaker profile information with respect to certain restricted content. For example, a speaker's age, identified in the speaker profile, may authenticate one or more speakers to consume age-restricted content (e.g., based on parental controls or certain age appropriate ratings).

In some embodiments, the analytics server 102 enables the age-restricted content or instructs the content server 111 to enable the age-restricted content based upon the input data (e.g., inbound audio signal, authentication data, metadata, end-user device data 114) that the analytics server 102 received from the content server 111.

Label Correction

In some configurations, the analytics system 101 corrects label identifiers (e.g., speaker identifiers, subscriber identifiers). The analytics system 101 corrects labels by clustering (e.g., hierarchical clustering) voiceprints. Correcting label identifiers minimizes the likelihood of small cumulative identification/authorization errors, increasing the purity of the speaker clusters.

The analytics server 102 may correct the label identifiers of the voiceprints created during a deployment phase. The analytics server 102 corrects label identifiers before the label identifiers are transmitted to the content server 111. The analytics server 102 may also correct label identifiers of voiceprints stored in a database (e.g., content database 112, analytics database 104).

The analytics server 102 corrects label identifiers in response to identifying criterion triggering the label correction. Non-limiting examples of triggering criteria includes: a periodic time interval or preconfigured label-correction schedule; executing a clustering or re-clustering operation; identifying or otherwise receiving a certain number of new speaker identifiers; or generating a certain number of voiceprints, among others.

In some configurations, even if the analytics server 102 identifies triggering criteria, the analytics server 102 may determine not to correct label identifiers. The analytics server 102 may determine not to correct label identifiers if the voiceprints retrieved by the analytics server 102 are associated with a high confidence value. The analytics server 102 may associate a confidence value based on whether the analytics server 102 created the voiceprint during an active enrollment phase or a passive enrollment phase. The analytics server may determine that voiceprints created during an active enrollment phase have a higher confidence value than voiceprints created during a passive enrollment phase. The voiceprint created based on the active enrollment embeddings may be considered pure and mature. Additionally or alternatively, the analytics server 102 may determine not to correct label identifiers if the analytics system 101 is running slowly.

The analytics server 102 may query a database (e.g., content database 112 or analytics database 104) and retrieve a set of speaker profiles (including voiceprints, speaker clusters containing embeddings, subscriber identifiers, or speaker identifiers). The set of speaker profiles may be recently accessed and/or modified speaker profiles (e.g., speaker profiles retrieved by the analytics server in the past two days), speaker profiles associated with particular speaker characteristics, speaker profiles associated with particular speaker independent characteristics, and/or speaker profiles associated with other metadata.

In some configurations, the analytics server 102 may compute the pairwise similarity between the retrieved voiceprints and the embeddings extracted from the audio signal. The retrieved voiceprints are considered an old labeled set, and the embeddings from the audio signal are considered a new anonymous set. Additionally or alternatively, the analytics server 102 may compute the pairwise similarity between the retrieved voiceprints.

The analytics server 102 migrates label identifiers associated with the old labeled set to the new anonymous set based on the similarity of the voiceprints in the new anonymous set and the voiceprints in the old labeled set. The analytics server 102 determines the similarity of the voiceprints by evaluating voiceprints that are close (e.g., according to Euclidean distance measures, correlation-based measures). If the analytics server 102 determines that the voiceprints are close (e.g., the relative distance satisfies a threshold), the voiceprints and associated label identifiers may be merged. The analytics server 102 may migrate the label identifiers associated with the old labeled set to the new anonymous set such that the speaker identifier and/or subscriber identifier of the new anonymous set are replaced with the speaker identifier and/or subscriber identifier of the old labeled set. In addition to migrating the label identifiers, the analytics server 102 may determine a new centroid for the merged voiceprints by averaging the centroid of the old labeled set and the centroid of the new anonymous set. In some configurations, the analytics server 102 may compare the user characteristics before migrating the labels of the old labeled set to the new anonymous set. In some configurations, the analytics server 102 updates the analytics database and/or content database with the migrated labels.

Authenticating Users and Parental Controls

As discussed herein, the analytics server 102 may determine the identity of a user interacting with the end-user device 114 by comparing the similarity of the extracted embedding to embeddings/voiceprints stored in the analytics database 104. The analytics server 102, upon identifying one or more users, may transmit a user identifier, user characteristics (e.g., age, gender, emotion, dialect, accent, and the like), user-independent characteristics, and/or metadata to the content server 111. In some configurations, the analytics server 102 (or content server 111 using the information transmitted from the analytics server 102) may authenticate the identified users using the transmitted information. For example, a user's age may authenticate the user to watch content over a certain age limit.

In some configurations, the analytics server 102 (or content server 111) may determine whether the user authorized to watch content based on the identified users. For example, the analytics server 102 may identify an eight-year-old boy watching television. The analytics server 102 identifies another speaker having an elevated privileges based upon the analysis of the audio signal, where the analytics server 102 has identified speaker profiles of two speakers having voiceprints matching the embeddings extracted for the two speakers. For example, the analytics server 102 identifies the child's parent in the same audio signal as the eight-year-old boy. The presence of the adult male in close proximity to the eight-year-old boy results in the analytics server 102 (or content server 111) authorizing the eight-year-old boy to watch certain content.

Analytics Database

The analytics database 104 may store FARs for particular content systems 110, speaker identifiers (and voiceprints) associated with subscriber identifiers (e.g., a lookup table), extracted embeddings (e.g., weak embeddings), user characteristics, trained machine learning models (e.g., to execute VAD operations, to extract embeddings), and the like.

The analytics database 104 may store clustered embeddings as a voiceprint if the embeddings in the cluster satisfy one or more thresholds (e.g., the analytics server 102 determines that the cluster is a mature enrollment cluster). The analytics server 102 may determine that the enrollment cluster is mature if the duration of the utterances in the cluster (represented by the embeddings in the cluster) satisfy a threshold, the number of utterances in the cluster satisfy a threshold, some combination, or the like.

Additionally or alternatively, the analytics database 104 may store the clustered embedding as a voiceprint if the clustered embeddings are not associated with a speaker identifier and/or subscriber identifier. The analytics database 104 may store a voiceprint even if the voiceprint is not matured.

In some configurations, the analytics database 104 may purge (remove, delete) stored voiceprints. For example, the analytics database 104 may receive instructions from the content server 111 to remove the speaker identifiers associated with a subscriber identifier (e.g., a subscriber may have decided to unsubscribe from the services of the content system 110). Additionally or alternatively, the analytics database 104 may remove a stored voiceprint given a predetermined amount of time. Additionally or alternatively, the analytics database 104 may remove a stored voiceprint if the analytics database 104 (or the analytics server 102) determines that the voiceprint meets certain criteria. For example, the embeddings in the voiceprint cluster are based on synthetic speech.

In operation, the analytics database 104 may receive audio data and a subscriber identifier from the content server 111. The analytics database 104 may lookup speaker identifiers (and associated voiceprints) associated with the subscriber identifier. The analytics database 104 may also lookup higher/lower thresholds associated with the voiceprints and any user characteristics. The analytics database 104 may also lookup FARs associated with the content system 110. The analytics database 104 may update the voiceprint entries, higher/lower thresholds, FARs, and user characteristics in the lookup table. The analytics database 104 may also add voiceprint entries, subscriber identifiers, higher/lower thresholds, FARs and user characteristics to the lookup table.

Admin Device

An admin device 103 of the analytics system 101 is a computing device allowing personnel of the analytics system 101 to perform various administrative tasks or user-executed identification, security, or authentication operations. The admin device 103 may be any computing device comprising a processor and software, and capable of performing the various tasks and processes described herein. Non-limiting examples of an admin device 103 may include a server, personal computer, laptop computer, tablet computer, or the like. In operation, a user uses the admin device 103 to configure operations of various components in the system 100, such as an analytics server 102 and may further allow users to issue queries and instructions to various components of the system 100. For example, the admin device 103 may be used to determine a FAR associated with a content system 110.

Client-Side Audio Processing for Media Content System

For ease of description and understanding, the embodiments described herein mention employing such technology in the context of content delivery systems that operate, in part, according to speaker utterance and voice inputs. Embodiments, however, are not so limited and may be employed in any number of systems or products that might benefit from passive (or active) enrollment, continuous (or static) enrollment, or continuous identification/authorization of multi-speaker voice biometrics. For instance, the identification/authorization of multi-speaker voice biometric systems and operations described herein could be implemented in any system that receives and identifies audio inputs (e.g., edge-devices/IoT devices such as cars or smart appliances, or call centers).

Moreover, the embodiments herein employ audio processing operations to identify speakers as particular known or unknown users. Embodiments, however, are not limited solely to voice biometrics, but may ingest and process any number of additional types of biometrics for identifying speakers as particular users. Non-limiting examples of the additional types of biometrics that embodiments may ingest and process include eye scans (e.g., retina or iris recognition), faces (e.g., facial recognition), fingerprints or handprints (e.g., fingerprint recognition), user behaviors (e.g., "behavior prints") when accessing a monitored system (e.g., keypresses, menu accesses, content selection, rate of inputs or selections), or any combination of biometric information.

Figure 2:
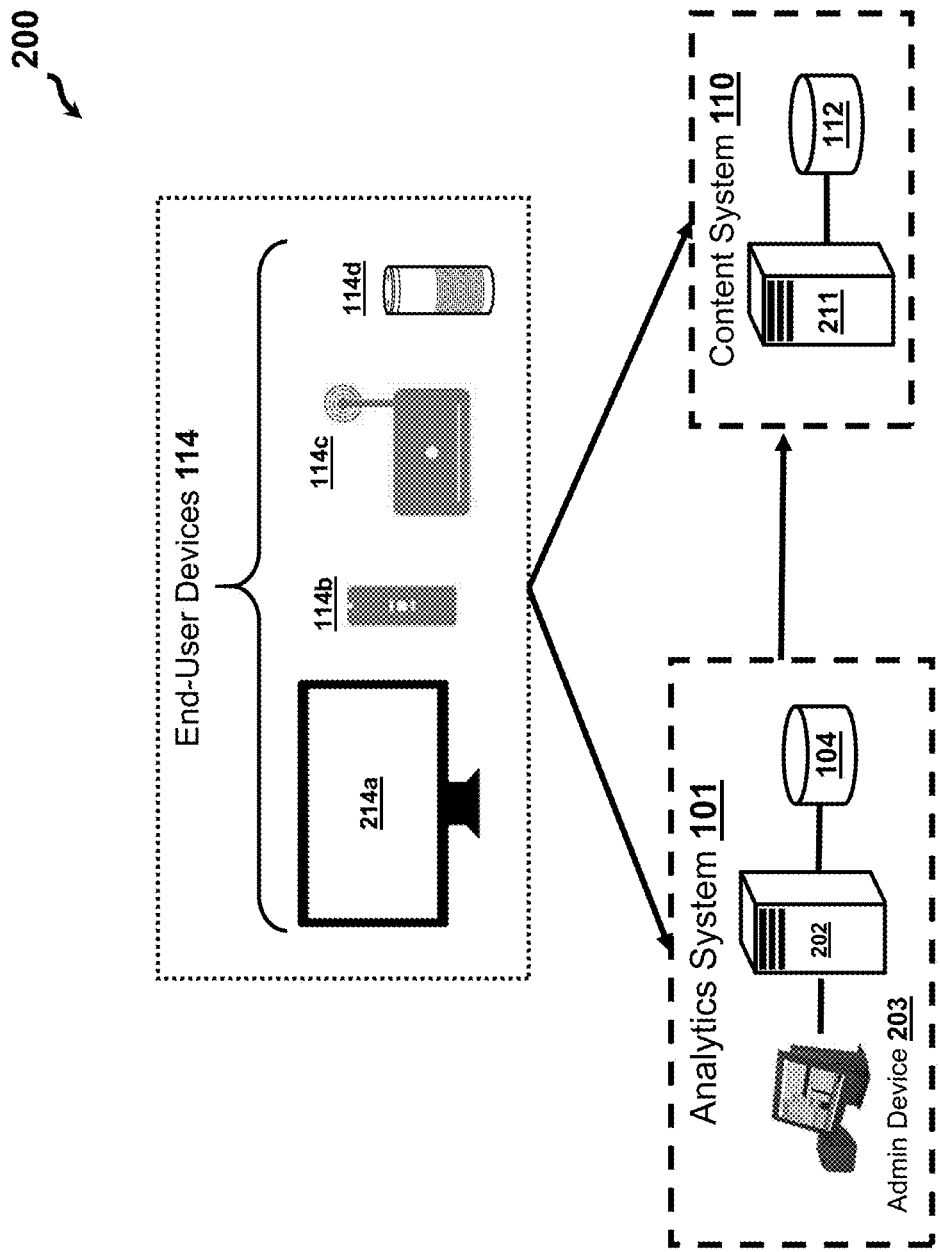
FIG. 2 shows components of a system employing audio-processing machine-learning operations, where the machine learning models and other machine learning architecture are implemented on a local device.

FIG. 2 shows components of a system 200 employing audio-processing machine-learning operations, where the machine learning models and other machine learning architecture are implemented on a local device. The system 200 comprises an analytics system 201, a media content system 210, and end-user devices 214. The analytics system 201 includes analytics server 202, analytics database 204, and admin device 203. The content system 210 includes content servers 211, and media content databases 212. Embodiments may comprise additional or alternative components or omit certain components from those of FIG. 2, and still fall within the scope of this disclosure. It may be common, for example, to include multiple content systems 210 or for the analytics system 201 to have multiple analytics servers 202. Additionally or alternatively, the analytics system 201, or a portion of the analytics system 201 may be embedded into an end-user device 214. Embodiments may include or otherwise implement any number of devices capable of performing the various features and tasks described herein. For example, the FIG. 2 shows the analytics server 202 in as a distinct computing device from the analytics database 204. In some embodiments, the analytics database 204 is integrated with the analytics server 202.

System 200 in FIG. 2 is similar in operation to system 100 in FIG. 1, though in FIG. 2 the end-user devices 214 perform various audio-processing and data analytics operations. For example, in response to a user's active interaction with the end-user devices 214, the end user devices 214 will capture user input data (e.g., an audio signal). Instead of the end-user devices 214 forwarding the captured audio signal to the content system 210 (as in FIG. 1), one or more machine learning architectures are applied to the audio signal before forwarding the audio signal to both (or either) the content system 210 and the analytics system 201.

In some configurations, the end-user devices 214 may identify or extract various forms of metadata; modify, convert or enrich the audio signal; host and execute software processes and services for identifying speech in an audio signal; extract biometric features associated with the speakers in the audio signal; and identify/authenticate speakers in the audio signal. Additionally or alternatively, the end-user devices 214 may filter the audio signal (de-noise the audio signal), convert the format of the audio signal, parse (or partition) the audio signal, execute VAD software (or VAD machine learning), perform ASR, and scale the audio signal.

In some configurations, the end-user devices 214 stores the audio signal in a database or other into non-transitory machine-readable storage media, such as a buffer or cache memory, for a predetermined amount of time. In response to a triggering condition, the end-user device 214 may retrieve the stored audio signals and forward the stored audio signal, and the audio signal associated with the triggering condition, to the analytics system 201. For example, if a user operates an end-user device 214 to capture sound actively, the end-user device 214 may retrieve stored audio signals captured by the end-user device 214 an amount of time immediately before the user actively operated the end-user device 214. In some embodiments, the end-user devices 214 forward the audio signals to the analytics system 201 to process the audio signals and identify speakers in the audio signals. Additionally or alternatively, the end-user device 214 may process the audio signals and identify speakers in the audio signals. The end-user devices 214 may process the audio signals by extracting embeddings from the audio signals.

In operation, the end-user devices 214 may apply various machine-learning operations on the audio signals. For example, the end-user devices 214 may extract embeddings by executing VAD software or other machine learning architectures configured to extract features from the audio signal. In some embodiments, the end-user devices 214 may forward the extracted embeddings to the analytics system 201 such that the analytics system 201 may cluster the embeddings with voiceprints retrieved from the analytics database 204, as described in FIG. 1. The analytics server 202 may identify speakers based on a similarity of utterances in the audio signal to stored voiceprints. The analytics server 202 may forward the speaker identifier and other metadata to the content system 210.

Additionally or alternatively, if voiceprints are stored in the end-user device 214, the end-user devices 214 may cluster the embeddings with the stored voiceprints and generate a similarity matrix describing similarity scores for each extracted embedding compared to one or more voiceprints stored in the end-user devices 214. Additionally or alternatively, the end-user devices 214 may query the analytics database 204 in the analytics system 201 and retrieve suspect voiceprints, or putative voiceprints for the extracted embeddings based on an association with the subscriber identifier or speaker characteristics, as described in FIG. 1.

In some configurations, the end-user devices 214 forward similarity matrices to the analytics system 201 such that the analytics system 201 may use condition-dependent adaptive thresholding to compare the maximum similarity score to high similarity thresholds and low similarity thresholds as described in FIG. 1. The analytics server 211 may determine weak utterances, strong utterances, and update the voiceprints. Additionally or alternatively, the end-user devices 214 may query the analytics database 204 in the analytics system 201 and retrieve FARs, maturity thresholds, and similarity thresholds as described in FIG. 1. The end-user devices 214 may update voiceprints based on comparing the maximum similarity scores in the similarity matrix to similarity thresholds. The end-user devices 214 may store the updated voiceprints and also may transmit the updated voiceprints to the analytics database 204.

In some configurations, as described in FIG. 1, in response to triggering criteria, the analytics server 202 may execute label correction to correct label identifiers. Additionally or alternatively, the end-user devices 214 may execute label corrections and forward the updated label identifiers to the analytics system 201 and/or the content system 210.

If the end-user devices 214 identify a speaker from an audio signal using a speaker identifier, the end-user devices 214 may transmit the speaker identifier and any metadata to content system 210 such that the content system 210 can determine the personalized content to stream to the identified speaker. The end-user devices 214 may also transmit the speaker profile (including the speaker identifier, extracted embeddings, metadata, voiceprints) to the analytics system 201 (e.g., the analytics database 204).

Example Operations

Active and Static Enrollment in Audio Processing Authentication System

Figures 3A, 3B:
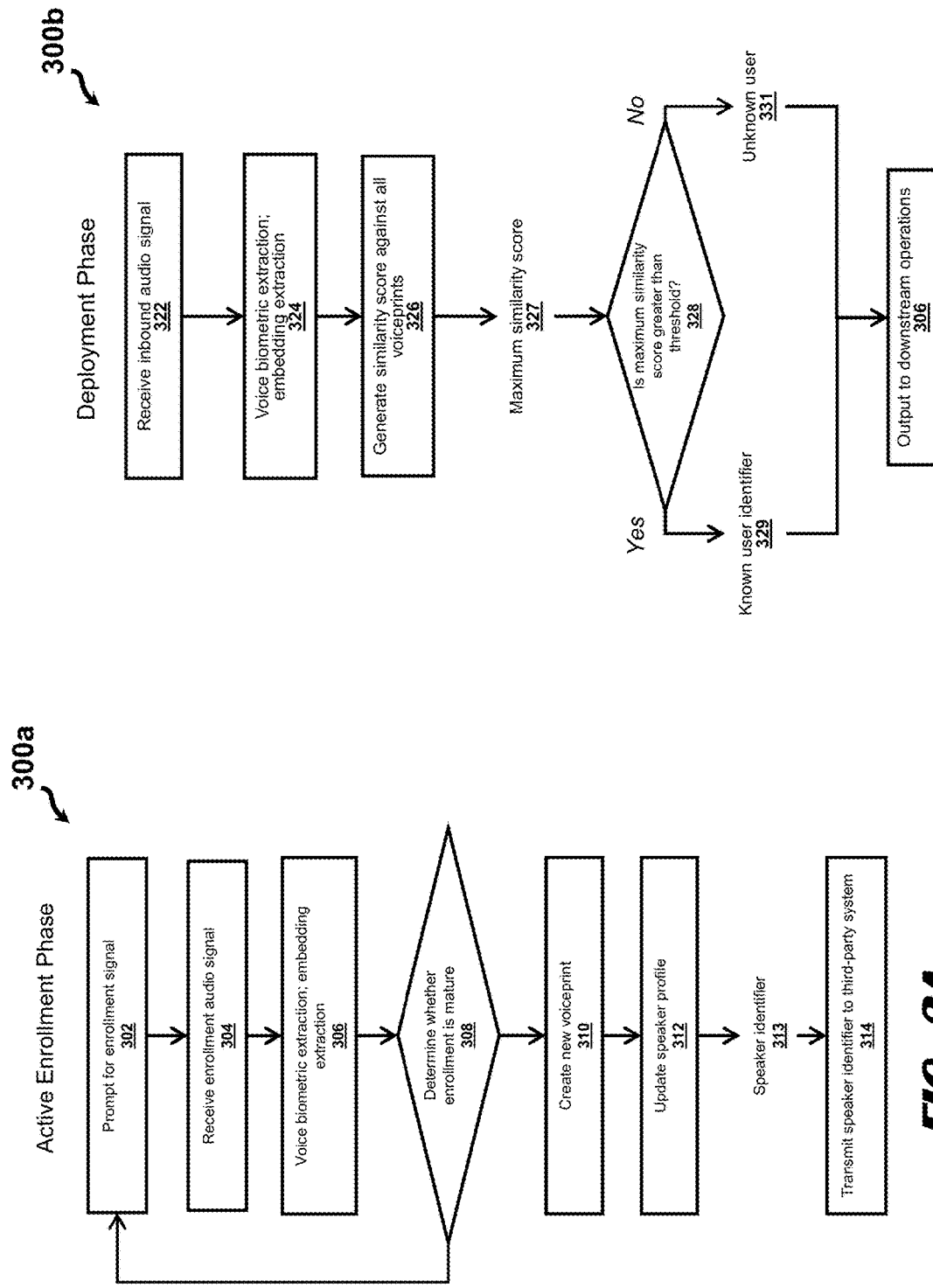
FIGS. 3A-3B show operational steps of a method for actively enrolling users and identifying (authenticating) users.

FIG. 3 describes the phases that the server progresses through to identify (or authenticate) a user. FIG. 3A shows the operational steps of a method 300*a* for actively enrolling users during an enrollment phase, according to an embodiment. FIG. 3B shows the operational steps of a method 300*b* for identifying (or authenticating) a user during a deployment phase. A server of an analytics system (e.g., analytics server) executes machine-readable software code that perform the methods 300*a*, 300*b* described below, though one or more processors of any number of computing devices may perform the various operations of the methods 300*a*, 300*b*. Some embodiments may include additional, fewer, or different operations than those described in the methods 300*a*, 300*b*.

Referring to FIG. 3A, in step 302, the server prompts a user for an enrollment signal. In some configurations, the server may prompt the user for enrollment signals once or at a periodic time interval (e.g., every six months). In some configurations, the server may prompt the user for enrollment signals when, for example, the device is initiated for the first time, at predetermined intervals, or when the user accesses a configuration interface to register/enroll a new speaker-user. In some configurations, the server may prompt the user for enrollment signals based on instructions (from a user or other administrator) to execute an enrollment phase. The prompts may include prompting the user to place a finger on a fingerprint sensor, prompting the user to speak a particular phrase, prompting the user to speak naturally, prompting the user to appear within the bounds of a digital boundary box on a display, and the like.

In step 304, the server receives an enrollment signal. An enrollment signal is a signal received during a designated enrollment phase (e.g., an active enrollment of a user). Enrollment signals may be distinct from other types of signals, as the end-user device and the server receive the enrollment signals during the enrollment phase and in response to a prompt (as in step 302). For example, the server receives an enrollment signal in response to a user pressing a button on the end-user device and speaking a particular utterance responsive to the audio or visual prompt, which the end-user device transmits to the server. The server receives the audio signal directly or via an intermediary server (e.g., content server). In some configurations, the server receives several enrollment signals (e.g., multiple speech portions of a signal (utterances)) and any number of biometric data for enrolling biometric data (e.g., one or more fingerprint angles) in addition to the enrollment utterances.

In some configurations, the server receives an audio signal that is a data file or data stream containing audio data in a machine-readable format. The audio signal comprises an audio recording that includes any number of speaker utterances for any number of speakers. The audio data may also include data or metadata received with the audio signal. For example, the audio data may include speaker-related information (e.g., user/speaker identifier, sub scriber/household identifier, user biometrics) or metadata related to the communications protocols or medium (e.g., TCP/IP header data, phone number/ANI).

In step 306, the server extracts embeddings from the enrollment signal by applying a machine-learning architecture comprising various machine-learning models (e.g., embedding extractor). Embeddings are mathematical representations of the biometric information (or features of the biometric information) in the enrollment signal. The server may extract features from the utterances including Mel frequency cepstrum coefficients (MFCCs), Mel Filter banks, Linear filter banks, bottleneck features, and the like. The server extract the features from the input audio signal using machine-learning models configured to extract features and generate the speaker embeddings.

The type of enrollment signal may dictate how the server extracts embeddings. For example, a user may provide a fingerprint as an enrollment signal. In other examples, the server may extract features associated with the digital fingerprint image, including ridges, valleys, and minutiae; and/or the server may extract the features using machine-learning models configured to extract features of image data. The server extracts the various types of features using machine-learning models configured to extract features and generate the corresponding embeddings for the particular types of biometrics employed for user recognition, in conjunction with the speaker embeddings.

In determination step 308, the server determines whether enrollment is mature. The server may determine that the enrollment is mature when the server has extracted enough embeddings (or biometric information) to satisfy a threshold number of embeddings or other information. For example, the server may determine that enrollment is mature when the server receives a predetermined duration of net speech. Additionally or alternatively, the server may determine that enrollment is mature when the server receives a predetermine number of various enrollment signals (e.g., two fingerprint scans and two utterances, five different utterances). The mature voiceprint (or mature embedding cluster) may contain sufficient biometric information for the analytics server 102 to identify the speaker using the speaker identifier.

If the enrollment is not mature, the server prompts the user for an enrollment signal (e.g., step 302). The server prompts the user for additional enrollment signals (having enrollment utterances) until the enrollment is mature. As an example, if the server receives an enrollment utterance with a first type of content (e.g., user name), then the server prompts the user for a second utterance (e.g., user birthday). As another example, if the server receives biometric information (e.g., fingerprint), the server prompts the user for an audio signal containing an enrollment utterance.

If the enrollment is mature, the server proceeds to step 310. In step 310, the server creates a voiceprint for the user (sometimes referred to as an enrollee voiceprint). The server statistically or algorithmically combines the enrollment embeddings to extract the voiceprint for the enrolled speaker-user. In some implementations, clusters of enrollment embeddings extracted from the enrollment signal represent a collection of utterances similar to a particular speaker (e.g., a speaker cluster) where a voiceprint represents the centroid for the speaker cluster.

In step 312, the server updates a speaker profile. Speaker profiles are data records associated with each user (or speaker) enrolling during the enrollment phase. The speaker profile includes a voiceprint, a speaker cluster (e.g., embeddings associated with the voiceprint), and metadata. As described in FIG. 1, metadata can include information about the utterances, the quality of the enrollment signal, an overall duration of net speech, a total number of utterances in each cluster, speaker characteristics, and speaker-independent characteristics. Speaker identifiers 313 are associated with each speaker profile to distinguish and identify particular speakers. As described in FIG. 1, the speaker identifier may not include or represent any personally identifying information. The server may also generate a new speaker identifier or request a new speaker identifier for the new speaker profile from the content server.

In step 314, the server may transmit the speaker identifier to a third-party system (e.g., content server, call center). The third-party system may map the received speaker identifier with a human speaker. For example, the third-party system may use a lookup table to map the speaker identifier to the particular human speaker. Additionally or alternatively, the third-party system may associate a subscriber identifier or other household and/or group identifier with each speaker identifier. The server may also transmit the speaker profile (including the speaker-independent characteristics, speaker characteristics, metadata) associated with the speaker identifier.

Referring to FIG. 3B, in step 322, the server may receive an inbound signal containing biometric information. The inbound signal may be an image of the user, an utterance in an audio signal, a fingerprint, and the like. In some configurations, the server receives the inbound signal in response to an end-device actively capturing user input data. For example, the user may actively interact with the end-user device (e.g., speaking a "wake" word, pressing a button, making a gesture). Additionally or alternatively, the end-user device 114 passively captures the user input data, where the end-user passively interacts with the end-user device 114 (e.g., speak to another user, the end-user device 114 automatically capturing utterances without user's affirmative action).

In step 324, the server extracts embeddings from the inbound signal. In some configurations, the server may perform pre-processing on the inbound signal (e.g., partition the inbound signal, scale the inbound signal, de-noise the inbound signal). Additionally or alternatively, the server may identify events in the inbound signal. For example, the server may detect audio events by executing VAD software. The VAD software may distinguish silence from speech. Additionally or alternatively, the server may perform object detection (or recognition, identification) in the inbound signal. For example, the server will recognize and differentiate a face from a hand. The server will use the identified biometric portions of the inbound signal (e.g., speech, fingerprints) to extract embeddings.

The inbound signal may be an audio signal comprising an audio recording including any number of speaker utterances for any number of speakers. The audio data may also include data or metadata received with the audio signal. For example, the audio data may include speaker-related information (e.g., user/speaker identifier, subscriber/household identifier, user biometrics) or metadata related to the communications protocols or medium (e.g., TCP/IP header data, phone number/ANI).

The server may extract embeddings sing machine learning models configured to extract features of the audio signal. The features include low-level spectro-temporal features from the various speaker utterances. The features may also include various data related to the users or speakers (e.g., subscriber identifiers, speaker identifiers, biometrics) or metadata values extracted from protocol information or data packets (e.g., IP address). A machine-learning architecture, comprising various machine-learning models (e.g., embedding extractor model), extracts embeddings for putative speakers based upon the features extracted from the input audio signal.

In step 326, the machine-learning architecture generates one or more similarity scores by comparing the features or the embeddings extracted for a particular speaker against the corresponding features or embeddings of other putative speakers and/or against the corresponding features or embeddings of speaker clusters stored in the database. The clusters represent a collection of utterances similar to a particular speaker where the speaker voiceprint represents a centroid for the speaker cluster. The server applies the machine-learning architecture on the audio signal to extract the embedding for the particular speaker. The server compares the embeddings or features against speaker clusters stored in the speaker profile database and then determines the similarity scores for the speakers. For each particular speaker, the server generates a set of similarity scores based upon a relative distance between the speaker embedding (extracted from the input audio signal) and the voiceprints stored in the speaker profile database.

Additionally or alternatively, the server performs clustering operations according to certain features extracted from the input audio signal and determines one or more clustering similarity scores for each user based upon the features.

The server identifies pairs of speaker clusters and speakers having the maximum similarity score 327. For each speaker, the server outputs the maximum similarity score 327 calculated for the particular speaker, representing the most likely match between the speakers.

In determination step 328, the server determines whether the maximum similarity scores for each voiceprint satisfies one or more thresholds. The server determines whether the inbound audio signal includes an utterance for a new or known speaker by evaluating the similarity score of the corresponding embedding or features against known voiceprints or expected features.

If the maximum similarity score satisfies one or more thresholds, the server determines that the speaker is likely associated with a known registered user 329. For example, the known registered user 329 may be a user enrolled during the enrollment phase of FIG. 3A. On the other hand, if the server determines that the maximum similarity score fails one or more thresholds, the server determines that the speaker is likely a new unknown user 331. The server may generate a new speaker profile and speaker identifier using the particular voiceprint. The speaker profile includes a voiceprint, a speaker cluster (e.g., embeddings associated with the voiceprint), a speaker identifier, and metadata.

In step 330, the server outputs the speaker identifier and speaker profile (of the known registered user 329 and/or the new unknown user 331) to one or more downstream applications. In some configurations, the server authenticates a user according to the speaker profile of the known registered user 329. Additionally or alternatively, the downstream operations identify, authenticate and/or authorize a particular speaker using the speaker identifier. The downstream application may perform different functions depending on whether the speaker is a known registered user or a new unknown user. For example, downstream applications may execute, unlock functionality, or perform operations based on identified and/or authenticated registered users. If a user is a new unknown user 331, downstream applications may restrict the user's access to the application's software, functionality, or information.

Adaptive Thresholding for Audio Processing

Figure 4:
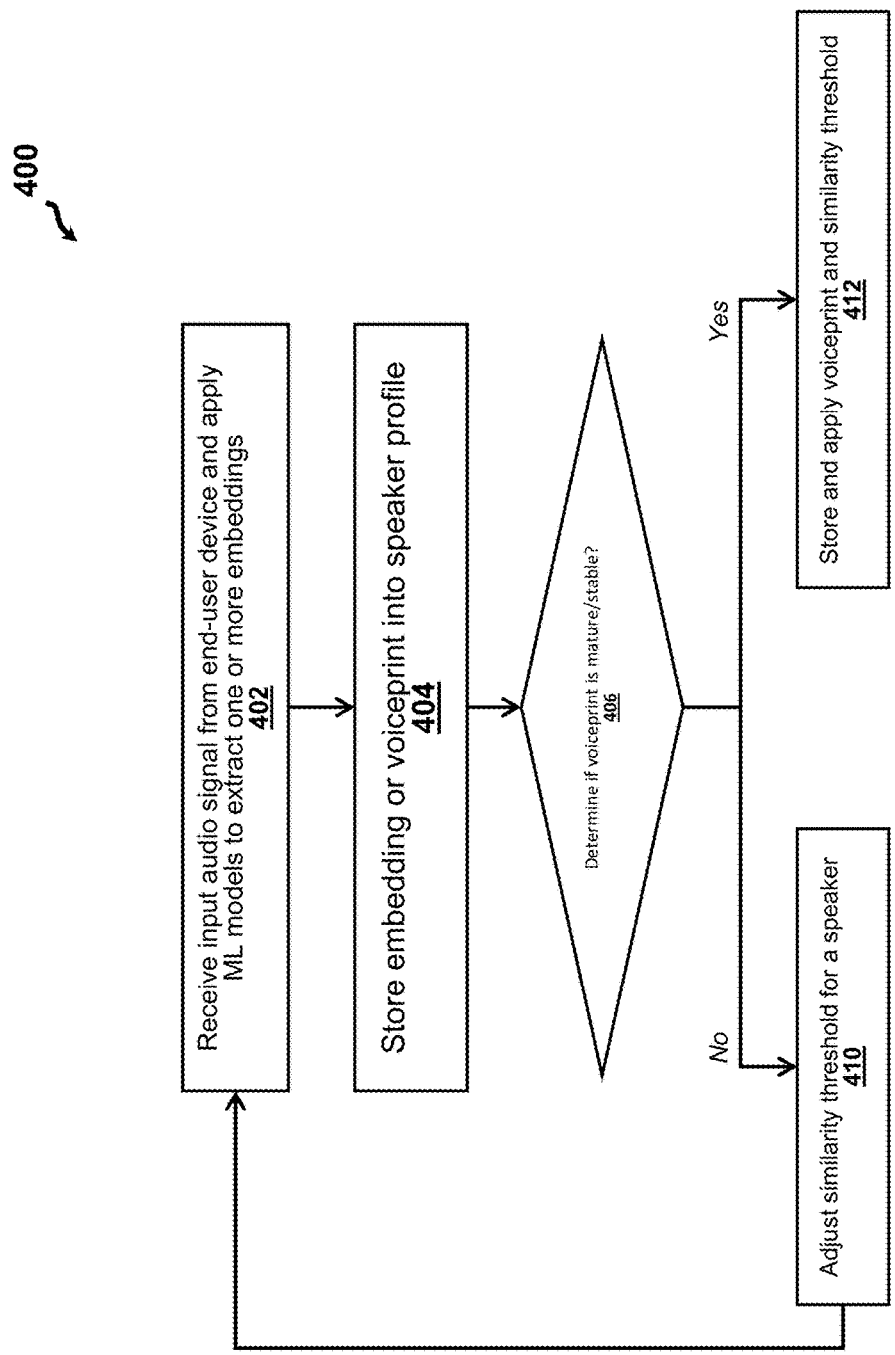
FIG. 4 shows operational steps of a method for adaptive thresholding in an audio processing system.

FIG. 4 shows operational steps of a method 400 for adaptive thresholding in an audio processing system. The method 400 described below is performed by a server of an analytics system (e.g., analytics server) executing machine-readable software code, though any number of processors of any number of computing devices may perform the various operations of the method 400. Embodiments may include additional, fewer, or different operations than those described in the method 400. The server applies a machine-learning architecture, comprising any number of machine-learning models and algorithms, on input audio signals to perform various operations. The server and the machine-learning architecture execute the method 400 during an enrollment phase, though the server and the machine-learning architecture may perform the various operations of the method 400 during the enrollment phase, a deployment phase, or as an ongoing combination of such phases.

In step 402, the server receives an input audio signal. The server receives the input audio signal directly from the end-user device directly (as in FIG. 2) or via a computing device of a third-party system (e.g., content system, call center system) (as in FIG. 1). The input audio signal includes an utterance of a speaker-user, where the input audio signal is a data file (e.g., WAV file, MP3 file) or a data stream. The server performs various pre-processing operations on the input audio signal, such as parsing the audio signal into segments or frames of speech or performing one or more transformation operations (e.g., Fast-Fourier Transform), among other potential operations.

The input audio signal may be an enrollment audio signal or inbound audio signal, where server receives the input audio during an enrollment phase or deployment phase. The audio signal may also include data or metadata received with the audio signal. For example, the audio signal may include speaker-related information (e.g., user/speaker identifier, subscriber/household identifier, user biometrics) or metadata related to the communications protocols or medium (e.g., TCP/IP header data, phone number/ANI).

The server receives the audio signal and extracts various types of features from the audio signal. The features include low-level spectro-temporal features from the various speaker utterances. The features may also include various data related to the users or speakers (e.g., subscriber identifiers, speaker identifiers, biometrics) or metadata values extracted from protocol information or data packets (e.g., IP address). A machine-learning architecture, comprising various machine-learning models (e.g., an embedding extractor model), extracts embeddings for putative speakers based upon the features extracted from the input audio signal.

In some embodiments, the server or machine learning architecture applies a voice activity detection (VAD) model on the audio signal. The VAD is a machine-learning model trained to detect instances of utterances within the audio signal and extracts or otherwise identifies segments of the audio signal comprising the detected utterances. In some cases, the VAD generates an abridged, speech-only audio signal. The server may store the speech segments and/or the abridged audio signal into a database (e.g., speaker profile database, voiceprint database) or in some other non-transitory machine-readable storage media.

In step 404, for each particular user, the server stores the embedding or voiceprint into a database record (representing a speaker profile) of an analytics database. The server further stores various types of user information associated with the particular speaker. The user information includes, for example, a user-specific similarity threshold generated for the user. If the speaker profile is new or otherwise lacks the user-specific similarity threshold, then the server stores a preconfigured default similarity threshold into the speaker profile.

In determination step 406, the server determines whether the voiceprint satisfies one or more maturity thresholds, representing whether the voiceprint is mature or stable. The server identifies one or more maturity factors associated with the speaker profile and utterances. Non-limiting examples of the maturity factors include the number of enrollment utterances, the overall duration of net speech across the utterances, and the quality of the audio from the audio signals.

The server may employ any number of algorithms for determining whether the voiceprint is mature. For example, the server compares a maturity factor (e.g., number of utterances) against a preconfigured maturity threshold corresponding to the maturity factor (e.g., threshold number of utterances). As another example, the server statistically or algorithmically combines the maturity factors and compares the combined maturity factor against a preconfigured maturity threshold corresponding to the combined maturity factor. A preconfigured false acceptance rate dictates the preconfigured maturity threshold. An administrative user manually enters or various machine-learning models algorithmically determine the false acceptance rate. As the false acceptance increases, the maturity threshold increases, thereby increasing the likelihood that the server will determine that the maturity factor fails the maturity threshold and that the voiceprint is not sufficiently mature.

Figure 12:
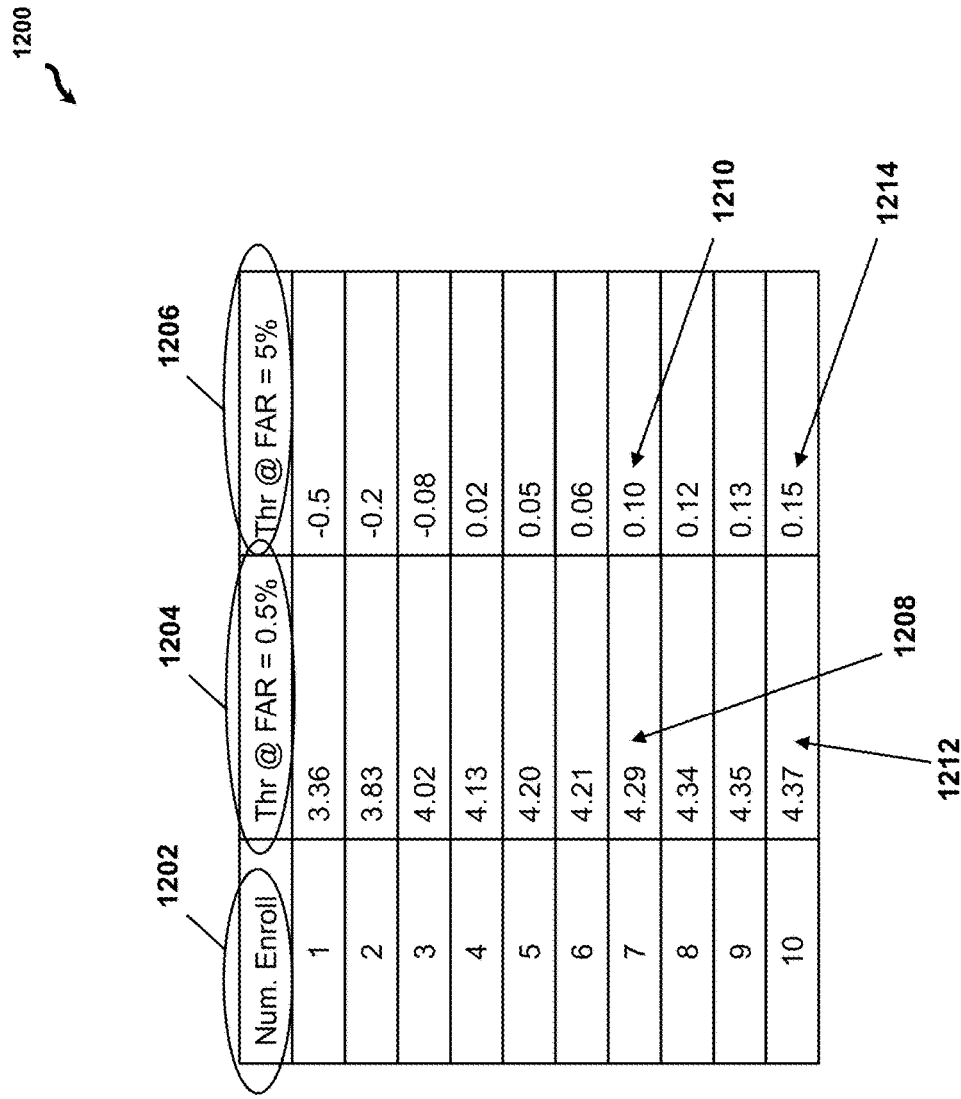
FIG. 12 illustrates an example table for a similarity threshold scheduler based on a maturity factor and false acceptance rate.

In some embodiments, the server employs tiered maturity thresholds corresponding to tiered false acceptance rates. For example, the server may store a table of maturity thresholds (e.g., a threshold schedule) at various false acceptance rates. Referring to FIG. 12, example 1200 illustrates a threshold scheduler based on a single maturity factor (number of enrollment embeddings) and the various false acceptance rates. In some implementations, threshold schedules may associate similarity scores with several maturity factors (e.g., number of enrollments 1202). Column 1202 indicates a maturity threshold based on the single maturity factor (e.g., a number of enrollment utterances 1202). Different predetermined false acceptance rates (FAR) are indicated in columns 1204 and 1206 respectively. Column 1204 indicates similarity thresholds based on a predetermined FAR at 0.5%. Column 1206 indicates a similarity threshold based on a predetermined FAR at 5%. The similarity thresholds indicated in column 1204 are considered high similarity thresholds. The similarity thresholds in column 1206 are considered low similarity thresholds.

Referring back to FIG. 4, in step 410, the server adjusts a similarity threshold for the speaker in response to the server determining that the voiceprint is not mature for failing the maturity threshold (in step 408). The server adjusts the similarity threshold in accordance with the false acceptance rate, whereby the server increases or decreases the similarity threshold to meet a desired level of accuracy represented by the false acceptance rate. For example, the server increases the similarity threshold for the particular speaker when the maturity factors (e.g., number of utterances) fail to meet a given maturity factor threshold. The server updates the similarity score such that the server evaluates the voiceprint according to false acceptance rate for future inbound audio signals. The server iteratively prompts a speaker for an additional utterance or enrollment embedding until the maturity threshold is satisfied.

Referring back to FIG. 12, in an example, the maturity threshold may be set to 10 enrollment utterances. If the server determines that the voiceprint does not satisfy the maturity threshold (e.g., the received input audio signal in step 402 was for a 7th enrollment utterance, then depending on the FAR (for particular subscriber identifiers or third-party systems), the high similarity score associated with the speaker is 4.29 (e.g., score threshold 1208) and the low similarity score is 0.1 (e.g., score threshold 1210). The server stores the similarity scores associated with the speaker in a speaker database. If the speaker speaks again, the thresholds used in evaluating the similarity of future inbound audio signals will be the high similarity score associated with the speaker is 4.29 (e.g., score threshold 1208) and the low similarity score is 0.1 (e.g., score threshold 1210).

Referring back to FIG. 4, in step 412, the server stores the voiceprint and the similarity threshold into the speaker profile and applies the voiceprint and the similarity threshold against future inbound audio signals when the server determines that the voiceprint is mature (in step 408). The server applies the voiceprint and the similarity threshold against future inbound audio signals that purportedly comprise utterances from the particular speaker. In some implementations, the server stores the voiceprint and the similarity threshold into the speaker profile database. In some implementations, the server stores the voiceprint and the similarity threshold into the end-user device or other device in communication with the server.

Referring back to FIG. 12, in the example described above, the maturity threshold is set to 10 enrollment utterances. If the server determines that the voiceprint does satisfy the maturity threshold (e.g., the received input audio signal in step 402 was for a $10^{th}$ enrollment utterance), then depending on the FAR (for particular subscriber identifiers or third-party systems), the high similarity score associated with the speaker is 4.37 (e.g., score threshold 1212) and the low similarity score is 0.15 (e.g., score threshold 1214). The server stores the similarity scores associated with the speaker in a speaker database. If the speaker speaks again, the thresholds used in evaluating the similarity of future inbound audio signals will be the high similarity score associated with the speaker is 4.29 (e.g., score threshold 1208) and the low similarity score is 0.1 (e.g., score threshold 1210).

Unsupervised Clustering

Figure 5:
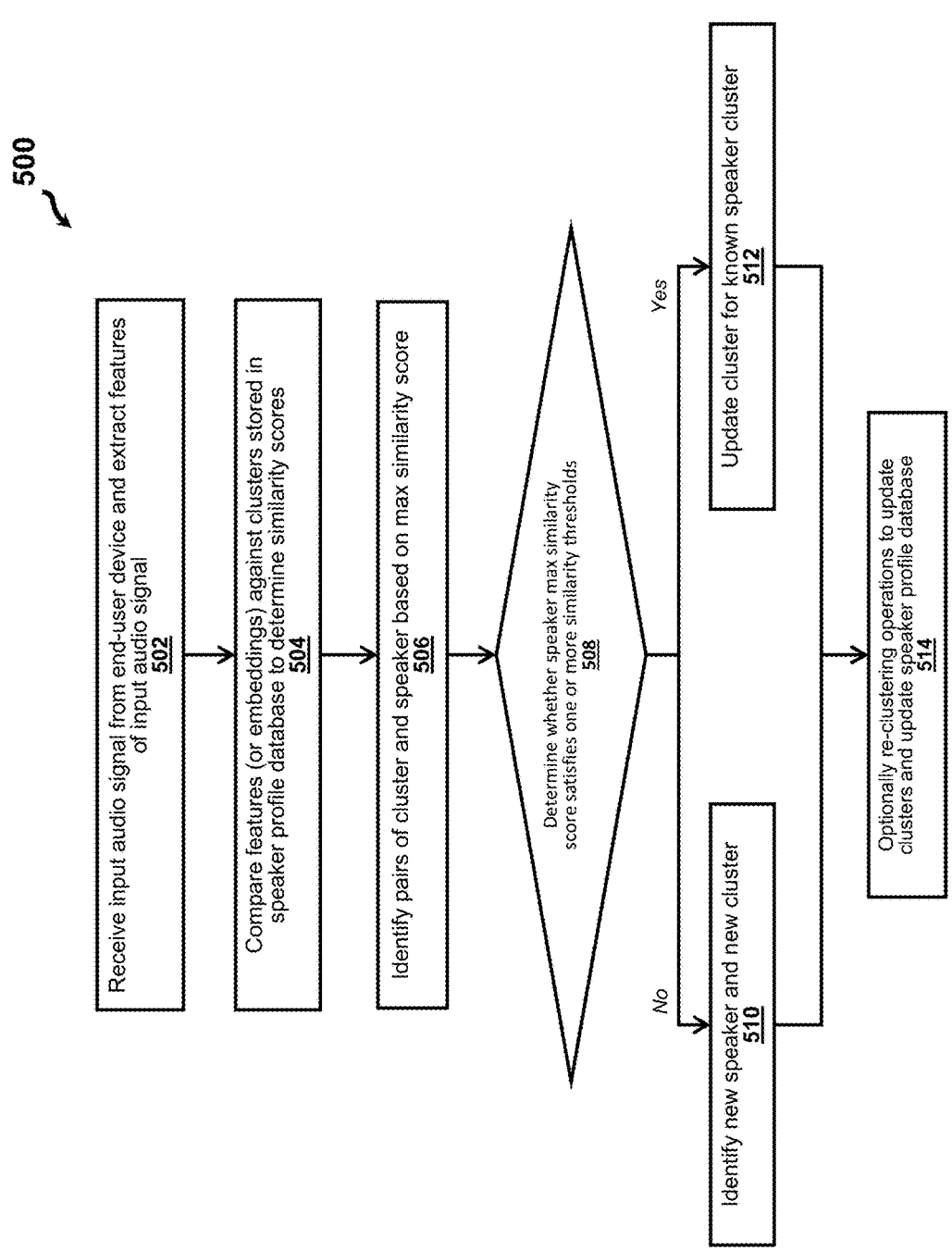
FIG. 5 shows execution steps of a method for identifying and evaluating strong and weak utterances in audio processing.

FIG. 5 shows execution steps of a method 500 for identifying and evaluating strong and weak utterances in audio processing. The method 500 described below is performed by a server of an analytics system (e.g., analytics server) executing machine-readable software code, though any number of processors of any number of computing devices may perform the various operations of the method 500. Embodiments may include additional, fewer, or different operations than those described in the method 500. The server applies a machine-learning architecture, comprising any number of machine-learning models and algorithms, to perform various operations.

In step 502, the server receives an input audio signal from an end-user device and extracts various types of features from the input audio signal. The input audio signal comprises a data file or data stream containing audio data in a machine-readable format. The audio data comprises audio recording that includes any number of speaker utterances for any number of speakers. The input audio signal includes an utterance of a speaker-user, where the input audio signal is a data file (e.g., WAV file, MP3 file) or a data stream. The input audio signal may be an enrollment audio signal or inbound audio signal, where server receives the input audio during an enrollment phase or deployment phase. The server extracts various types of features from the input audio signal, such as spectro-temporal features or metadata. Additionally or alternatively, the server performs various preprocessing operations on the input audio signal, such as parsing the audio signal into segments or frames of speech or performing one or more transformation operations (e.g., Fast-Fourier Transform), among other potential operations.

In step 504, the server compares embeddings or features, extracted for the speakers, against speaker clusters stored in the speaker profile database and then determines similarity scores for the speakers. The clusters represent a collection of utterances similar to a particular speaker where the speaker voiceprint represents a centroid for the speaker cluster. The server applies a machine-learning architecture, having one or more machine-learning models, on the audio signal to extract the embedding for the particular speaker. For each particular speaker, the server generates a set of similarity scores based upon a relative distance between the speaker embedding (extracted from the input audio signal) and the voiceprints stored in the speaker profile database.

Additionally or alternatively, the server performs clustering operations according to certain features extracted from the input audio signal and determines one or more clustering similarity scores for each user based upon the features.

In step 506, the server identifies each pair of speaker and cluster having the maximum similarity score. For each speaker, the server outputs the maximum similarity score calculated for the particular speaker, representing the most likely match between the speakers.

In determination step 508, the server determines whether the similarity score for an embedding (or features) of a particular speaker satisfies one or more similarity thresholds. The server determines whether the input audio signal includes an utterance for a new or known speaker by evaluating the similarity score of the corresponding embedding or features against known voiceprints or expected features. If the server determines that the similarity score for the particular embedding satisfies the similarity threshold, then the server likewise determines that the embedding is likely associated with a known registered user. On the other hand, if the server determines that the similarity score for the particular embedding fails the similarity threshold, then the server determines that the embedding is likely a new user.

In some embodiments (as in FIG. 6), the server compares the outputted similarity score for the particular speaker against a low similarity threshold and a high similarity threshold to provide a level of granularity that can control for poor quality embeddings resulting from poor quality utterances. In such embodiments, if the server determines that the similarity score for the particular embedding satisfies the high similarity threshold, then the server likewise determines that the embedding is likely associated with a known registered user. On the other hand, if the server determines that the similarity score for the particular embedding fails the low similarity threshold, then the server determines that the embedding is likely a new user. As discussed below, if the similarity score falls between the low threshold and the high threshold, then server stores the relevant audio data and similarity score into a buffer memory, speaker profile, or other quarantine memory location.

In step 510, the server generates a new voiceprint and a new speaker profile in response to the server determining that the embedding for the particular speaker fails the similarity threshold (in step 508). The server generates a new speaker profile in the analytics database or another memory location configured to store temporary or guest speaker profiles. The server stores various types of data into the new speaker profile, which the server identifies in or extracts from the input audio signal (e.g., speaker identifier, embeddings, voiceprint, features, metadata, device information).

In step 512, the server updates a stored voiceprint and an existing enrolled (or known) speaker profile in the database, in response to the server determining that the embedding for the particular known speaker satisfies the similarity threshold (in step 508). The server updates the known speaker profile for the known speaker profile in the analytics database or in a temporary or guest speaker profile. The server stores various types of data into the known speaker profile, which the server identifies in or extracts from the input audio signal (e.g., speaker identifier, embeddings, voiceprint, features, metadata, device information).

In optional step 514, the server performs one or more re-clustering operations to reevaluate the speaker clusters and update the speaker profiles of the speaker profile database. The server performs the re-clustering operations in response to a particular triggering condition. Non-limiting examples of the triggering condition may include a preconfigured periodic time interval or when the server receives a threshold number of utterances associated with, for example, a subscriber (e.g., household) or user, among others. The server extracts features or embeddings for the speakers to generate new voiceprints or update existing voiceprints for the speaker profiles. The server re-computes the similarity scores for the speakers based upon the relative distances between the features or embeddings of extracted for each particular utterance and each particular voiceprint or other type of cluster centroid. The server stores the new or updated voiceprints into new or updated speaker profiles, along with various types of data associated with the speaker.

In some embodiments, the re-clustering operation performed by the server is a hierarchical clustering operation (as in FIG. 7). Hierarchical clustering minimizes the likelihood of small cumulative identification/authorization errors, increasing the purity of the speaker clusters. The server determines relative distances, or other comparative differences or clustering algorithms (e.g., PLDA, cosine distance), between the voiceprints and identifies existing or new voiceprints that satisfy a similarity score threshold.

Identifying Strong and Weak Utterances for Audio Processing

Figure 6:
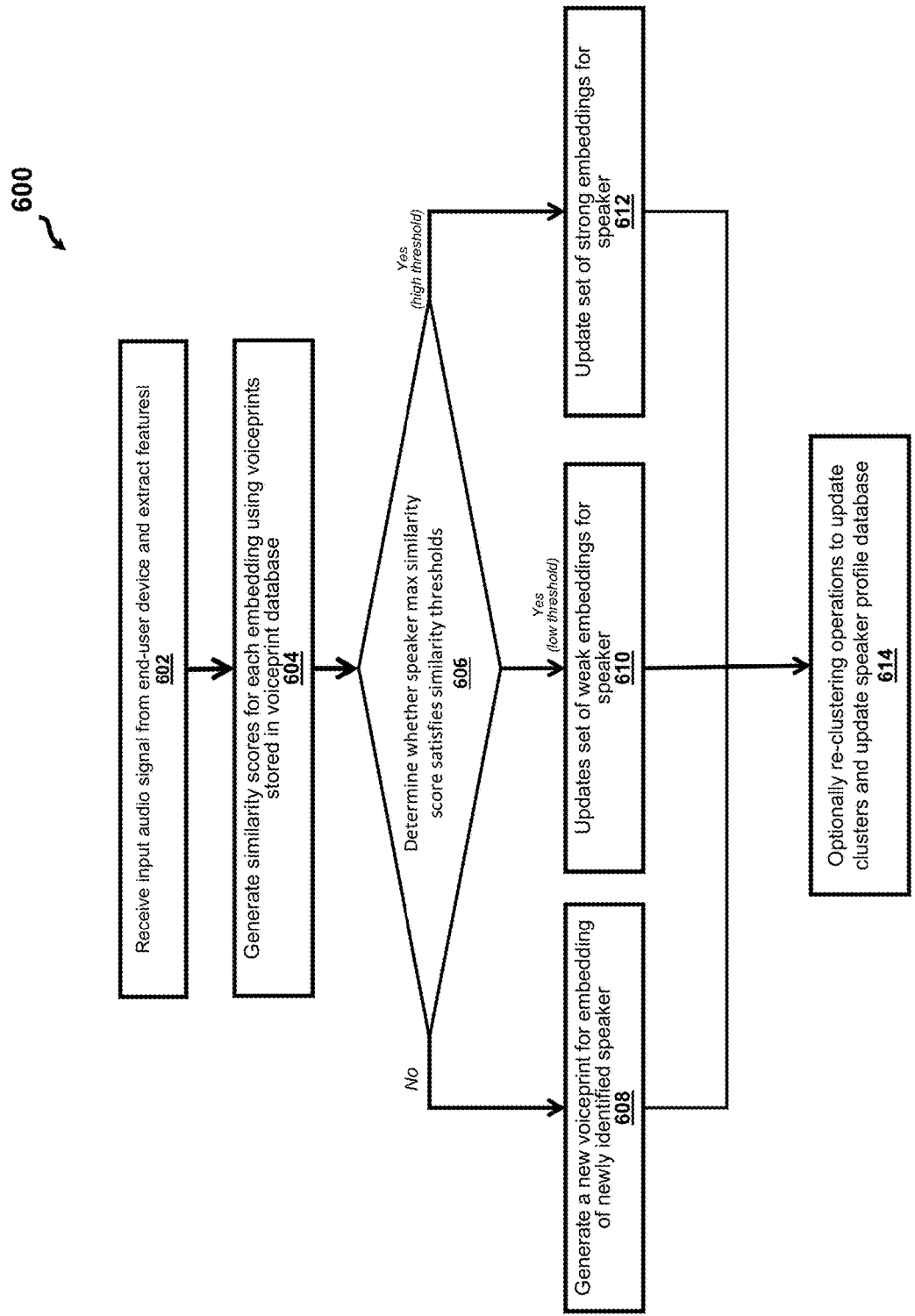
FIG. 6 shows operational steps of a method for clustering speakers when audio processing.

FIG. 6 shows operational steps of a method 600 for clustering speakers when audio processing. The method 600 described below is performed by a server of an analytics system (e.g., analytics server) executing machine-readable software code, though any number of processors of any number of computing devices may perform the various operations of the method 600. Embodiments may include additional, fewer, or different operations than those described in the method 600. The server applies a machine-learning architecture, comprising any number of machine-learning models and algorithms, on input audio signals to perform various operations. The server and the machine-learning architecture execute the method 600 during an enrollment phase, though the server and the machine-learning architecture may perform the various operations of the method 600 during the enrollment phase, a deployment phase, or as an ongoing combination of such phases.

The server executes the method 600 during (active or passive) enrollment operations, deployment operations, and/or during re-clustering database-updating operations. For clustering operations, the server applies operations of a trained machine learning architecture on current audio signals or historic audio signals, where the audio signals may include enrollment audio signals, inbound audio signals (received during a deployment phase), or the stored audio signals. The machine learning architecture includes any number of machine learning models and various other operations that the server applies on the particular audio signals, including pre-processing (e.g., feature extraction) and clustering operations. The clustering operations facilitate new or known speaker recognition using speaker utterances in the audio signals. The server extracts features or feature vectors (e.g., embeddings) from the audio signals and then clusters the extracted information (e.g., features, embeddings) into clusters corresponding to speakers present in the audio signal. The method 600 includes unsupervised clustering operations, though in some embodiments, the server may perform supervised clustering operations.

In step 602, the server receives an input audio signal from an end-user device and extracts various type of features from the audio signal. The audio signal may be a data file or data stream containing audio data in a machine-readable format.

The audio data comprises an audio recording including any number of speaker utterances for any number of speakers. The audio data may also include data or metadata received with the audio signal. For example, the audio data may include speaker-related information (e.g., user/speaker identifier, sub scriber/household identifier, user biometrics) or metadata related to the communications protocols or medium (e.g., TCP/IP header data, phone number/ANI).

The server receives the audio signal and extracts various types of features from the audio data. The features include low-level spectro-temporal features from the various speaker utterances. The features may also include various data related to the users or speakers (e.g., subscriber identifiers, speaker identifiers, biometrics) or metadata values extracted from protocol information or data packets (e.g., IP address). A machine-learning architecture, comprising various machine-learning models (e.g., embedding extractor model), extracts embeddings for putative speakers based upon the features extracted from the input audio signal.

In step 604, the machine-learning architecture generates one or more similarity scores by comparing the features or the embeddings extracted for a particular speaker against the corresponding features or embeddings of other putative speakers and/or against the corresponding features or embeddings of speaker clusters stored in the database. The clusters represent a collection of utterances similar to a particular speaker where the speaker voiceprint represents a centroid for the speaker cluster. The server applies the machine-learning architecture on the audio signal to extract the embedding for the particular speaker. The server compares the embeddings or features against speaker clusters stored in the speaker profile database and then determines the similarity scores for the speakers. For each particular speaker, the server generates a set of similarity scores based upon a relative distance between the speaker embedding (extracted from the input audio signal) and the voiceprints stored in the speaker profile database.

Additionally or alternatively, the server performs clustering operations according to certain features extracted from the input audio signal and determines one or more clustering similarity scores for each user based upon the extracted features.

The server identifies pairs of speaker clusters and speakers having the maximum similarity score. For each speaker, the server outputs the maximum similarity score calculated for the particular speaker, representing the most likely match between the speakers.

In step 606, the server determines whether the similarity score for a particular speaker satisfies a low similarity threshold or a high similarity threshold. The server determines whether the input audio signal includes an utterance for a new or known speaker by evaluating the similarity score of the corresponding embedding or features against known voiceprints or expected features. If the server determines that the similarity score for the particular speaker embedding satisfies the high similarity threshold, then the server determines that the speaker is likely associated with a known registered user. On the other hand, if the server determines that the similarity score for the particular embedding fails the low similarity threshold, then the server determines that the speaker is likely a new unknown user. If the server determines that the similarity score satisfies the low threshold but also fails to satisfy the high threshold, then the server determines that the In step 608, the server generates a new voiceprint and a new speaker profile in response to the server determining that the embedding for the particular speaker fails the low similarity threshold (in step 606). The server generates the new speaker profile in the analytics database or another memory location configured to store temporary or guest speaker profiles. The server stores various types of data into the new speaker profile, which the server identifies in or extracts from the input audio signal (e.g., speaker identifier, embeddings, voiceprint, features, metadata, device information).

In step 610, the server generates or updates a list of weak embeddings for a known user in response to the server determining that the embedding satisfies the lower threshold but fails to satisfy the high threshold (in step 606). The list of weak embeddings operates as a buffer or quarantine storage location associated with the particular speaker, but the embedding (and utterance) lack enough similarity with the corresponding voiceprint for immediately characterizing the weak embedding as part of the particular speaker cluster. The weak embedding is stored with the audio data and various types of data (e.g., audio recordings, utterances, metadata, embedding) that potentially originated from the known user.

In step 612, the server updates a stored voiceprint and an existing enrolled (or known) speaker profile in the database, in response to the server determining that the embedding for the particular known speaker satisfies the similarity threshold (in step 606). The server updates a list of strong embeddings associated with the known user. The list of strong embeddings includes the embeddings that the server uses to generate the voiceprint or cluster for the known user. The server updates the speaker profile for the known speaker in the analytics database or in a temporary or guest speaker profile. The server stores various types of data received with the strong embedding into the known speaker profile, which the server identifies in or extracts from the input audio signal (e.g., speaker identifier, embeddings, voiceprint, features, metadata, device information).

In optional step 614, the server performs a re-clustering operation, updates the clusters in the database, and updates the database accordingly. The server performs one or more re-clustering operations to reevaluate the speaker clusters and update the speaker profiles of the speaker profile database. The server performs the re-clustering operations in response to a particular triggering condition. Non-limiting examples of the triggering condition may include a preconfigured periodic time interval or when the server receives a threshold number of utterances associated with, for example, a subscriber (e.g., household) or user, among others. The server extracts features or embeddings for the speakers to generate new voiceprints or update existing voiceprints for the speaker profiles. The server re-computes the similarity scores for the speakers based upon the relative distances between the features or embeddings of extracted for each particular utterance and each particular voiceprint or other type of cluster centroid. The server stores the new or updated voiceprints into new or updated speaker profiles, along with various types of data associated with the speaker.

In some cases, the server re-evaluates each list of weak embeddings to determine whether the weak embeddings are sufficiently similar to the particular known speaker, or any other speaker. Re-clustering might update one or more voiceprints, clusters, or thresholds. As a result, one or more weak embeddings might better match certain voiceprints or clusters, according to the server's re-computed similarity scores. If the server determines that a certain weak embedding satisfies the similarity threshold of a particular voiceprint, then server adds the weak embedding and related audio data into the speaker profile corresponding to the particular voiceprint and updates the voiceprint and speaker profile according to the weak embedding.

In some cases, the server re-evaluates each list of strong embeddings to determine whether the strong embeddings remain sufficiently similar to the particular known speaker or any other speaker. As a result of re-clustering operations, one or more strong embeddings no longer sufficiently match the particular speaker voiceprint or cluster, or might better match another voiceprint or cluster, according to the server's re-computed similarity scores. If the server determines that a certain strong embedding no longer satisfies the similarity threshold of a particular voiceprint, then server removes the strong embedding and related audio data from the speaker profile corresponding to the particular voiceprint and updates the voiceprint and speaker profile according to the remaining strong embeddings. If the server determines that a certain strong embedding satisfies the similarity threshold of a particular voiceprint, then server adds the strong embedding and related audio data into the speaker profile corresponding to the particular voiceprint and updates the voiceprint and speaker profile according to the strong embedding.

Label Corrections

Figure 7A:
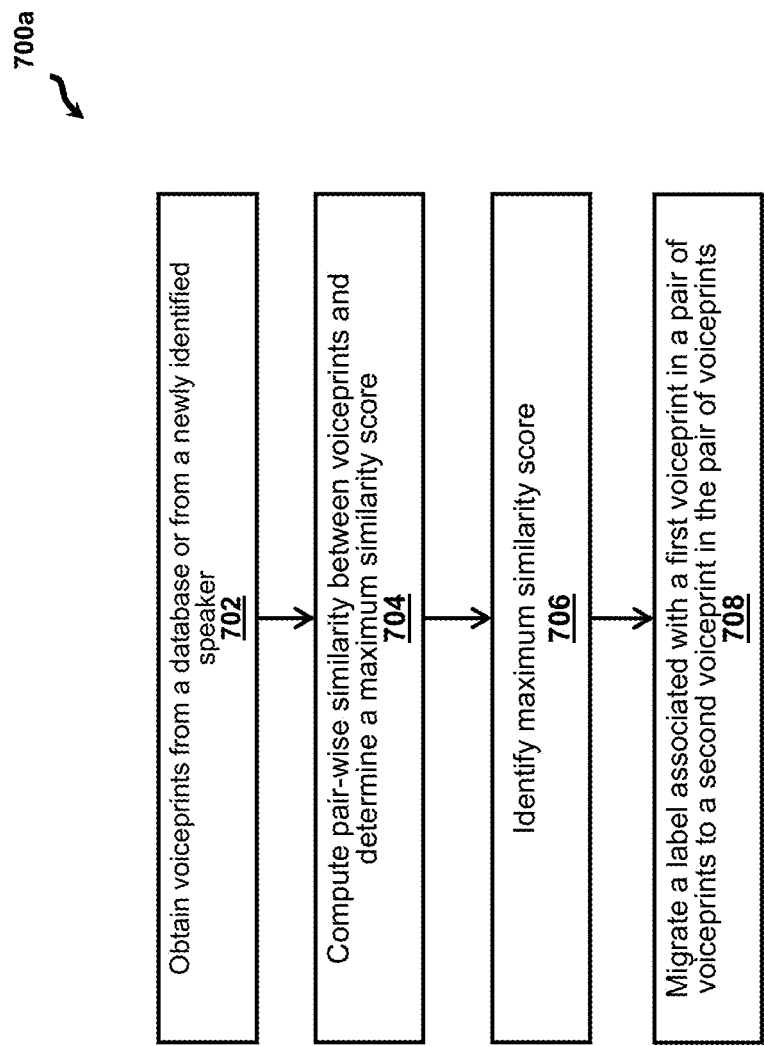
FIG. 7A shows operational steps of a method for correcting label identifiers (e.g., speaker identifiers, subscriber identifiers) of one or more voiceprints according to current and/or historical information.

FIG. 7A shows operational steps of a method 700a for correcting label identifiers (e.g., speaker identifiers, subscriber identifiers) of one or more voiceprints according to current and/or historical information. The method 700a described below is performed by a server of an analytics system (e.g., analytics server) executing machine-readable software code, though any number of processors of any number of computing devices may perform the various operations of the method 700a. Embodiments may include additional, fewer, or different operations than those described in the method 700a. The server applies a machine-learning architecture, comprising any number of machine-learning models and algorithms, on input audio signals to perform various operations. The server and the machine-learning architecture execute the method 700a during an enrollment phase, though the server and the machine-learning architecture may perform the various operations of the method 700a during the enrollment phase, a deployment phase, or as an ongoing combination of such phases.

The server receives an audio signal from an end-user device and extracts various type of features from the audio signal. The audio data comprises an audio recording including any number of speaker utterances for any number of speakers. The server extracts various types of features from the audio signal. The features include low-level spectro-temporal features from the various speaker utterances. The features may also include various data related to the users or speakers (e.g., subscriber identifiers, speaker identifiers, biometrics) or metadata values extracted from protocol information or data packets (e.g., IP address). A machine-learning architecture, comprising various machine-learning models (e.g., an embedding extractor model), extracts embeddings for inbound speakers based upon the features extracted from the audio signal.

The server generates one or more similarity scores by comparing the features or the embeddings extracted for a particular speaker against the corresponding features or embeddings of other putative speakers and/or against the corresponding features or embeddings of voiceprints stored in the database. The server determines the similarity score by evaluating a relative distance between the embeddings and the voiceprints. The server may determine a relative distance according to distance measures such as Euclidean distance measures and/or correlation-based measures. Additionally or alternatively, the server may evaluate the similarity of the embeddings and voiceprints by determining a similarity score using, for example cosine similarity approaches or probabilistic linear discriminant analysis (PLDA). If a maximum similarity scores associated with each embedding does not satisfy one or more thresholds, the server may use the embedding to create a new speaker profile (e.g., identify a new speaker with a new cluster, new voiceprint, new speaker identifier).

Figure 7B:
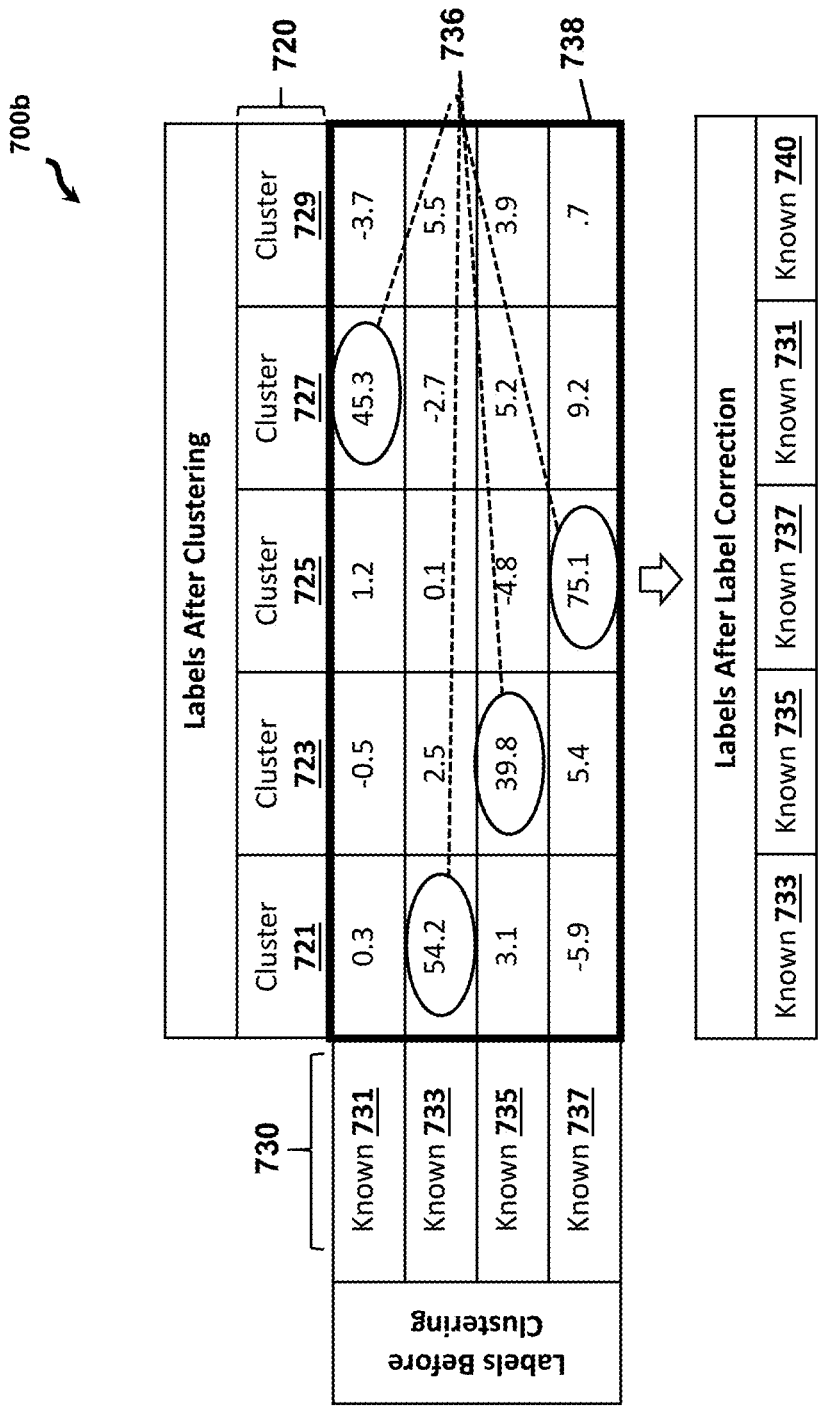
FIG. 7B illustrates an example of label correction using clusters for a particular speaker and clusters of other putative speakers.

FIG. 7B illustrates an example 700b of label correction using clusters for a particular speaker and clusters of other putative speakers. As described above, in one example, the server creates a new speaker profile if a maximum similarity score associated with an embedding does not satisfy one or more thresholds. Cluster 721, Cluster 723, Cluster 725, Cluster 727, Cluster 729 (collectively referred to as "clusters 720") represent the embedding clusters extracted from the audio signal. The server may not associate any of clusters 720 with speaker identifiers. Additionally or alternatively, the server may determine to associate new speaker identifiers with clusters 720.

Referring back to FIG. 7A, in step 702, the server obtains label identifiers (e.g., subscriber identifier, speaker identifier) and voiceprints. The server obtains the label identifiers from a database or generates new label identifiers for unknown speakers. The server obtains one or more new label identifiers and voiceprints from a newly created speaker profile. Additionally or alternatively, the server obtains prior label identifiers and voiceprints by querying a speaker database and retrieving data for particular speaker profiles. The server retrieves, for example, speaker profiles associated with a subscriber identifier, speaker profiles recently accessed and/or modified by the server (e.g., speaker profiles retrieved by the analytics server in the past two days), speaker profiles associated with particular speaker characteristics, speaker profiles associated with particular speaker independent characteristics, and/or speaker profiles associated with other metadata. The retrieved speaker profiles may include certain label identifiers (e.g., subscriber identifier, speaker identifier) and voiceprints. The server may also fetch all speaker profiles from one or more databases.

Referring back to FIG. 7B, as an example, when the server executes a re-clustering operation for the database records (e.g., speaker profiles) associated with a particular subscriber identifier, the server retrieves prior label identifiers and voiceprints associated with the particular subscriber identifier. The server receives the clusters Known 731, Known 733, Known 735, and Known 737 (collectively referred to as "known clusters 730") in response to querying a database for the subscriber identifier associated with the clusters 720 extracted from the audio signal.

Referring back to FIG. 7A, in step 704, the server generates voiceprint-pair similarity scores by computing pairwise similarities from among the various voiceprints. The server compares each voiceprint against each of the other voiceprints to compute the voiceprint-pair similarity scores. The server computes each particular voiceprint-pair similarity score by evaluating, for example, the relative distance between the two voiceprints of the pair, the cosine similarity of the two voiceprints, or the PLDA of the two voiceprints. The server identifies each maximum voiceprint-pair similarity score for each of the voiceprints to identify best-match voiceprint-pairs.

Referring back to FIG. 7B, the voiceprint similarity score matrix 738 identifies the similarity scores of each of the clusters 720 compared to each of the known clusters 730. Each cell in the similarity score matrix 738 represents a similarity score comparing a known cluster of known clusters 730 and a cluster of clusters 720. The maximum cluster-pair similarity score for each of the clusters 720 and known clusters 730 is identified at 736.

Referring back to FIG. 7A, in step 706, the server identifies each particular maximum voiceprint-pair similarity score. Optionally, the server may determine whether each particular maximum voiceprint-pair similarity score satisfies a preconfigured re-label threshold (sometimes called a migration threshold). The re-label threshold may be the same as a similarity threshold described herein used for matching inbound embeddings with a particular voiceprint.

In some implementations, the voiceprints may be associated with various re-label thresholds that depend upon a level of maturity for a given voiceprint in the voiceprint-pair. For example, a particular voiceprint is associated with a low similarity threshold and a high similarity threshold in the speaker profile. In an example, the server compares the maximum voiceprint-pair similarity score against, for example, the low similarity threshold. The server may also statistically or algorithmically combine thresholds (e.g., the thresholds associated with each of the voiceprints).

In step 708, the server re-labels or migrates the label identifiers. The server may re-label or migrate the label identifiers associated with either voiceprint to new or updated speaker profiles associated with the clusters. In addition to re-labeling the label identifiers, the server may determine to merge the voiceprints by averaging each of the voiceprints or applying the machine-learning architecture to the voiceprints to algorithmically combine the voiceprints.

Referring back to FIG. 7B, the server updates or corrects the label identifiers of clusters 720 by migrating the label identifiers of known clusters 730 and replacing the label identifiers of clusters 720. For example, Cluster 721 is most similar to Known 733, indicated by the maximum similarity score of 54.2 being greater than the similarity scores of Cluster 721 and the other clusters of known clusters 730 (e.g., 0.3, 3.1, and −5.9 respectively).

Similarly, the server determined that Cluster 723 was most similar to Known 735, indicated by the maximum similarity score of 39.8 being greater than the similarity scores of Cluster 723 and the other clusters of known clusters 730 (e.g., −0.5, 2.5, and 5.4 respectively). Although the maximum similarity score of 39.8 associated with Cluster 723 and Known 735 is less than the maximum similarity score of 54.2 associated with Cluster 721 and Known 733, the server still migrated the Known 735 label identifier to Cluster 723. The server's re-label or migration of the label identifiers associated with Cluster 721, Cluster 723, Cluster 725, Cluster 727 indicates that clusters Cluster 721, Cluster 723, Cluster 725, Cluster 727 were previously identified by the server (e.g., Known 731, Known 733, Known 735, and Known 737). The server created a new speaker profile for Cluster 729 because Cluster 729 was not similar enough to any of the putative speaker profiles. The server generated a new label identifier Known 740 for cluster 729 to represent the server creating a new speaker profile.

Full Passive and Continuous Enrollment

Figure 8:
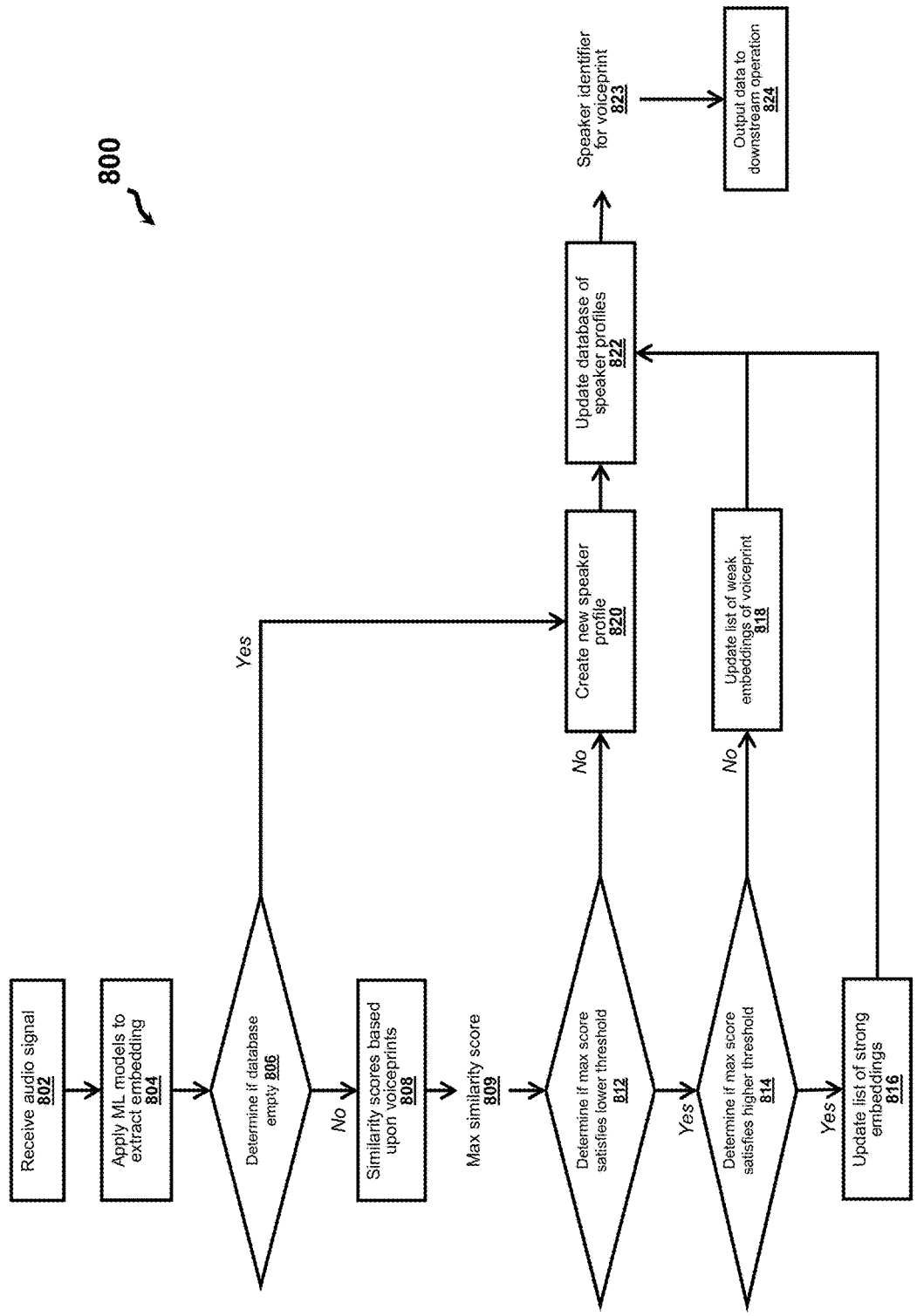
FIG. 8 shows operational steps of a method for audio processing using passive and continuous enrollment configurations.

FIG. 8 shows operational steps of a method 800 for audio processing using passive and continuous enrollment configurations. The method 800 described below is performed by a server of an analytics system (e.g., analytics server) executing machine-readable software code, though any number of processors of any number of computing devices may perform the various operations of the method 800. Embodiments may include additional, fewer, or different operations than those described in the method 800. The server applies a machine-learning architecture, comprising any number of machine-learning models and algorithms, on input audio signals to perform various operations. The server and the machine-learning architecture execute the method 800 during an enrollment phase, though the server and the machine-learning architecture may perform the various operations of the method 800 during the enrollment phase, a deployment phase, or as an ongoing combination of such phases.

In step 802, the server receives an input audio signal containing one or more utterances of one or more speakers. The server receives the input audio signal from an end-user device and extracts various types of features from the input audio signal, where the server receives the input audio signal directly from the end-user device or via an intermediary device (e.g., third-party server). The input audio signal comprises a data file or data stream containing audio data in a machine-readable format. The audio data comprises audio recording that includes any number of speaker utterances for any number of speakers. The input audio signal includes an utterance of a speaker-user, where the input audio signal is a data file (e.g., WAV file, MP3 file) or a data stream. The input audio signal may be an enrollment audio signal or inbound audio signal, where server receives the input audio during an enrollment phase or deployment phase. The server extracts various types of features from the input audio signal, such as spectro-temporal features or metadata. Additionally or alternatively, the server performs various pre-processing operations on the input audio signal, such as parsing the audio signal into segments or frames of speech or performing one or more transformation operations (e.g., Fast-Fourier Transform), among other potential operations In step 804, the server applies a machine-learning architecture, comprising any number of machine-learning models, on the features extracted from the input audio signal. An embedding extraction model of the machine-learning architecture extracts an inbound embedding for the inbound speaker using the features extracted from the input audio signal.

In determination step 806, the server determines whether a database (e.g., voiceprint database, speaker profile database) is empty. The database includes data records for particular households, subscribers or other collection of individuals who are customers of a third-party content service or a data analytics service. The data records include speaker profiles for particular speakers associated with speaker identifiers. In some implementations, the server determines whether a portion of the database is empty. For instance, the server determines whether the database contains any speaker profiles associated with a particular subscriber identifier (e.g., speaker profiles for a household).

In step 808, the server generates similarity scores for the speaker embedding generated for the utterances based upon the relative distance between each embedding and each voiceprint stored in the database, when the server determines that the database is not empty (in step 806). For each particular speaker, the server outputs the max similarity score 809, representing the particular inbound speaker most closely matching (by similarity score) a particular voiceprint.

In determination step 812, for each particular inbound speaker embedding, the server determines whether the corresponding max similarity score 809 satisfies a low similarity threshold. In some cases, the low similarity threshold is a preconfigured default value or an adaptive threshold tailored for the particular voiceprint and putative enrolled registered speaker (as in FIG. 4).

In determination step 814, if the server determines that the particular max similarity score 809 satisfies the low threshold (in step 812), then the server determines whether the max similarity score 809 satisfies a high similarity threshold. In some cases, the high similarity threshold is a preconfigured default value or an adaptive threshold tailored for the particular voiceprint and the putative enrolled registered speaker (as in FIG. 4).

In step 816, the server updates a list of strong embeddings, if the server determines that the max similarity score 809 satisfies the high threshold (in step 814). The server uses the strong embeddings for generating the voiceprints. For instance, the server updates the particular voiceprint using the particular inbound strong embedding. The server may further update the corresponding speaker profile to include the updated voiceprint. Because the max similarity score 809 for the particular embedding satisfied the high threshold, the server determines that the particular inbound embedding is likely the putative enrolled registered speaker.

In step 822, after updating the list of strong embeddings, the server updates the database containing the speaker profiles to include the strong inbound embedding. The server adds the inbound embedding to the particular speaker profile having the voiceprint that best matched the inbound embedding. The server updates the speaker profile having the speaker identifier that is associated with the voiceprint best matched to the inbound embedding.

In step 820, the server creates a new speaker profile in the database, when the server determines that the database empty (in step 806) or that the max similarity score 809 for a particular inbound embedding fails to satisfy the low similarity threshold (in step 812). The server assigns a new speaker identifier to the new speaker profile, where the server received the speaker identifier from the third-party server. In some implementations, the server receives a hashed (or otherwise obfuscated) version of a corresponding speaker identifier used by the third-party server, thereby maintaining speaker privacy by preventing the server from receiving any personally identifying information about the particular speaker.

In some cases, the new speaker profile is a temporary or guest speaker profile having a limited, predetermined lifecycle. In such cases, the server or database purges the data of the temporary profile from the database after a preconfigured amount of time for maintaining the temporary profile. The server or database also restarts this lifecycle clock for maintaining the temporary profile, for each instance that the server identifies another inbound embedding that satisfies the high or low thresholds for matching the threshold temporary voiceprint (as in step 812 or step 814).

If the server determines that the voiceprint of the temporary profile is mature, then the server converts the temporary profile into a permanent speaker profile in the database, thereby updating the speaker profile in current step 820. For instance, the server receives determines that the temporary profile is mature upon receiving a threshold number embeddings that satisfy the high threshold for the temporary voiceprint (as in step 814) from the particular speaker.

In step 818, the server updates a list of weak embeddings, when the server determines the max similarity score 809 for the particular embedding fails to satisfy the higher threshold (in step 814) for the nearest-matching voiceprint in the database, but the inbound embedding already satisfied the low threshold (in step 812). The list of weak embeddings functions effectively as a buffer or quarantine that contains the embeddings that potentially match the corresponding nearest voiceprints. The server can reference these weak embeddings in later operations, such as re-clustering operations, to determine whether to include the weak embeddings in the speaker profile of the nearest-voiceprint.

In step 822, the server updates the database to include the embeddings and speaker information. For a particular speaker embedding, the database receives one or more updates, such as an updated list of strong embeddings (from step 816), an updated list of weak embeddings (from step 818), or the new data record (from step 820). The database stores the updates of step 822 with the speaker identifier 823 associated with the embedding, speaker profile information, or lists of embeddings. The speaker identifier 823 is an anonymized value representing a user identifier of a content system, such that the content server does not expose any personal information about the speaker to the analytics server.

In step 824, the server outputs the speaker identifier 823 and any related information about the speaker profile requested by the content server for downstream operations. The server transmits the user identifier 823 to, for example, computing devices of the media content system, end-user devices, or any other devices that perform the particular downstream operation. In some implementations, the server also transmits additional speaker profile information from the speaker profile stored in a database record.

Mixed Active-Passive and Continuous Enrollment

Figure 9:
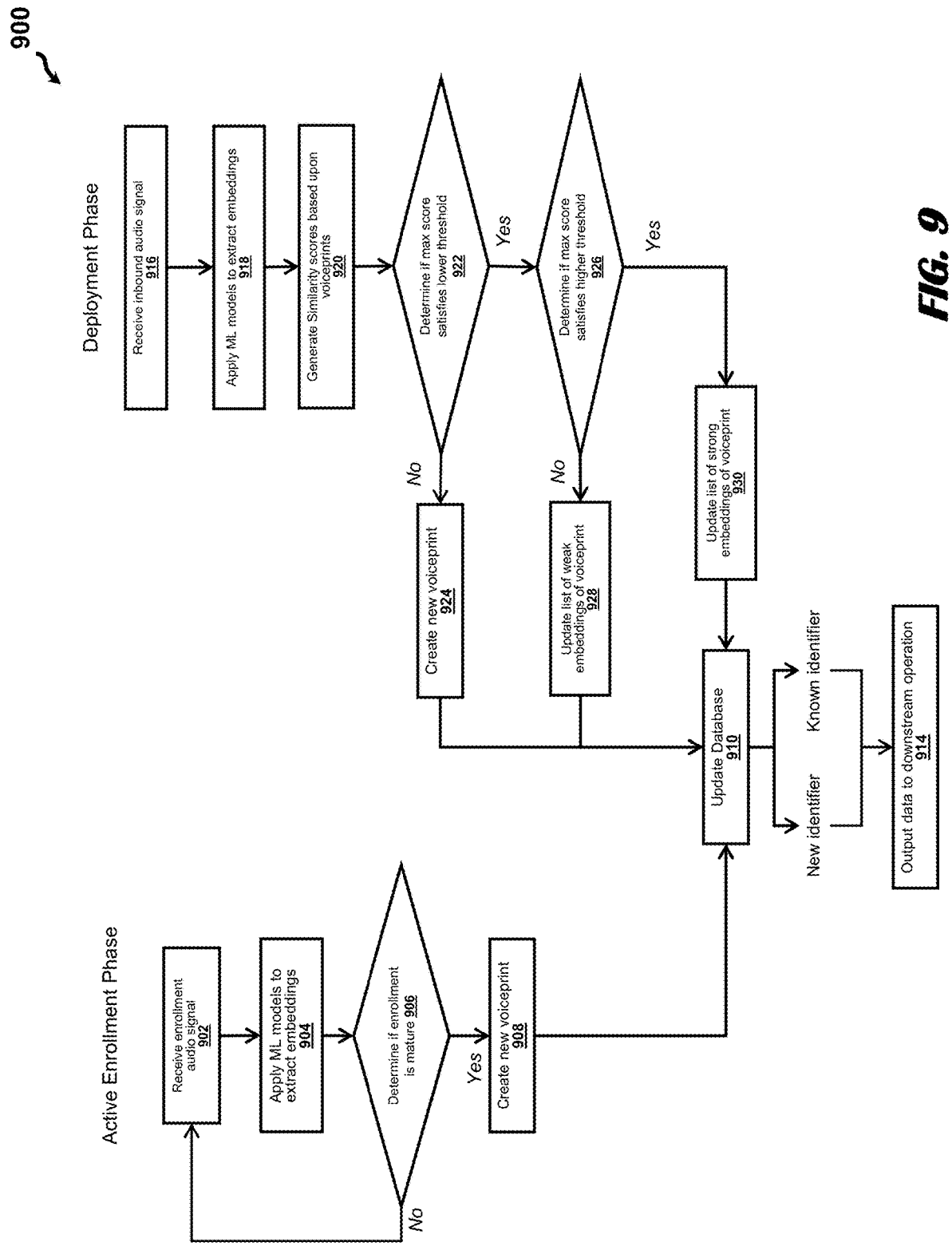
FIG. 9 shows operational steps of a method for audio processing audio signals using mixed active-passive and continuous enrollment configurations.

FIG. 9 shows operational steps of a method 900 for audio processing audio signals using mixed active-passive and continuous enrollment configurations. A server, or other computing device, executes the method 900, though the server may execute the method 900 during an enrollment phase in some embodiments. The server executes the method 900 during an active enrollment phase and a deployment phase. During the active enrollment phase, the server receives enrollment audio signals from an enrolled speaker who is responding to one or more audio prompts and/or visual prompts. The prompts request the enrolled speaker to response audibly, which the server receives as enrollment audio signals to generate enrolled voiceprints, enroll the particular speaker, and generate corresponding speaker profile data in a database. During the deployment phase, the server receives inbound audio signals that the server evaluates to identify a particular inbound speaker. The server is also capable of continuously, passively enrolling unknown speakers. If the server cannot identify the inbound speaker, then the server passively enrolls the unknown speaker and generates a new data record for the new speaker in the database.

In step 902, the server receives an enrollment audio signal from an enrolled user comprising utterances of a speaker-user. The server receives the enrollment audio signals from an end-user device via an intermediate content server. The server extracts features from the enrollment audio signals. The features may be spectro-temporal features and, in some cases, various types of data or metadata. The server may also perform various pre-processing operations on the enrollment audio signal, such as various data augmentation operations. The server may extract features from the utterances including Mel frequency cepstrum coefficients (MFCCs), Mel Filter banks, Linear filter banks, bottleneck features, and the like. In some cases, the server extracts the features from the enrollment audio signal using machine-learning models configured to extract features and generate the speaker embeddings.

In step 904, the server applies a machine-learning architecture, comprising any number of machine-learning models, on the features extracted from the input audio signal. An embedding extraction model of the machine-learning architecture extracts an inbound embedding for the inbound speaker using the features extracted from the input audio signal. The server extracts embeddings from the enrollment signal by applying a machine-learning architecture comprising various machine-learning models (e.g., embedding extractor).

The type of enrollment signal may dictate how the server extracts embeddings. For example, a user may provide a fingerprint as an enrollment signal. In other examples, the server may extract features associated with the digital fingerprint image, including ridges, valleys, and minutiae; and/or the server may extract the features using machine-learning models configured to extract features of image data. The server extracts the various types of features using machine-learning models configured to extract features and generate the corresponding embeddings for the particular types of biometrics employed for user recognition, in conjunction with the speaker embeddings.

In determination step 906, the server determines whether the enrollment voiceprint mature. The server may determine that the enrollment is mature when the server has extracted enough embeddings (or biometric information) to satisfy a threshold number of embeddings or other information, such that the server can mathematically identify the user of a particular signal. For example, the server may determine that enrollment is mature when the server receives a threshold duration of net speech from one or more audio signals containing utterances from the enrollee. Additionally or alternatively, the server may determine that enrollment is mature when the server receives a predetermine number of various enrollment signals (e.g., two fingerprint scans and two utterances, five different utterances).

If the enrollment is incomplete (e.g., not mature), the server prompts the user for an enrollment signal (as in step 902). The server prompts the user for additional enrollment signals (having enrollment utterances) until the enrollment is mature. As an example, if the server receives an enrollment utterance with a first type of content (e.g., user name), then the server prompts the user for a second utterance (e.g., user birthday). As another example, if the server receives biometric information (e.g., fingerprint), the server prompts the user for an audio signal containing an enrollment utterance.

If the enrollment is mature, the server proceeds to step 908. In step 908, the server creates a new enrollee voiceprint for the enrolled speaker-user. The server statistically or algorithmically combines the enrollment embeddings to extract the voiceprint for the enrolled speaker-user. The server stores the enrollment voiceprint into the speaker profile, along with any various other non-identifying information about the enrollee. The server may also generate a new speaker identifier or request the new speaker identifier from the content server.

In step 910, the server updates the database by storing, for example, the new enrolled voiceprint and other information in the new speaker profile (e.g., speaker identifier, subscriber identifier), thereby registering/enrolling the new speaker-user.

In step 914, the server outputs the new speaker identifier and any related information about the new speaker profile requested by the content server for downstream operations. The server transmits the new speaker identifier to, for example, computing devices of a media content system, end-user devices, or any other devices that perform the particular downstream operation. In some implementations, the server also transmits additional new speaker profile information from the new speaker profile stored in a new database record.

Following the active enrollment phase, the server enters the machine-learning architecture into a deployment phase in which the server evaluates inbound audio signals for enrolled speakers, yet the server also continues to passively enroll new, unrecognized speakers.

In step 916, receives an inbound audio signal containing one or more utterances of one or more inbound speakers from an end-user device via the intermediate content server. The server extracts features from the inbound audio signal. The features may be spectro-temporal features and, in some cases, various types of data or metadata. The server may also perform various pre-processing operations on the inbound audio signal, such as various data augmentation operations. The server may extract features from the utterances including Mel frequency cepstrum coefficients (MFCCs), Mel Filter banks, Linear filter banks, bottleneck features, and the like. In some cases, the server extracts the features from the inbound audio signal using machine-learning models configured to extract features and generate the speaker embeddings. In some configurations, the server may perform pre-processing operations on the inbound signal (e.g., partition the inbound signal, scale the inbound signal, de-noise the inbound signal).

In step 918, the server applies the machine-learning architecture on the inbound audio signal to extract an embedding for each of the inbound speakers. The server extracts each inbound embeddings from the inbound audio signal based upon the features extracted from the inbound audio signal.

In step 920, the server generates a similarity score for each inbound speaker embedding generated for the utterances based upon the relative distance between the particular inbound embedding and each voiceprint stored in the database. For each particular speaker, the server outputs the max similarity score, representing the particular inbound speaker most closely matching (by similarity score) a particular voiceprint.

In determination step 922, for each particular inbound speaker embedding, the server determines whether the corresponding max similarity score satisfies a low similarity threshold. In some cases, the low similarity threshold is a preconfigured default value or an adaptive threshold tailored for the particular voiceprint and putative known speaker (as in FIG. 4).

In step 924, the server creates a new speaker profile in the database, when the server determines that the max similarity score for the particular inbound embedding fails to satisfy the low similarity threshold (in step 922). The server assigns a new speaker identifier to the new speaker profile, where the server received the speaker identifier from the third-party server. In some implementations, the server receives a hashed (or otherwise obfuscated) version of a corresponding speaker identifier used by the third-party server, thereby maintaining speaker privacy by preventing the server from receiving any personally identifying information about the particular speaker.

In determination step 926, the server determines whether the max similarity score satisfies a high similarity threshold, if the server determines that the max similarity score satisfies the low threshold (in step 922). In some cases, the high similarity threshold is a preconfigured default value or an adaptive threshold tailored for the particular voiceprint and the putative enrolled registered speaker (as in FIG. 4).

In step 928, the server updates a list of weak embeddings, if the server determines the max similarity score for the particular embedding fails to satisfy the higher threshold (in step 926) for the nearest-matching voiceprint in the database, but the inbound embedding already satisfied the low threshold (in step 922). The list of weak embeddings functions effectively as a buffer or quarantine that contains the embeddings that potentially match the corresponding nearest voiceprints. The server can reference these weak embeddings in later operations, such as re-clustering operations, to determine whether to include the weak embeddings in the speaker profile of the nearest-voiceprint.

In step 930, the server updates a list of strong embeddings, when the server determines that the max similarity score satisfies the high threshold (in step 926). The server uses the strong embeddings for generating the voiceprints. For instance, the server updates the particular voiceprint using the particular inbound strong embedding. The server may further update the corresponding speaker profile to include the updated voiceprint. Because the max similarity score for the particular embedding satisfied the high threshold, the server determines that the particular inbound embedding is likely the putative enrolled registered speaker In step 910, the server updates the database to include the embeddings and speaker information. For a particular speaker embedding, the database receives one or more updates, such as an updated list of strong embeddings (from step 930), an updated list of weak embeddings (from step 928), or the new data record (from step 924). The database stores the updates of step 910 with the speaker identifier associated with the embedding, speaker profile information, or lists of embeddings. The speaker identifier is an anonymized value representing a user identifier of a content system, such that the content server does not expose any personal information about the speaker to the analytics server.

In step 914, the server outputs the speaker identifiers, new or known identifiers, and any related information about the speaker profile requested by the content server for downstream operations. The server transmits the speaker identifier to, for example, computing devices of the media content system, end-user devices, or any other devices that perform the particular downstream operation. In some implementations, the server also transmits additional speaker profile information from the speaker profile stored in a database record.

Active and Continuous Enrollment

Figure 10:
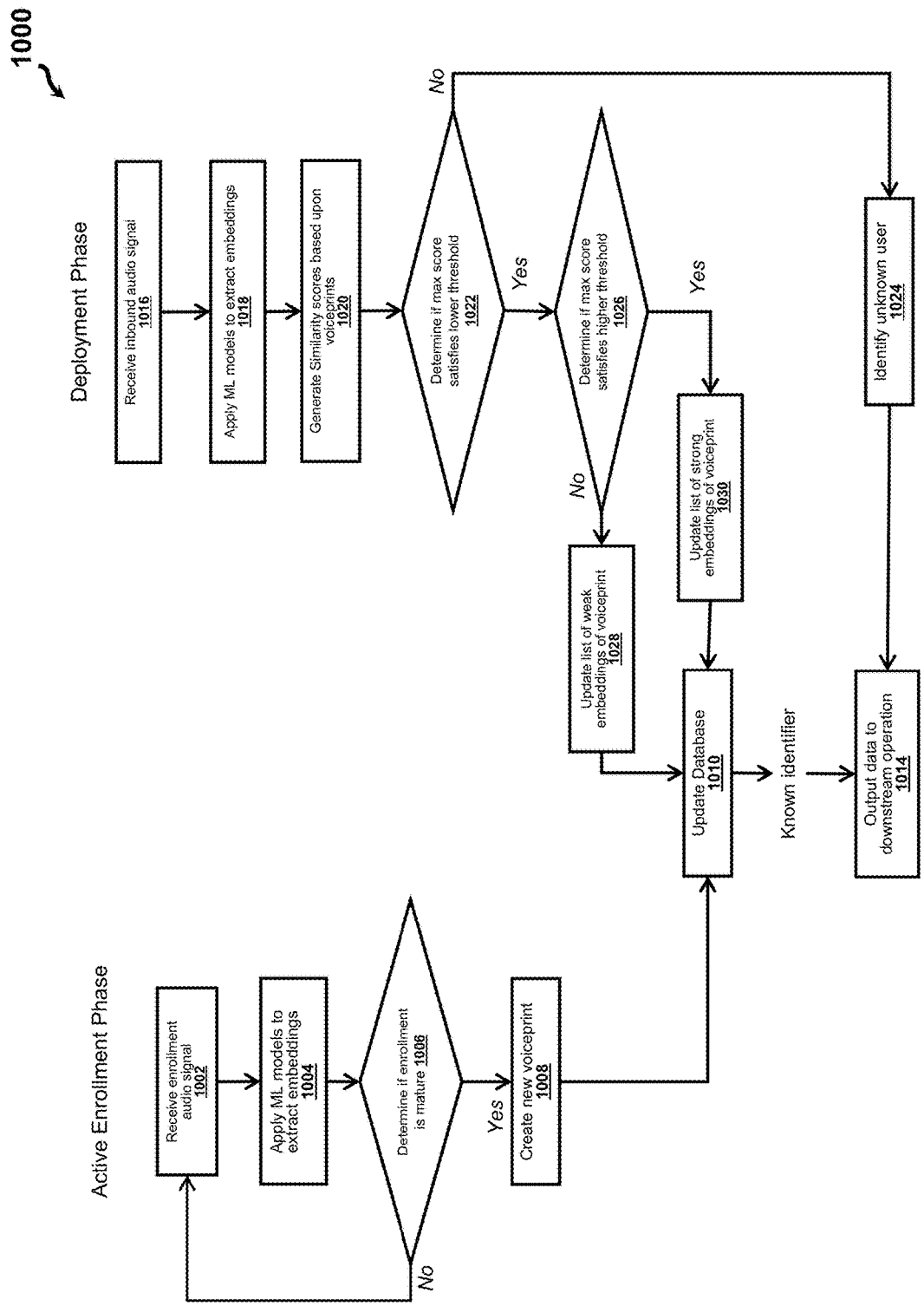
FIG. 10 shows operational steps of a method for audio processing audio signals using active and continuous enrollment configurations.

FIG. 10 shows operational steps of a method 1000 for audio processing audio signals using active and continuous enrollment configurations. A server, or other computing device, executes the method 900, though the server may execute the method 900 during an enrollment phase in some embodiments. The server executes the method 900 during an active enrollment phase and a deployment phase. During the active enrollment phase, the server receives enrollment audio signals from an enrolled speaker who is responding to one or more audio prompts and/or visual prompts. The prompts request the enrolled speaker to response audibly, which the server receives as enrollment audio signals to generate enrolled voiceprints, enroll the particular speaker, and generate corresponding speaker profile data in a database. During the deployment phase, the server receives inbound audio signals that the server evaluates to identify a particular inbound speaker. Unlike the embodiment in FIG. 9, the active enrollment phase is mandatory for enrolling all users. Although the server continuously, passively evaluates audio signals, the server does not passively enroll new, unrecognized speakers. The clustering operations are semi-supervised, but the clustering may be more constrained or more simplified than other embodiments because the server is configured with a known number of clusters in advance. For example, the database allocates a preconfigured number of enrolled speakers who have completed enrollment.

In step 1002, the server receives an enrollment audio signal from an enrolled user comprising utterances of a speaker-user. The server receives the enrollment audio signals from an end-user device via an intermediate content server. The server extracts features from the enrollment audio signals. The features may be spectro-temporal features and, in some cases, various types of data or metadata. The server may also perform various pre-processing operations on the enrollment audio signal, such as various data augmentation operations. The server may extract features from the utterances including Mel frequency cepstrum coefficients (MFCCs), Mel Filter banks, Linear filter banks, bottleneck features, and the like. In some cases, the server extracts the features from the enrollment audio signal using machine-learning models configured to extract features and generate the speaker embeddings.

In step 1004, the server applies a machine-learning architecture, comprising any number of machine-learning models, on the features extracted from the input audio signal. An embedding extraction model of the machine-learning architecture extracts an inbound embedding for the inbound speaker using the features extracted from the input audio signal. The server extracts embeddings from the enrollment signal by applying a machine-learning architecture comprising various machine-learning models (e.g., embedding extractor).

In determination step 1006, the server determines whether the enrollment voiceprint mature. The server may determine that the enrollment is mature when the server has extracted enough embeddings (or biometric information) to satisfy a threshold number of embeddings or other information, such that the server can mathematically identify the user of a particular signal. For example, the server may determine that enrollment is mature when the server receives a threshold duration of net speech from one or more audio signals containing utterances from the enrollee. Additionally or alternatively, the server may determine that enrollment is mature when the server receives a predetermine number of various enrollment signals (e.g., two fingerprint scans and two utterances, five different utterances).

If the enrollment is incomplete (e.g., not mature), the server prompts the user for an enrollment signal (as in step 1006). The server prompts the user for additional enrollment signals (having enrollment utterances) until the enrollment is mature. As an example, if the server receives an enrollment utterance with a first type of content (e.g., user name), then the server prompts the user for a second utterance (e.g., user birthday). As another example, if the server receives biometric information (e.g., fingerprint), the server prompts the user for an audio signal containing an enrollment utterance.

If the enrollment is mature, the server proceeds to step 1008. In step 1008, the server creates a new enrollee voiceprint for the enrolled speaker-user. The server statistically or algorithmically combines the enrollment embeddings to extract the voiceprint for the enrolled speaker-user. The server stores the enrollment voiceprint into the speaker profile, along with any various other non-identifying information about the enrollee. The server may also generate a new speaker identifier or request the new speaker identifier from the content server.

In step 1010, the server updates the database by storing, for example, the new enrolled voiceprint and other information in the new speaker profile (e.g., speaker identifier, subscriber identifier), thereby registering/enrolling the new speaker-user.

In step 1014, the server outputs the new speaker identifier and any related information about the new speaker profile requested by the content server for downstream operations. The server transmits the new speaker identifier to, for example, computing devices of a media content system, end-user devices, or any other devices that perform the particular downstream operation. In some implementations, the server also transmits additional new speaker profile information from the new speaker profile stored in a new database record.

Following the active enrollment phase, the server enters the machine-learning architecture into a deployment phase in which the server evaluates inbound audio signals for enrolled speakers, yet the server also continues to passively enroll new, unrecognized speakers.

In step 1016, receives an inbound audio signal containing one or more utterances of one or more inbound speakers from an end-user device via the intermediate content server. The server extracts features from the inbound audio signal. The features may be spectro-temporal features and, in some cases, various types of data or metadata. The server may also perform various pre-processing operations on the inbound audio signal, such as various data augmentation operations. The server may extract features from the utterances including Mel frequency cepstrum coefficients (MFCCs), Mel Filter banks, Linear filter banks, bottleneck features, and the like. In some cases, the server extracts the features from the inbound audio signal using machine-learning models configured to extract features and generate the speaker embeddings. In some configurations, the server may perform pre-processing operations on the inbound signal (e.g., partition the inbound signal, scale the inbound signal, de-noise the inbound signal).

In step 1018, the server applies the machine-learning architecture on the inbound audio signal to extract an embedding for each of the inbound speakers. The server extracts each inbound embeddings from the inbound audio signal based upon the features extracted from the inbound audio signal.

In step 1020, the server generates a similarity score for each inbound speaker embedding generated for the utterances based upon the relative distance between the particular inbound embedding and each voiceprint stored in the database. For each particular speaker, the server outputs the max similarity score, representing the particular inbound speaker most closely matching (by similarity score) a particular voiceprint.

In determination step 1022, for each particular inbound speaker embedding, the server determines whether the corresponding max similarity score satisfies a low similarity threshold. In some cases, the low similarity threshold is a preconfigured default value or an adaptive threshold tailored for the particular voiceprint and putative known speaker (as in FIG. 4).

In determination step 1026, the server determines whether the max similarity score satisfies a high similarity threshold, if the server determines that the max similarity score satisfies the low threshold (in step 1022). In some cases, the high similarity threshold is a preconfigured default value or an adaptive threshold tailored for the particular voiceprint and the putative enrolled registered speaker (as in FIG. 4).

In step 1028, the server updates a list of weak embeddings, if the server determines the max similarity score for the particular embedding fails to satisfy the higher threshold (in step 1026) for the nearest-matching voiceprint in the database, but the inbound embedding already satisfied the low threshold (in step 1022). The list of weak embeddings functions effectively as a buffer or quarantine that contains the embeddings that potentially match the corresponding nearest voiceprints. The server can reference these weak embeddings in later operations, such as re-clustering operations, to determine whether to include the weak embeddings in the speaker profile of the nearest-voiceprint.

In step 1026, the server updates a list of strong embeddings, when the server determines that the max similarity score satisfies the high threshold (in step 1026). The server uses the strong embeddings for generating the voiceprints. For instance, the server updates the particular voiceprint using the particular inbound strong embedding. The server may further update the corresponding speaker profile to include the updated voiceprint. Because the max similarity score for the particular embedding satisfied the high threshold, the server determines that the particular inbound embedding is likely the putative enrolled registered speaker In step 1010, the server updates the database to include the embeddings and speaker information. For a particular speaker embedding, the database receives one or more updates, such as an updated list of strong embeddings (from step 1030) or an updated list of weak embeddings (from step 1028). The database stores the updates of step 1010 with the speaker identifier associated with the embedding, speaker profile information, or lists of embeddings. The speaker identifier is an anonymized value representing a user identifier of a content system, such that the content server does not expose any personal information about the speaker to the analytics server.

In step 1024, the server generates an alert or other instruction for the intermediate content server or the end-user device indicating that the speaker is unrecognized, if the server determines that the particular inbound speaker embedding fails the low threshold (in step 1022). The server may also be preconfigured to provide additional information to the content server.

In step 1014, the server outputs various types of information to the content server. In some cases, the server transmits the speaker identifiers and any related information about the speaker profile requested by the content server for downstream operations. In such cases, the server transmits the speaker identifier to, for example, computing devices of the media content system, end-user devices, or any other devices that perform the particular downstream operation. In some implementations, the server also transmits additional speaker profile information from the speaker profile stored in a database record. Alternatively, the server transmits the alert or other instructions to the content server indicating that the particular speaker was unrecognized by the server.

Additional Example Embodiments

Figure 11B:
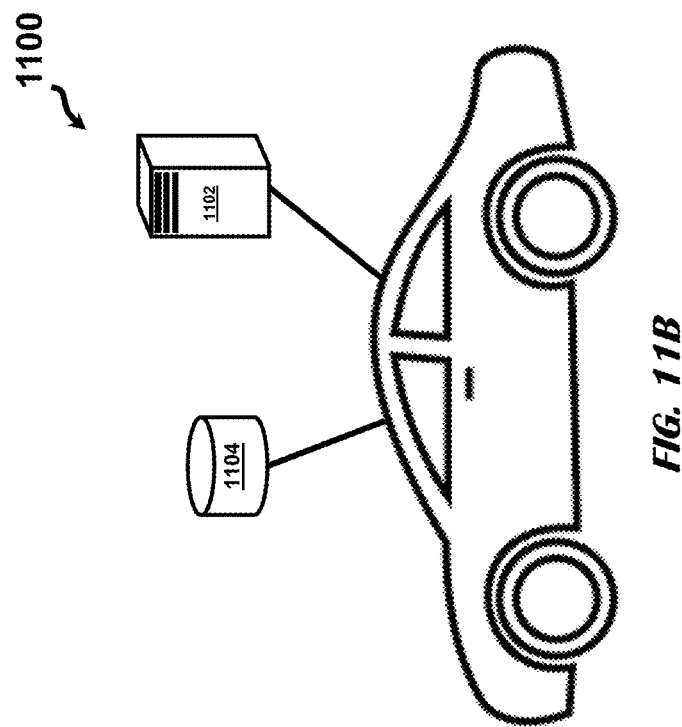
FIGS. 11A-11B shows components of a system employing audio-processing machine-learning operations, where the machine-learning models are implemented by a vehicle.
Figure 11A:
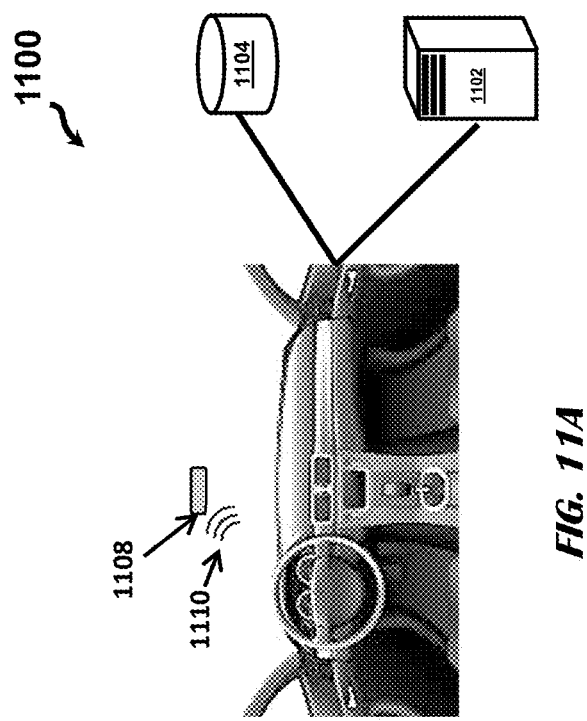

FIGS. 11A-11B shows components of a system 1100 employing audio-processing machine-learning operations, where the machine-learning models are implemented by a vehicle or other edge device (e.g., car, home assistant device, smart appliance).

The vehicle comprises a microphone 1108 configured to capture audio waves 1110 containing speech and convert audio waves 1110 into audio signals for audio processing operations. The vehicle comprises computing hardware and software components (shown as analytics computer 1102 and speaker database 1104) configured to perform the various audio processing operations described herein. The components and operations described in the system 1100 are similar to those of FIGS. 1-2. The system 100 of FIG. 1 placed much of the machine-learning audio-processing operations on the analytics server 102, though the content system 110 might perform certain operations in some embodiments. The system 200 of FIG. 2 placed much of the machine-learning audio-processing operations on the end-user device 214, though the end-user device 214 could still rely upon the analytics system 201 or content system 210 for various operations and database information. The vehicle-based system 1100 of FIG. 11, however, seeks to encapsulate much of the audio-processing operations and data within the vehicle-based system 1100, with relatively less reliance upon the devices of the external system infrastructures.

The analytics computer 1102 receives input data signals from the microphone 1108 and performs various pre-processing operations, such as VAD and ASR to identify utterances. The analytics computer 1102 and apply any number of machine-learning models to extract features, extract embeddings, and compare the embeddings against voiceprints stored in the speaker database 1104. The analytics computer 1102 is coupled to various electronics components of the vehicle, such as the infotainment system, engine, door locks, and other components of the vehicle. The analytics computer 1102 receives voice instructions from the driver or passengers to activate or adjust the various options of the vehicle.

In some embodiments, the analytics computer 1102 employs parental control operations or other limitations on the functions of the vehicle. The speaker profile stored in the speaker database 1104 is includes certain functional limitations that inhibit the analytics computer 1102 from performing certain operations. For example, the analytics computer 1102 may detect speaker embeddings enrolled for a child speaker profile by executing the embedding extraction model, or alternatively by executing a known machine-learning model for determining age using voice. The analytics computer 1102 then inhibits activation of the starter or ignition, thereby preventing the engine from activating, until the analytics computer 1102 detects an embedding matching the voiceprint of an authorized user in the speaker database 1104. This feature is not only a parental control, but also adapted for theft deterrence, whereby the analytics computer 1102 prevents the engine from activating until the analytics computer 1102 affirmatively detects an inbound audio signal containing an inbound embedding from an enrolled speaker-user.

The analytics computer 1102 actively or passively enrolls the driver (e.g., first parent), a secondary driver (e.g., second driver), and passengers (e.g., children). As an example, when the driver first purchases the vehicle, a GUI displayed via the infotainment device shows a prompt that requests the driver speak certain phrases, thereby submitting enrollment utterances captured by the microphone 1108. The analytics computer 1102 then performs the various processes described herein to generate the voiceprint for the driver, which the analytics computer 1102 stores into a speaker profile for the driver in the speaker database 1104. The driver also enters, via the GUI, information about the driver, such as a name and certain preferences related to, for example, the seating position, the radio stations, enabling child-locks, security preferences, headlight-delays, and the like. This speaker information is stored into the speaker profile for the driver. The driver may also input, via the GUI, a number of speakers expected to operate the system 1100 (e.g., ride in the car). The analytics computer 1102 generates clusters and voiceprints according to the number of expected speakers. The analytics computer 1102 may generate speaker profiles according to the number of expected speakers or the analytics computer 1102 generates the speaker profiles by executing the active enrollment, passive enrollment, and/or continuous enrollment operations described herein. For instance, the analytics computer 1102 performs continuous, passive enrollment operations to generate the voiceprint for a child's speaker profile. The driver or child may enter various types of speaker information about the child via the GUI of the infotainment system. This speaker information might include, for example, driver permissions as parental controls mention herein.

In some embodiments, the analytics computer 1102 employs static enrollment configuration, whereby the analytics computer 1102 does not accept unknown speaker embeddings as new enrollments. In addition, the analytics computer 1102 performs authentication functions that rejects authentication of unrecognized voiceprints and does not permit the speaker from accessing certain functions of the vehicle. For example, the analytics computer 1102 could be employed in livery vehicles (e.g., police cars, delivery trucks) to limit unauthorized access to the vehicle and vehicle operation.

The analytics computer 1102 performs continuous enrollment operations for generating the speaker profiles that the analytics computer 1102 stores into the analytics database 1104 according to the speaker voiceprints, as well as various types of data representing the speaker information. Non-limiting examples of speaker information can include operational permissions for various computer-based features of the vehicle, such as turning or activating the ignition, opening the doors (e.g., child locks), among others. As an example, the driver (e.g., parent) inputs, via the GUI of the infotainment system indicates the various permissions of the child speaker profile and the child's name, which is associated with the speaker identifier of the speaker profile and the voiceprint of the child. When the analytics computer 1102 identifies a new voiceprint for a new speaker (the child), the infotainment system generates a GUI prompt indicating to the driver (or other known, enrolled speaker) (e.g., parent) that the analytics computer 1102 identified and generated the new voiceprint of the child. The parent could enter one or more inputs that confirm which particular speaker profile (or speaker identifier) is associated with the new voiceprint for the child. The analytics computer 1102 then stores the new voiceprint into the child's speaker profile in the analytics database 1104. The child may enter via the GUI various types of speaker information into the speaker profile, such as preference configurations for seating preferences or climate preferences. After enrolling the child, the analytics computer 1102 passively identifies when the child is present in the vehicle according to utterances received by the microphone 1108. The analytics computer 1102 then instructs the infotainment system or related controls systems to function according to the preference data in the child's speaker profile (e.g., change seating position).

In an embodiment, a computer-implemented method comprises receiving, by a computer, an inbound audio signal including a plurality of utterances of a plurality of inbound speakers; applying, by the computer, a machine-learning architecture to the inbound audio signal to extract a plurality of inbound embeddings corresponding to the plurality of inbound speakers; for each inbound speaker of the plurality of inbound speakers: generating, by the computer, one or more similarity scores based upon an inbound embedding for the inbound speaker, each similarity score for the inbound speaker indicating a distance between the inbound embedding and one or more voiceprints stored in a speaker profile database; and identifying, by the computer, a nearest voiceprint for the inbound speaker from the one or more voiceprints, the nearest voiceprint corresponding to a max similarity score of the one or more similarity scores generated for the inbound speaker; and for each max similarity score satisfying one or more similarity score thresholds: updating, by the computer, a speaker profile database to include the inbound embedding for the inbound speaker having the max similarity score satisfying the one or more similarity score thresholds.

The method may further comprise identifying, by the computer, the one or more voiceprints stored in the speaker profile database based upon a subscriber identifier received with the inbound audio signal.

The method may further comprise determining, by the computer, that the max similarity score for the inbound speaker embedding satisfies the one or more similarity scores; and identifying, by the computer, a speaker profile in the speaker database containing the nearest voiceprint for the inbound speaker, the speaker profile including a speaker identifier.

The method may further comprise determining, by the computer, that the max similarity score for the inbound speaker satisfies a first similarity threshold and fails a second similarity threshold, the first similarity threshold comparatively lower than a second similarity threshold; and updating, by the computer, a list of weak embeddings stored in the speaker database to include the inbound embedding of the inbound speaker.

The method may further comprise executing, by the computer, a re-clustering operation on one or more speaker profiles in the speaker database associated with the subscriber identifier; updating, by the computer, the max similarity score for the inbound embedding of the list of weak embeddings based upon the re-clustering operation; and responsive to determining that the max similarity score for the inbound embedding of the list of weak embeddings satisfies one or more similarity score thresholds: updating, by the computer, the speaker profile database to include the inbound embedding for the inbound speaker having the max similarity score satisfying the one or more similarity score thresholds.

The method may further comprise detecting, by the computer, a triggering condition for performing a re-clustering operation for the subscriber identifier; and executing, by the computer, a hierarchical clustering operation on the plurality voiceprints of one or more speaker profiles associated with the subscriber identifier.

The method may further comprise updating, by the computer, the speaker identifier associated with a new voiceprint cluster from an existing speaker profile, the new voiceprint cluster generated by applying the hierarchical clustering operation on the one or more speaker profiles associated with the subscriber identifier.

The method may further comprise receiving, by the computer, the inbound audio signal from end-user device via an intermediary server; and transmitting, by the computer, the speaker identifier associated with each inbound speaker having the max similarity score satisfying the one or more similarity score thresholds.

The method may further comprise receiving, by a computer, the inbound audio signal including a plurality of utterances of a plurality of inbound speakers.

The method may further comprise applying, by the computer, the machine-learning architecture on the one or more features to identify one or more audio events to detect an environmental setting; and transmitting, by the computer, to an intermediary server an indicator of the environmental setting and each speaker identifier associated with each inbound speaker having the max similarity score satisfying the one or more similarity score thresholds.

The method may further comprise for each max similarity score failing the one or more similarity score thresholds: generating, by the computer, a new speaker profile associated with the subscriber identifier comprising the inbound embedding; and updating, by the computer, the speaker profile database to include the new speaker profile and the inbound embedding for the inbound speaker.

In an embodiment, a system comprises a speaker database comprising non-transitory machine-readable storage media configured to store data records containing speaker profiles; and a computer comprising a processor configured to: receive an inbound audio signal including a plurality of utterances of a plurality of inbound speakers; apply a machine-learning architecture to the inbound audio signal to extract a plurality of inbound embeddings corresponding to the plurality of inbound speakers; for each inbound speaker of the plurality of inbound speakers: generate one or more similarity scores based upon an inbound embedding for the inbound speaker, each similarity score for the inbound speaker indicating a distance between the inbound embedding and one or more voiceprints stored in a speaker profile database; and identify a nearest voiceprint for the inbound speaker from the one or more voiceprints, the nearest voiceprint corresponding to a max similarity score of the one or more similarity scores generated for the inbound speaker; and for each max similarity score satisfying one or more similarity score thresholds: update a speaker profile database to include the inbound embedding for the inbound speaker having the max similarity score satisfying the one or more similarity score thresholds.

The computer may be configured to identify the one or more voiceprints stored in the speaker profile database based upon a subscriber identifier received with the inbound audio signal.

The computer may be configured to determine that the max similarity score for the inbound speaker embedding satisfies the one or more similarity scores; and identify a speaker profile in the speaker database containing the nearest voiceprint for the inbound speaker, the speaker profile including a speaker identifier.

The computer may be configured to determine that the max similarity score for the inbound speaker satisfies a first similarity threshold and fails a second similarity threshold, the first similarity threshold comparatively lower than a second similarity threshold; and update a list of weak embeddings stored in the speaker database to include the inbound embedding of the inbound speaker.

The computer may be configured to execute a re-clustering operation on one or more speaker profiles in the speaker database associated with the subscriber identifier; update the max similarity score for the inbound embedding of the list of weak embeddings based upon the re-clustering operation; and responsive to determining that the max similarity score for the inbound embedding of the list of weak embeddings satisfies one or more similarity score thresholds: update the speaker profile database to include the inbound embedding for the inbound speaker having the max similarity score satisfying the one or more similarity score thresholds.

The computer may be configured to detect a triggering condition for performing a re-clustering operation for the subscriber identifier; and execute a hierarchical clustering operation on the plurality voiceprints of one or more speaker profiles associated with the subscriber identifier.

The computer may be configured to update the speaker identifier associated with a new voiceprint cluster from an existing speaker profile, the new voiceprint cluster generated by applying the hierarchical clustering operation on the one or more speaker profiles associated with the subscriber identifier.

The computer may be configured to receive the inbound audio signal from end-user device via an intermediary server; and transmit the speaker identifier associated with each inbound speaker having the max similarity score satisfying the one or more similarity score thresholds.

The computer may be configured to receive the inbound audio signal including a plurality of utterances of a plurality of inbound speakers.

The computer may be configured to apply the machine-learning architecture on the one or more features to identify one or more audio events to detect an environmental setting; and transmit to an intermediary server an indicator of the environmental setting and each speaker identifier associated with each inbound speaker having the max similarity score satisfying the one or more similarity score thresholds.

The computer may be configured to, for each max similarity score failing the one or more similarity score thresholds: generate a new speaker profile associated with the subscriber identifier comprising the inbound embedding; and update the speaker profile database to include the new speaker profile and the inbound embedding for the inbound speaker.

In an embodiment, a computer-implemented method comprises receiving, by a computer, an inbound audio signal for an inbound speaker from an end-user device via a content server; applying, by the computer, a machine learning model to the inbound audio signal to extract an inbound embedding for the inbound speaker; generating, by the computer, a similarity score for the inbound embedding based upon a distance between the inbound embedding and a voiceprint stored in a speaker profile in a speaker database, the similarity score satisfying one or more similarity score thresholds; identifying, by the computer, in the speaker profile one or more speaker characteristics corresponding to one or more content characteristics for the content server; and transmitting, by the computer, the one or more speaker characteristics associated with the inbound speaker to the media content server.

The method may further comprise identifying, by the computer, the speaker profile based upon a subscriber identifier received from the content server.

The subscriber identifier received by the computer may be a first anonymized identifier, the subscriber identifier may be associated with one or more speaker identifiers for one or more speakers, and each speaker identifier may be a second anonymized identifier corresponding to each speaker profile.

The one or more speaker characteristics may include at least one of an age characteristic and a gender characteristic.

The method may further comprise determining, by the computer, at least one of an age characteristic and a gender characteristic of the inbound speaker by applying a second machine-learning model on the inbound audio signal.

The method may further comprise determining, by the computer, an age of the inbound speaker based upon an age characteristic stored in the speaker profile for the inbound speaker.

The method may further comprise receiving, by the computer, speaker information indicating at least one speaker characteristic for the inbound speaker from the content server; storing, by the computer, the at least one speaker characteristic into the speaker profile for the inbound speaker; and identifying, by the computer, the speaker profile based, in part, upon the at least one speaker characteristic in the speaker profile.

The method may further comprise receiving, by the computer, inbound authentication data from content server with the inbound audio signal; and authenticating, by the computer, the inbound speaker based upon the similarity score satisfying the similarity threshold and the inbound authentication data satisfying expected authentication data stored in the speaker profile.

The authentication data may comprise at least one of end-user device information, metadata associated with the end-user device, speaker information, and biometric information.

The method may further comprise extracting, by the computer, one or more features from the inbound audio signal; and calculating, by the computer, a spoofing score indicating a likelihood that the inbound audio signal includes a spoofing condition based upon the one or more features by applying a second machine-learning model.

The method may further comprise identifying, by the computer, in a media content database one or more media content files having one or more content characteristics corresponding to the one or more speaker characteristics.

The method may further comprise enabling, by the computer, age-restricted content in the content database based upon an age characteristic of the one or more speaker characteristics of the speaker satisfying a corresponding age-restriction characteristic in the one or more content characteristics of the age-restricted content.

In an embodiment, a system comprises a speaker database comprising non-transitory machine-readable storage media configured to store a plurality of speaker profiles; and a server comprising a processor configured to: receive an inbound audio signal for an inbound speaker from an end-user device via a content server; apply a machine learning model to the inbound audio signal to extract an inbound embedding for the inbound speaker; generate a similarity score for the inbound embedding based upon a distance between the inbound embedding and a voiceprint stored in a speaker profile in the speaker database, the similarity score satisfying one or more similarity score thresholds; identify in the speaker profile one or more speaker characteristics corresponding to one or more content characteristics for the content server; and transmit the one or more speaker characteristics associated with the inbound speaker to the media content server.

The computer may be further configured to identify the speaker profile based upon a subscriber identifier received from the content server.

The subscriber identifier received by the computer may be a first anonymized identifier, the subscriber identifier may be associated with one or more speaker identifiers for one or more speakers, and each speaker identifier may be a second anonymized identifier corresponding to each speaker profile.

The one or more speaker characteristics may include at least one of an age characteristic and a gender characteristic.

The computer may be further configured to determine at least one of an age characteristic and a gender characteristic of the inbound speaker by applying a second machine-learning model on the inbound audio signal.

The computer may be further configured to determine an age of the inbound speaker based upon an age characteristic stored in the speaker profile for the inbound speaker.

The computer may be further configured to receive speaker information indicating at least one speaker characteristic for the inbound speaker from the content server; store the at least one speaker characteristic into the speaker profile for the inbound speaker; and identify the speaker profile based, in part, upon the at least one speaker characteristic in the speaker profile.

The computer may be further configured to receive inbound authentication data from content server with the inbound audio signal; and authenticate the inbound speaker based upon the similarity score satisfying the similarity threshold and the inbound authentication data satisfying expected authentication data stored in the speaker profile.

The system according to claim 20, wherein the authentication data comprises at least one of end-user device information, metadata associated with the end-user device, speaker information, and biometric information.

The computer may be further configured to extract one or more features from the inbound audio signal; and calculate a spoofing score indicating a likelihood that the inbound audio signal includes a spoofing condition based upon the one or more acoustic features by applying a second machine-learning model.

The computer may be further configured to identify in a media content database one or more media content files having one or more content characteristics corresponding to the one or more speaker characteristics.

The computer may be further configured to enable, age-restricted content in the content database based upon an age characteristic of the one or more speaker characteristics of the speaker satisfying a corresponding age-restriction characteristic in the one or more content characteristics of the age-restricted content.

In an embodiment, a computer-implemented method comprises obtaining, by the computer, a speaker profile associated with a speaker containing one or more embeddings for the speaker; determining, by the computer, a level of maturity for a voiceprint for the speaker based upon a false acceptance rate and one or more maturity factors for the one or more embeddings; and updating, by the computer, one or more similarity thresholds of the speaker profile according to the level of maturity and the one or more maturity factors.

The method may further comprise obtaining the speaker profile comprises: generating, by the computer, the speaker profile in response to determining that the speaker is a new user of a media content system.

The method may further comprise obtaining the speaker profile comprises: extracting, by the computer, an inbound embedding for the speaker by applying an machine-learning architecture on an inbound audio signal; generating, by the computer, a similarity score for the inbound embedding based upon a relative distance between the inbound embedding and the voiceprint; and identifying, by the computer, the speaker profile stored in a speaker database in response to determining that the similarity score for the inbound embedding satisfies at least one similarity threshold of the one or more similarity thresholds of the speaker profile.

The at least one threshold may include a low similarity threshold, and the one or more thresholds may the low similarity threshold and a high similarity threshold.

The method may further comprise updating, by the computer, the voiceprint for the speaker according to the inbound embedding in response to determining that the similarity score for the inbound embedding satisfies a high similarity threshold of the one or more similarity thresholds, wherein the computer determines the level of maturity for the voiceprint after updating the voiceprint.

The method may further comprise updating, by the computer, the one or more maturity factors for the voiceprint based upon the inbound embedding used for updating the voiceprint, wherein the computer determines the level of maturity for the voiceprint after updating the one or more maturity factors.

The method may further comprise, responsive to the computer determining that the level of maturity of the voiceprint fails to satisfy a maturity threshold: generating, by the computer, a prompt requesting an additional inbound embedding associated with the speaker; and for each additional inbound embedding satisfying the one or more similarity thresholds: updating, by the computer, the voiceprint according to the additional inbound embedding; and updating, by the computer, the one or more maturity factors for the voiceprint based upon each additional inbound embedding.

The method may further comprise updating the one or more similarity thresholds includes; and increasing, by the computer, the one or more thresholds of the speaker profile in response to determining that the level of maturity for the voiceprint satisfies a maturity threshold.

The one or more maturity factors may at least one of a number of embeddings for the speaker, a duration of net speech occurring in the one or more embeddings, and a quality of audio from which the one or more embeddings.

The method may further comprise determining, by the computer, the false acceptance rate based upon a configuration input received from an administrative computer.

In an embodiment, a system comprises a speaker profile database comprising non-transitory machine-readable media configured to store a plurality of speaker profiles; and a computer comprising a processor configured to: obtain a speaker profile associated with a speaker containing one or more embeddings for the speaker; determine a level of maturity for a voiceprint for the speaker based upon a false acceptance rate and one or more maturity factors for the one or more embeddings; and update one or more similarity thresholds of the speaker profile according to the level of maturity and the one or more maturity factors.

The computer may be further configured to, in order to obtain the speaker profile, generate the speaker profile in response to determining that the speaker is a new user of a media content system.

The computer may be further configured to, in order to obtain the speaker profile, extract an inbound embedding for the speaker by applying an machine-learning architecture on an inbound audio signal; generate a similarity score for the inbound embedding based upon a relative distance between the inbound embedding and the voiceprint; and identify the speaker profile stored in a speaker database in response to determining that the similarity score for the inbound embedding satisfies at least one similarity threshold of the one or more similarity thresholds of the speaker profile.

The at least one threshold may include a low similarity threshold, and the one or more thresholds may include the low similarity threshold and a high similarity threshold.

The computer may be further configured to update the voiceprint for the speaker according to the inbound embedding in response to determining that the similarity score for the inbound embedding satisfies a high similarity threshold of the one or more similarity thresholds, wherein the computer determines the level of maturity for the voiceprint after updating the voiceprint.

The computer may be further configured to update the one or more maturity factors for the voiceprint based upon the inbound embedding used for updating the voiceprint, wherein the computer determines the level of maturity for the voiceprint after updating the one or more maturity factors.

The computer may be further configured to, responsive to the computer determining that the level of maturity of the voiceprint fails to satisfy a maturity threshold: generate a prompt requesting an additional inbound embedding associated with the speaker; and for each additional inbound embedding satisfying the one or more similarity thresholds: update the voiceprint according to the additional inbound embedding; and update the one or more maturity factors for the voiceprint based upon each additional inbound embedding.

The computer may be further configured to, in order to update the one or more similarity thresholds the device, increase the one or more thresholds of the speaker profile in response to determining that the level of maturity for the voiceprint satisfies a maturity threshold.

The one or more maturity factors may include at least one of a number of embeddings for the speaker, a duration of net speech occurring in the one or more embeddings, and a quality of audio from which the one or more embeddings.

The computer may be further configured to determine the false acceptance rate based upon a configuration input received from an administrative computer.

In an embodiment, a device-implemented method comprising receiving, by a device, an inbound audio signal containing an utterance of an inbound speaker; applying, by the device, an embedding extraction model on the inbound audio signal to extract an inbound embedding for the inbound speaker; generating, by the device, one or more similarity scores for the inbound embedding upon a relative distance between the inbound embedding and one or more voiceprints stored non-transitory machine-readable media; identifying, by the computer, a speaker identifier associated with a voiceprint for the inbound speaker in response to determining that a similarity score generated using the voiceprint satisfies a similarity threshold; and transmitting, by the device, the speaker identifier to a content server.

The device may include at least one of a smart TV, a set-top box, an edge device, a remote control, and a mobile communication device.

The method may further comprise receiving from the content server, by the device, media content for display via a display device coupled to the device.

The device may transmit a request for media content to the content server with the speaker identifier.

The method may further comprise extracting, by the device, one or more features from the inbound audio signal, the features having one or more types of biometric features including at least one audio feature.

The method may further comprise receiving, by a microphone of the device, audio waves containing a plurality of utterances from a plurality of inbound speakers; and converting, by the device, the audio waves into the inbound audio signal containing the plurality of utterances.

The inbound audio signal may contain a plurality of utterances of a plurality of inbound speakers, and the device may apply the embedding extraction model on the inbound audio signal to generate a plurality of similarity scores for the plurality of inbound embeddings corresponding to the plurality of inbound speakers, where the plurality of similarity scores may be generated according to a plurality of voiceprints stored in non-transitory machine-readable storage of the device.

The method may further comprise responsive to the device determining that a second similarity score of the plurality of similarity scores for a second inbound embedding of the plurality of embeddings fails to satisfy at least one similarity threshold: generating, by the device, a second speaker profile for the second inbound speaker containing the second inbound embedding and a second speaker identifier in the non-transitory machine-readable storage.

The method may further comprise generating, by the device, one or more enrollment prompts for display to the inbound speaker requesting one or more enrollment audio signals for the inbound speaker; generating, by the device, the voiceprint for the inbound speaker based upon one or more enrollment embeddings extracted from the one or more enrollment audio signals; responsive to the device determining that a level of maturity of the voiceprint fails to satisfy a maturity threshold: generating, by the device, a second enrollment prompt requesting a second enrollment audio signal; and updating, by the device, the voiceprint for the inbound speaker based upon a second enrollment embedding extracted from the second enrollment audio signal.

The method may further comprise extracting, by the device, one or more acoustic features from the inbound audio signal; and calculating, by the device, a spoofing score indicating a likelihood that the inbound audio signal includes a spoofing condition based upon the one or more acoustic features by applying a second machine-learning model.

In an embodiment, a system comprises a speaker database comprising non-transitory machine-readable storage media configured to store data records containing speaker profiles; and a device comprising a processor configured to: receive an inbound audio signal containing an utterance of an inbound speaker; apply an embedding extraction model on the inbound audio signal to extract an inbound embedding for the inbound speaker; generate one or more similarity scores for the inbound embedding upon a relative distance between the inbound embedding and one or more voiceprints stored the speaker database; identifying, by the computer, a speaker identifier associated with a voiceprint for the inbound speaker in response to determining that a similarity score generated using the voiceprint satisfies a similarity threshold; and transmit the speaker identifier to a content server.

The device may be at least one of a smart TV, a set-top box, an edge device, a remote control, and mobile communication device.

The device may be further configured to receive media content from the content server for display via a display device coupled to the device.

The device may be further configured to transmit a request for media content to the content server with the speaker identifier.

The device may be further configured to extract one or more features from the inbound audio signal, the features having one or more types of biometric features including at least one audio feature.

The system or the device may further comprise a microphone configured to receive audio waves containing a plurality of utterances from a plurality of inbound speakers. The device may be further configured to convert the audio waves into the inbound audio signal containing the plurality of utterances.

The inbound audio signal may contain a plurality of utterances of a plurality of inbound speakers. The device may be further configured to apply the embedding extraction model on the inbound audio signal to generate a plurality of similarity scores for the plurality of inbound embeddings corresponding to the plurality of inbound speakers, where the device generates the plurality of similarity scores according to a plurality of voiceprints stored in the speaker database.

The device may be further configured to determine that a second similarity score of the plurality of similarity scores for a second inbound embedding of the plurality of embeddings fails to satisfy at least one similarity threshold; and generate a second speaker profile for the second inbound speaker containing the second inbound embedding and a second speaker identifier in the non-transitory machine-readable storage.

The device may be further configured to generate one or more enrollment prompts for display to the inbound speaker requesting one or more enrollment audio signals for the inbound speaker; generate the voiceprint for the inbound speaker based upon one or more enrollment embeddings extracted from the one or more enrollment audio signals; responsive to the device determining that a level of maturity of the voiceprint fails to satisfy a maturity threshold: generate a second enrollment prompt requesting a second enrollment audio signal; and update the voiceprint for the inbound speaker based upon a second enrollment embedding extracted from the second enrollment audio signal.

The device may be further configured to extract one or more acoustic features from the inbound audio signal; and calculate a spoofing score indicating a likelihood that the inbound audio signal includes a spoofing condition based upon the one or more acoustic features by applying a second machine-learning model.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
extracting, by a computer, an inbound embedding for an inbound speaker by applying a machine-learning model on an inbound audio signal;
generating, by the computer, a similarity score based upon a distance between the inbound embedding for the inbound speaker and a voiceprint stored in a speaker profile in a speaker profile database; and
responsive to the computer determining that the similarity score for the inbound embedding of the inbound speaker fails to satisfy a similarity threshold:
generating, by the computer, in the speaker profile database a new speaker profile for the inbound speaker containing the inbound embedding for the inbound speaker of the inbound audio signal, the new speaker profile is a database record storing the inbound embedding as a new voiceprint for the inbound speaker, wherein the new voiceprint satisfies a maturity threshold and is based upon at least one inbound embedding for the inbound speaker;

responsive to the computer determining that a second similarity score for a second inbound embedding extracted for a second inbound signal satisfies the similarity threshold:
  updating, by the computer, the new voiceprint for the inbound speaker based upon the second inbound signal.

2. The method according to claim 1, further comprising:
receiving, by the computer, the inbound audio signal from an end-user device via an intermediate server; and
transmitting, by the computer, a new speaker identifier associated with the new speaker profile to the intermediate server.

3. The method according to claim 2, wherein the end-user device is at least one of a smart television, a media device coupled to a television, and an edge device.

4. The method according to claim 1, further comprising extracting, by the computer, one or more features from the inbound audio signal, wherein the computer generates the inbound embedding by applying the machine-learning model on the one or more features the computer extracted from the inbound audio signal.

5. The method according to claim 1, further comprising:
extracting, by the computer, the second inbound embedding from the second inbound signal by applying the machine-learning model on the second inbound audio signal; and
generating, by the computer, the second similarity score based upon the distance between the second inbound embedding and the new voiceprint stored in the new speaker profile.

6. The method according to claim 1, further comprising:
receiving, by the computer, a subscriber identifier associated with the inbound audio signal; and
identifying, by the computer, one or more speaker profiles associated with the subscriber identifier stored in the speaker profile database, wherein the computer generates one or more similarity scores for the inbound embedding based upon one or more voiceprints stored in the one or more speaker profiles associated with the subscriber identifier.

7. The method according to claim 6, wherein the subscriber identifier is associated with one or more speaker identifiers, and wherein each speaker profile is associated with a corresponding speaker identifier.

8. The method according to claim 7, wherein at least one of the subscriber identifier and each speaker identifier is an anonymized identifier.

9. The method according to claim 1, wherein the computer generates the new voiceprint based upon one or more inbound embeddings, the method further comprising:
identifying, by the computer, one or more maturity factors for the new voiceprint based upon the one or more inbound embeddings; and
determining, by the computer, a level of maturity for the new voiceprint based upon the one or more maturity factors.

10. The method according to claim 9, further comprising updating, by the computer, a new similarity threshold of the new speaker profile in response to the computer determining that the level of maturity for the new voiceprint satisfies a second maturity threshold.

11. The method according to claim 9, further comprising:
responsive to the computer determining that the level of maturity fails the maturity threshold:
generating, by the computer, an active enrollment prompts the active enrollment prompt comprising a user interface configured to display a request for an additional inbound audio signal;
extracting, by the computer, an additional embedding from the additional inbound signal; and
updating, by the computer, the new voiceprint according to an additional embedding extracted from the additional inbound signal.

12. The method according to claim 9, further comprising updating, by the computer, the new speaker profile from a temporary profile to a permanent profile in response to the computer determining that the level of maturity satisfies the maturity threshold.

13. A system comprising:
a speaker profile database comprising non-transitory machine-readable storage media configured to store data records containing speaker profiles; and
a computer comprising a processor configured to:
  extract an inbound embedding for an inbound speaker by applying a machine-learning model on an inbound audio signal;
  generate a similarity score based upon a distance between the inbound embedding for the inbound speaker and a voiceprint stored in a speaker profile in the speaker profile database; and
  responsive to the computer determining that the similarity score for the inbound embedding for the inbound speaker fails to satisfy a similarity threshold:
    generate in the speaker profile database a new speaker profile for the inbound speaker containing the inbound embedding for the inbound speaker of the inbound audio signal, the new speaker profile is a database record storing the inbound embedding as a new voiceprint for the inbound speaker, wherein the new voiceprint satisfies a maturity threshold and is based upon at least one inbound embedding for the inbound speaker;
  responsive to the computer determining that a second similarity score for a second inbound embedding extracted for a second inbound signal satisfies the similarity threshold:
    update the new voiceprint for the inbound speaker based upon the second inbound signal.

14. The system according to claim 13, wherein the computer is further configured to:
receive the inbound audio signal from an end-user device via an intermediate server; and
transmit a new speaker identifier associated with the new speaker profile to the intermediate server.

15. The system according to claim 14, wherein the end-user device is at least one of a smart television, a media device coupled to a television, and an edge device.

16. The system according to claim 13, wherein the computer is further configured to extract one or more features from the inbound audio signal, wherein the computer generates the inbound embedding by applying the machine-learning model on the one or more features the computer extracted from the inbound audio signal.

17. The system according to claim 13, wherein the computer is further configured to:

extract the second inbound embedding from the second inbound signal by applying the machine-learning model on the second inbound audio signal; and generate the second similarity score based upon the distance between the second inbound embedding and the new voiceprint stored in the new speaker profile.

18. The system according to claim 13, wherein the computer is further configured to:

receive a subscriber identifier associated with the inbound audio signal; and identify one or more speaker profiles associated with the subscriber identifier stored in the speaker profile database, wherein the computer generates one or more similarity scores for the inbound embedding based upon one or more voiceprints stored in the one or more speaker profiles associated with the subscriber identifier.

19. The system according to claim 18, wherein the subscriber identifier is associated with one or more speaker identifiers, and wherein each speaker profile is associated with a corresponding speaker identifier.

20. The system according to claim 19, wherein at least one of the subscriber identifier and each speaker identifier is an anonymized identifier.

21. The system according to claim 13, wherein the computer generates the new voiceprint based upon one or more inbound embeddings, and wherein the computer is further configured to:

identify one or more maturity factors for the new voiceprint based upon the one or more inbound embeddings; and determine a level of maturity for the new voiceprint based upon the one or more maturity factors.

22. The system according to claim 21, wherein the computer is further configured to update a new similarity threshold of the new speaker profile in response to the computer determining that the level of maturity for the new voiceprint satisfies a second maturity threshold.

23. The system according to claim 21, wherein the computer is further configured to:

responsive to determining that the level of maturity fails the maturity threshold:

generate an active enrollment prompts the active enrollment prompt comprising a user interface configured to display a request for an additional inbound audio signal; and extract an additional embedding from the additional inbound signal; and update the new voiceprint according to an additional embedding extracted from the additional inbound signal.

24. The system according to claim 21, wherein the computer is further configured to update the new speaker profile from a temporary profile to a permanent profile in response to the computer determining that the level of maturity satisfies the maturity threshold.

* * * * *